United States Patent
Fukui et al.

(10) Patent No.: US 9,003,028 B2
(45) Date of Patent: Apr. 7, 2015

(54) EVENT COLLECTION METHOD AND INFORMATION PROCESSING APPARATUS

(75) Inventors: Masayuki Fukui, Akashi (JP); Kazuo Sasaki, Kobe (JP); Shigeki Fukuta, Setagaya (JP); Itaru Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 13/595,428

(22) Filed: Aug. 27, 2012

(65) Prior Publication Data

US 2013/0232255 A1    Sep. 5, 2013

(30) Foreign Application Priority Data

Aug. 29, 2011   (JP) ................. 2011-186629

(51) Int. Cl.
*G06F 15/173* (2006.01)
*H04L 12/26* (2006.01)
*H04W 4/00* (2009.01)

(52) U.S. Cl.
CPC ............... *H04L 43/10* (2013.01); *H04L 43/04* (2013.01); *H04W 4/006* (2013.01)

(58) Field of Classification Search
CPC ............................. H04L 43/10; H04L 43/04
USPC ........................................................ 709/224
See application file for complete search history.

(56) References Cited

U.S. PATENT DOCUMENTS

| | | | |
|---|---|---|---|
| 8,677,507 B2 * | 3/2014 | Ginter et al. ................... | 726/27 |
| 2006/0282498 A1 | 12/2006 | Muro | |
| 2008/0098367 A1 | 4/2008 | Partridge et al. | |

FOREIGN PATENT DOCUMENTS

| | | |
|---|---|---|
| JP | 2006-344017 | 12/2006 |
| JP | 2008-97603 | 4/2008 |

* cited by examiner

*Primary Examiner* — Kristie Shingles
(74) *Attorney, Agent, or Firm* — Staas & Halsey LLP

(57) ABSTRACT

An event collection method collects an event from a sensor network, the method includes: retrieving on a per process basis for a module, based on a module definition information and an occurred event information, an occurrence node identifier categorized by an attribute value corresponding to an attribute name, with input event type associated with an occurred event type; determining, when there is a single retrieved occurrence node identifier with respect to the process of the module, a node identified by the occurrence node identifier as an installation destination of the module that is identified by the module identifier; referencing, when there is a plurality of retrieved occurrence node identifiers with respect to the process of the module, a connection relation information of nodes and determining an upper node common to the plurality of occurrence node identifiers as an installation destination of the module identified by the module identifier.

16 Claims, 50 Drawing Sheets

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | | (UNINSTALLED) |
| TEMPERATURE ALERT | TEMPERATURE | NONE | | | (UNINSTALLED) |
| AVERAGE TEMPERATURE CALCULATION | TEMPERATURE | TEMPERATURE SENSOR ID | | | (UNINSTALLED) |
| AVERAGE TEMPERATURE CALCULATION | TEMPERATURE | TEMPERATURE SENSOR ID | | | (UNINSTALLED) |
| AVERAGE HUMIDITY CALCULATION | HUMIDITY | HUMIDITY SENSOR ID | | | (UNINSTALLED) |
| AVERAGE HUMIDITY CALCULATION | HUMIDITY | HUMIDITY SENSOR ID | | | (UNINSTALLED) |
| DISCOMFORT INDEX CALCULATION | AVERAGE TEMPERATURE AND AVERAGE HUMIDITY | HOME ID | | | (UNINSTALLED) |

FIG. 3

| MODULE IDENTIFIER | BINARY CODE |
|---|---|
| TEMPERATURE ALERT | BINARY DATA |
| AVERAGE TEMPERATURE CALCULATION | BINARY DATA |
| AVERAGE HUMIDITY CALCULATION | BINARY DATA |
| DISCOMFORT INDEX CALCULATION | BINARY DATA |

FIG. 4

| MODULE IDENTIFIER | INPUT EVENT TYPE | OUTPUT EVENT TYPE | AGGREGATE ATTRIBUTE NAME |
|---|---|---|---|
| TEMPERATURE ALERT | TEMPERATURE | TEMPERATURE ALERT | NONE |
| AVERAGE TEMPERATURE CALCULATION | TEMPERATURE | AVERAGE TEMPERATURE | TEMPERATURE SENSOR ID |
| AVERAGE HUMIDITY CALCULATION | HUMIDITY | AVERAGE HUMIDITY | HUMIDITY SENSOR ID |
| DISCOMFORT INDEX CALCULATION | AVERAGE TEMPERATURE AND AVERAGE HUMIDITY | DISCOMFORT INDEX | HOME ID |

FIG. 5

| LOWER NODE ID | UPPER NODE ID |
|---|---|
| TEMPERATURE SENSOR X | CLOUD |
| HUMIDITY SENSOR X | CLOUD |
| TEMPERATURE AND HUMIDITY SENSOR Y | CLOUD |
| CLOUD | NONE |

FIG. 6

| EVENT TYPE | EVENT OCCURRENCE TIME | EVENT ATTRIBUTE |
|---|---|---|
| TEMPERATURE | 2011/07/13 12:00:00 | TEMPERATURE SENSOR ID="TEMPERATURE SENSOR X" HOME ID="HOME X" TEMPERATURE=28 |
| HUMIDITY | 2011/07/13 12:00:10 | HUMIDITY SENSOR ID="HUMIDITY SENSOR X" HOME ID="HOME X" HUMIDITY=50 |
| TEMPERATURE | 2011/07/13 12:00:20 | TEMPERATURE SENSOR ID="TEMPERATURE AND HUMIDITY SENSOR Y" HOME ID="HOME Y" TEMPERATURE=30 |
| HUMIDITY | 2011/07/13 12:00:30 | HUMIDITY SENSOR ID="TEMPERATURE AND HUMIDITY SENSOR Y" HOME ID="HOME Y" HUMIDITY=70 |

FIG. 7

| OCCURRENCE NODE ID | OCCURRENCE EVENT TYPE | OCCURRENCE EVENT ATTRIBUTE |
|---|---|---|
| TEMPERATURE SENSOR X | TEMPERATURE | TEMPERATURE SENSOR ID="TEMPERATURE SENSOR X"  HOME ID="HOME X"  TEMPERATURE=28 |
| HUMIDITY SENSOR X | HUMIDITY | HUMIDITY SENSOR ID="HUMIDITY SENSOR X"  HOME ID="HOME X"  HUMIDITY=50 |
| TEMPERATURE AND HUMIDITY SENSOR Y | TEMPERATURE | TEMPERATURE SENSOR ID="TEMPERATURE AND HUMIDITY SENSOR Y"  HOME ID="HOME Y"  TEMPERATURE=30 |
| TEMPERATURE AND HUMIDITY SENSOR Y | HUMIDITY | HUMIDITY SENSOR ID="TEMPERATURE AND HUMIDITY SENSOR Y"  HOME ID="HOME Y"  HUMIDITY=70 |

FIG. 8

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | | (UNINSTALLED) |
| TEMPERATURE ALERT | TEMPERATURE | NONE | | | (UNINSTALLED) |
| AVERAGE TEMPERATURE CALCULATION | TEMPERATURE | TEMPERATURE SENSOR ID | | | (UNINSTALLED) |
| AVERAGE TEMPERATURE CALCULATION | TEMPERATURE | TEMPERATURE SENSOR ID | | | (UNINSTALLED) |
| AVERAGE HUMIDITY CALCULATION | HUMIDITY | HUMIDITY SENSOR ID | | | (UNINSTALLED) |
| AVERAGE HUMIDITY CALCULATION | HUMIDITY | HUMIDITY SENSOR ID | | | (UNINSTALLED) |
| DISCOMFORT INDEX CALCULATION | AVERAGE TEMPERATURE AND AVERAGE HUMIDITY | HOME ID | | | (UNINSTALLED) |

FIG. 9

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | TEMPERATURE SENSOR X |
| TEMPERATURE ALERT | TEMPERATURE | NONE | | TEMPERATURE AND HUMIDITY SENSOR Y | TEMPERATURE AND HUMIDITY SENSOR Y |
| AVERAGE TEMPERATURE CALCULATION | TEMPERATURE | TEMPERATURE SENSOR ID | TEMPERATURE SENSOR ID = "TEMPERATURE SENSOR X" | TEMPERATURE SENSOR X | TEMPERATURE SENSOR X |
| AVERAGE TEMPERATURE CALCULATION | TEMPERATURE | TEMPERATURE SENSOR ID | TEMPERATURE SENSOR ID = "TEMPERATURE AND HUMIDITY SENSOR Y" | TEMPERATURE AND HUMIDITY SENSOR Y | TEMPERATURE AND HUMIDITY SENSOR Y |
| AVERAGE HUMIDITY CALCULATION | HUMIDITY | HUMIDITY SENSOR ID | HUMIDITY SENSOR ID = "HUMIDITY SENSOR X" | HUMIDITY SENSOR X | HUMIDITY SENSOR X |
| AVERAGE HUMIDITY CALCULATION | HUMIDITY | HUMIDITY SENSOR ID | HUMIDITY SENSOR ID = "TEMPERATURE AND HUMIDITY SENSOR Y" | TEMPERATURE AND HUMIDITY SENSOR Y | TEMPERATURE AND HUMIDITY SENSOR Y |
| DISCOMFORT INDEX CALCULATION | AVERAGE TEMPERATURE AND AVERAGE HUMIDITY | HOME ID | | | (UNINSTALLED) |

FIG. 10

| OCCURRENCE NODE ID | OCCURRENCE EVENT TYPE | OCCURRENCE EVENT ATTRIBUTE |
|---|---|---|
| TEMPERATURE SENSOR X | TEMPERATURE | TEMPERATURE SENSOR ID= "TEMPERATURE SENSOR X" HOME ID="HOME X" TEMPERATURE=28 |
| HUMIDITY SENSOR X | HUMIDITY | HUMIDITY SENSOR ID= "HUMIDITY SENSOR X" HOME ID="HOME X" TEMPERATURE=50 |
| TEMPERATURE AND HUMIDITY SENSOR Y | TEMPERATURE | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | HUMIDITY | HUMIDITY SENSOR ID="TEMPERATURE AND HUMIDITY SENSOR Y" HOME ID="HOME Y" HUMIDITY=70 |
| TEMPERATURE SENSOR X | TEMPERATURE ALERT | TEMPERATURE SENSOR ID= "TEMPERATURE SENSOR X" HOME ID="HOME X" TEMPERATURE=28 |
| TEMPERATURE SENSOR X | AVERAGE TEMPERATURE | TEMPERATURE SENSOR ID="TEMPERATURE SENSOR X" HOME ID="HOME X" AVERAGE TEMPERATURE=27 |
| HUMIDITY SENSOR X | AVERAGE HUMIDITY | HUMIDITY SENSOR ID="TEMPERATURE SENSOR X" HOME ID="HOME X" AVERAGE TEMPERATURE=45 |
| TEMPERATURE AND HUMIDITY SENSOR Y | TEMPERATURE ALERT | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | AVERAGE TEMPERATURE | TEMPERATURE SENSOR ID="TEMPERATURE AND HUMIDITY SENSOR Y" HOME ID="HOME Y" AVERAGE TEMPERATURE=31 |
| TEMPERATURE AND HUMIDITY SENSOR Y | AVERAGE HUMIDITY | HUMIDITY SENSOR ID="TEMPERATURE AND HUMIDITY SENSOR Y" HOME ID="HOME Y" AVERAGE HUMIDITY =65 |

FIG. 11

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | TEMPERATURE SENSOR X |
| TEMPERATURE ALERT | TEMPERATURE | NONE | | TEMPERATURE AND HUMIDITY SENSOR Y | TEMPERATURE AND HUMIDITY SENSOR Y |
| AVERAGE TEMPERATURE CALCULATION | TEMPERATURE | TEMPERATURE SENSOR ID | TEMPERATURE SENSOR ID= "TEMPERATURE SENSOR X" | TEMPERATURE SENSOR X | TEMPERATURE SENSOR X |
| AVERAGE TEMPERATURE CALCULATION | TEMPERATURE | TEMPERATURE SENSOR ID | TEMPERATURE SENSOR ID= "TEMPERATURE AND HUMIDITY SENSOR Y" | TEMPERATURE AND HUMIDITY SENSOR Y | TEMPERATURE AND HUMIDITY SENSOR Y |
| AVERAGE HUMIDITY CALCULATION | HUMIDITY | HUMIDITY SENSOR ID | HUMIDITY SENSOR ID= "HUMIDITY SENSOR X" | HUMIDITY SENSOR X | HUMIDITY SENSOR X |
| AVERAGE HUMIDITY CALCULATION | HUMIDITY | HUMIDITY SENSOR ID | HUMIDITY SENSOR ID= "TEMPERATURE AND HUMIDITY SENSOR Y" | TEMPERATURE AND HUMIDITY SENSOR Y | TEMPERATURE AND HUMIDITY SENSOR Y |
| DISCOMFORT INDEX CALCULATION | AVERAGE TEMPERATURE AND AVERAGE HUMIDITY | HOME ID | HOME ID="HOME X" | TEMPERATURE SENSOR X, HUMIDITY SENSOR X | CLOUD |
| DISCOMFORT INDEX CALCULATION | AVERAGE TEMPERATURE AND AVERAGE HUMIDITY | HOME ID | HOME ID="HOME Y" | TEMPERATURE AND HUMIDITY SENSOR Y | TEMPERATURE AND HUMIDITY SENSOR Y |

FIG. 12

| OCCURRENCE NODE ID | OCCURRENCE EVENT TYPE | OCCURRENCE EVENT ATTRIBUTE |
|---|---|---|
| TEMPERATURE SENSOR X | TEMPERATURE | TEMPERATURE SENSOR ID= "TEMPERATURE SENSOR X" HOME ID="HOME X" TEMPERATURE=28 |
| HUMIDITY SENSOR X | HUMIDITY | HUMIDITY SENSOR ID= "HUMIDITY SENSOR X" HOME ID="HOME X" TEMPERATURE=50 |
| TEMPERATURE AND HUMIDITY SENSOR Y | TEMPERATURE | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | HUMIDITY | HUMIDITY SENSOR ID="TEMPERATURE AND HUMIDITY SENSOR Y" HOME ID="HOME Y" HUMIDITY=70 |
| TEMPERATURE SENSOR X | TEMPERATURE ALERT | TEMPERATURE SENSOR ID= "TEMPERATURE SENSOR X" HOME ID="HOME X" TEMPERATURE=28 |
| TEMPERATURE SENSOR X | AVERAGE TEMPERATURE | TEMPERATURE SENSOR ID="TEMPERATURE SENSOR X" HOME ID="HOME X" AVERAGE TEMPERATURE=27 |
| HUMIDITY SENSOR X | AVERAGE HUMIDITY | HUMIDITY SENSOR ID="HUMIDITY SENSOR X" HOME ID="HOME X" AVERAGE HUMIDITY=45 |
| TEMPERATURE AND HUMIDITY SENSOR Y | TEMPERATURE ALERT | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | AVERAGE TEMPERATURE | TEMPERATURE SENSOR ID="TEMPERATURE AND HUMIDITY SENSOR Y" HOME ID="HOME Y" AVERAGE TEMPERATURE=31 |
| TEMPERATURE AND HUMIDITY SENSOR Y | AVERAGE HUMIDITY | HUMIDITY SENSOR ID="TEMPERATURE AND HUMIDITY SENSOR Y" HOME ID="HOME Y" AVERAGE HUMIDITY =65 |
| CLOUD | DISCOMFORT INDEX CALCULATION | HOME ID="HOME X" DISCOMFORT INDEX = 73.8 |
| TEMPERATURE AND HUMIDITY SENSOR Y | DISCOMFORT INDEX CALCULATION | HOME ID="HOME Y" DISCOMFORT INDEX = 82.1 |

FIG. 14

| LOWER NODE ID | UPPER NODE ID |
|---|---|
| TEMPERATURE SENSOR X | HOME GW-X |
| HUMIDITY SENSOR X | HOME GW-X |
| TEMPERATURE AND HUMIDITY SENSOR X | MOBILE GW-Y |
| HOME GW-X | CLOUD |
| MOBILE GW-Y | CLOUD |
| CLOUD | NONE |

FIG. 15

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | TEMPERATURE SENSOR X |
| TEMPERATURE ALERT | TEMPERATURE | NONE | | TEMPERATURE AND HUMIDITY SENSOR Y | TEMPERATURE AND HUMIDITY SENSOR Y |
| AVERAGE TEMPERATURE CALCULATION | TEMPERATURE | TEMPERATURE SENSOR ID | TEMPERATURE SENSOR ID= "TEMPERATURE SENSOR X" | TEMPERATURE SENSOR X | TEMPERATURE SENSOR X |
| AVERAGE TEMPERATURE CALCULATION | TEMPERATURE | TEMPERATURE SENSOR ID | TEMPERATURE SENSOR ID= "TEMPERATURE AND HUMIDITY SENSOR Y" | TEMPERATURE AND HUMIDITY SENSOR Y | TEMPERATURE AND HUMIDITY SENSOR Y |
| AVERAGE HUMIDITY CALCULATION | HUMIDITY | HUMIDITY SENSOR ID | HUMIDITY SENSOR ID= "HUMIDITY SENSOR X" | HUMIDITY SENSOR X | HUMIDITY SENSOR X |
| AVERAGE HUMIDITY CALCULATION | HUMIDITY | HUMIDITY SENSOR ID | HUMIDITY SENSOR ID= "TEMPERATURE AND HUMIDITY SENSOR Y" | TEMPERATURE AND HUMIDITY SENSOR Y | TEMPERATURE AND HUMIDITY SENSOR Y |
| DISCOMFORT INDEX CALCULATION | AVERAGE TEMPERATURE AND AVERAGE HUMIDITY | HOME ID | HOME ID="HOME X" | TEMPERATURE SENSOR X, HUMIDITY SENSOR X | HOME GW-X |
| DISCOMFORT INDEX CALCULATION | AVERAGE TEMPERATURE AND AVERAGE HUMIDITY | HOME ID | HOME ID="HOME Y" | TEMPERATURE AND HUMIDITY SENSOR Y | TEMPERATURE AND HUMIDITY SENSOR Y |

FIG. 16

| OCCURRENCE NODE ID | OCCURRENCE EVENT TYPE | EVENT ATTRIBUTE |
|---|---|---|
| TEMPERATURE SENSOR X | TEMPERATURE | TEMPERATURE SENSOR ID= "TEMPERATURE SENSOR X" HOME ID="HOME X" TEMPERATURE=28 |
| HUMIDITY SENSOR X | HUMIDITY | HUMIDITY SENSOR ID= "HUMIDITY SENSOR X" HOME ID="HOME X" HUMIDITY=50 |
| TEMPERATURE AND HUMIDITY SENSOR Y | TEMPERATURE | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | HUMIDITY | HUMIDITY SENSOR ID="TEMPERATURE AND HUMIDITY SENSOR Y" HOME ID="HOME Y" HUMIDITY=70 |
| TEMPERATURE SENSOR X | TEMPERATURE ALERT | TEMPERATURE SENSOR ID= "TEMPERATURE SENSOR X" HOME ID="HOME X" TEMPERATURE=28 |
| TEMPERATURE SENSOR X | AVERAGE TEMPERATURE | TEMPERATURE SENSOR ID= "TEMPERATURE SENSOR X" HOME ID="HOME X" TEMPERATURE=27 |
| HUMIDITY SENSOR X | AVERAGE HUMIDITY | HUMIDITY SENSOR ID= "HUMIDITY SENSOR X" HOME ID="HOME X" AVERAGE HUMIDITY=45 |
| TEMPERATURE AND HUMIDITY SENSOR Y | TEMPERATURE ALERT | TEMPERATURE SENSOR ID="TEMPERATURE AND HUMIDITY SENSOR Y" HOME ID="HOME Y" TEMPERATURE=30 |
| TEMPERATURE AND HUMIDITY SENSOR Y | AVERAGE TEMPERATURE | TEMPERATURE SENSOR ID="TEMPERATURE AND HUMIDITY SENSOR Y" HOME ID="HOME Y" AVERAGE TEMPERATURE=31 |
| TEMPERATURE AND HUMIDITY SENSOR Y | AVERAGE HUMIDITY | HUMIDITY SENSOR ID = "TEMPERATURE AND HUMIDITY SENSOR Y," HOME ID = "HOME Y," AVERAGE HUMIDITY = 65 |
| HOME GW-X | DISCOMFORT INDEX CALCULATION | HOME ID = "HOME X," DISCOMFORT INDEX = 73.8 |
| TEMPERATURE AND HUMIDITY SENSOR Y | DISCOMFORT INDEX CALCULATION | HOME ID = "HOME Y," DISCOMFORT INDEX = 82.1 |

FIG. 22

| LOWER NODE ID | UPPER NODE ID | EXECUTION ENABLE FLAG |
|---|---|---|
| TEMPERATURE SENSOR X | HOME GW-X | FALSE |
| HUMIDITY SENSOR X | HOME GW-X | FALSE |
| TEMPERATURE AND HUMIDITY SENSOR Y | MOBILE GW-Y | FALSE |
| HOME GW-X | CLOUD | TRUE |
| MOBILE GW-Y | CLOUD | TRUE |
| CLOUD | NONE | TRUE |

FIG. 23

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | HOME GW-X |
| TEMPERATURE ALERT | TEMPERATURE | NONE | | TEMPERATURE AND HUMIDITY SENSOR Y | MOBILE GW-Y |
| AVERAGE TEMPERATURE CALCULATION | TEMPERATURE | TEMPERATURE SENSOR ID | TEMPERATURE SENSOR ID="TEMPERATURE SENSOR X" | TEMPERATURE SENSOR X | HOME GW-X |
| AVERAGE TEMPERATURE CALCULATION | TEMPERATURE | TEMPERATURE SENSOR ID | TEMPERATURE SENSOR ID="TEMPERATURE AND HUMIDITY SENSOR Y" | TEMPERATURE AND HUMIDITY SENSOR Y | MOBILE GW-Y |
| AVERAGE HUMIDITY CALCULATION | HUMIDITY | HUMIDITY SENSOR ID | HUMIDITY SENSOR ID="HUMIDITY SENSOR X" | HUMIDITY SENSOR X | HOME GW-X |
| AVERAGE HUMIDITY CALCULATION | HUMIDITY | HUMIDITY SENSOR ID | HUMIDITY SENSOR ID="TEMPERATURE AND HUMIDITY SENSOR Y" | TEMPERATURE AND HUMIDITY SENSOR Y | MOBILE GW-Y |
| DISCOMFORT INDEX CALCULATION | AVERAGE TEMPERATURE AND AVERAGE HUMIDITY | HOME ID | | | (UNINSTALLED) |

FIG. 24

| OCCURRENCE NODE ID | OCCURRENCE EVENT TYPE | OCCURRENCE EVENT ATTRIBUTE |
|---|---|---|
| TEMPERATURE SENSOR X | TEMPERATURE | TEMPERATURE SENSOR ID = "TEMPERATURE SENSOR X," HOME ID = "HOME X," TEMPERATURE = 28 |
| HUMIDITY SENSOR X | HUMIDITY | HUMIDITY SENSOR ID = "HUMIDITY SENSOR X," HOME ID = "HOME X," HUMIDITY = 50 |
| TEMPERATURE AND HUMIDITY SENSOR Y | TEMPERATURE | TEMPERATURE SENSOR ID = "TEMPERATURE AND HUMIDITY SENSOR Y," HOME ID = "HOME Y," TEMPERATURE = 30 |
| TEMPERATURE AND HUMIDITY SENSOR Y | HUMIDITY | HUMIDITY SENSOR ID = "TEMPERATURE AND HUMIDITY SENSOR Y," HOME ID = "HOME Y," HUMIDITY = 70 |
| HOME GW-X | TEMPERATURE ALERT | TEMPERATURE SENSOR ID= "TEMPERATURE SENSOR X" HOME ID="HOME X" TEMPERATURE=28 |
| HOME GW-X | AVERAGE TEMPERATURE | TEMPERATURE SENSOR ID="TEMPERATURE SENSOR X" HOME ID="HOME X" AVERAGE TEMPERATURE=27 |
| HOME GW-X | AVERAGE HUMIDITY | HUMIDITY SENSOR ID="HUMIDITY SENSOR X" HOME ID="HOME X" AVERAGE HUMIDITY=45 |
| MOBILE GW-Y | TEMPERATURE ALERT | TEMPERATURE SENSOR ID="TEMPERATURE AND HUMIDITY SENSOR Y" HOME ID="HOME Y" TEMPERATURE=30 |
| MOBILE GW-Y | AVERAGE TEMPERATURE | TEMPERATURE SENSOR ID="TEMPERATURE AND HUMIDITY SENSOR Y" HOME ID="HOME Y" AVERAGE TEMPERATURE=30 |
| MOBILE GW-Y | AVERAGE HUMIDITY | HUMIDITY SENSOR ID="TEMPERATURE AND HUMIDITY SENSOR Y" HOME ID="HOME Y" AVERAGE HUMIDITY=65 |

FIG. 25

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | HOME GW-X |
| TEMPERATURE ALERT | TEMPERATURE | NONE | | TEMPERATURE AND HUMIDITY SENSOR Y | MOBILE GW-Y |
| AVERAGE TEMPERATURE CALCULATION | TEMPERATURE | TEMPERATURE SENSOR ID | TEMPERATURE SENSOR ID= "TEMPERATURE SENSOR X" | TEMPERATURE SENSOR X | HOME GW-X |
| AVERAGE TEMPERATURE CALCULATION | TEMPERATURE | TEMPERATURE SENSOR ID | TEMPERATURE SENSOR ID= "TEMPERATURE AND HUMIDITY SENSOR Y" | TEMPERATURE AND HUMIDITY SENSOR Y | MOBILE GW-Y |
| AVERAGE HUMIDITY CALCULATION | HUMIDITY | HUMIDITY SENSOR ID | HUMIDITY SENSOR ID= "HUMIDITY SENSOR X" | HUMIDITY SENSOR X | HOME GW-X |
| AVERAGE HUMIDITY CALCULATION | HUMIDITY | HUMIDITY SENSOR ID | HUMIDITY SENSOR ID= "TEMPERATURE AND HUMIDITY SENSOR Y" | TEMPERATURE AND HUMIDITY SENSOR Y | MOBILE GW-Y |
| DISCOMFORT INDEX CALCULATION | AVERAGE TEMPERATURE AND AVERAGE HUMIDITY | HOME ID | HOME ID = "HOME X" | HOME GW-X | HOME GW-X |
| DISCOMFORT INDEX CALCULATION | AVERAGE TEMPERATURE AND AVERAGE HUMIDITY | HOME ID | HOME ID="HOME Y" | MOBILE GW-Y | MOBILE GW-Y |

FIG. 34

| LOWER NODE ID | UPPER NODE ID | NONE LOAD | NETWORK COST |
|---|---|---|---|
| TEMPERATURE SENSOR X | HOME GW-X | 60% | 0 |
| HUMIDITY SENSOR X | HOME GW-X | 60% | 0 |
| TEMPERATURE AND HUMIDITY SENSOR Y | MOBILE GW-Y | 60% | 0 |
| HOME GW-X | CLOUD | 20% | 0 |
| MOBILE GW-Y | CLOUD | 50% | 0.2 |
| CLOUD | NONE | 40% | 0 |

FIG. 35

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | HOME GW-X |
| TEMPERATURE ALERT | TEMPERATURE | NONE | | TEMPERATURE AND HUMIDITY SENSOR Y | MOBILE GW-Y |
| AVERAGE TEMPERATURE CALCULATION | TEMPERATURE | TEMPERATURE SENSOR ID | TEMPERATURE SENSOR ID= "TEMPERATURE SENSOR X" | TEMPERATURE SENSOR X | HOME GW-X |
| AVERAGE TEMPERATURE CALCULATION | TEMPERATURE | TEMPERATURE SENSOR ID | TEMPERATURE SENSOR ID= "TEMPERATURE AND HUMIDITY SENSOR Y" | TEMPERATURE AND HUMIDITY SENSOR Y | MOBILE GW-Y |
| AVERAGE HUMIDITY CALCULATION | HUMIDITY | HUMIDITY SENSOR ID | HUMIDITY SENSOR ID= "HUMIDITY SENSOR X" | HUMIDITY SENSOR X | HOME GW-X |
| AVERAGE HUMIDITY CALCULATION | HUMIDITY | HUMIDITY SENSOR ID | HUMIDITY SENSOR ID= "TEMPERATURE AND HUMIDITY SENSOR Y" | TEMPERATURE AND HUMIDITY SENSOR Y | MOBILE GW-Y |
| DISCOMFORT INDEX CALCULATION | AVERAGE TEMPERATURE AND AVERAGE HUMIDITY | HOME ID | | | (UNINSTALLED) |

FIG. 36

| OCCURRENCE NODE ID | OCCURRENCE EVENT TYPE | OCCURRENCE EVENT ATTRIBUTE |
|---|---|---|
| TEMPERATURE SENSOR X | TEMPERATURE | TEMPERATURE SENSOR ID = "TEMPERATURE SENSOR X," HOME ID = "HOME X," TEMPERATURE = 28 |
| HUMIDITY SENSOR X | HUMIDITY | HUMIDITY SENSOR ID = "HUMIDITY SENSOR X," HOME ID = "HOME X," HUMIDITY = 50 |
| TEMPERATURE AND HUMIDITY SENSOR Y | TEMPERATURE | TEMPERATURE SENSOR ID = "TEMPERATURE AND HUMIDITY SENSOR Y," HOME ID = "HOME Y," TEMPERATURE = 30 |
| TEMPERATURE AND HUMIDITY SENSOR Y | HUMIDITY | HUMIDITY SENSOR ID = "TEMPERATURE AND HUMIDITY SENSOR Y," HOME ID = "HOME Y," HUMIDITY = 70 |
| HOME GW-X | TEMPERATURE ALERT | TEMPERATURE SENSOR ID= "TEMPERATURE SENSOR X" HOME ID="HOME X" TEMPERATURE=28 |
| HOME GW-X | AVERAGE TEMPERATURE | TEMPERATURE SENSOR ID="TEMPERATURE SENSOR X" HOME ID="HOME X" AVERAGE TEMPERATURE=27 |
| HOME GW-X | AVERAGE HUMIDITY | HUMIDITY SENSOR ID="HUMIDITY SENSOR SENSOR X" HOME ID="HOME X" AVERAGE HUMIDITY=45 |
| MOBILE GW-Y | TEMPERATURE ALERT | TEMPERATURE SENSOR ID="TEMPERATURE AND HUMIDITY SENSOR Y" HOME ID="YHOME " TEMPERATURE=30 |
| MOBILE GW-Y | AVERAGE TEMPERATURE | TEMPERATURE SENSOR ID="TEMPERATURE AND HUMIDITY SENSOR Y" HOME ID="HOME Y" AVERAGE TEMPERATURE=30 |
| MOBILE GW-Y | AVERAGE HUMIDITY | HUMIDITY SENSOR ID="TEMPERATURE AND HUMIDITY SENSOR Y" HOME ID="HOME Y" AVERAGE HUMIDITY=65 |

FIG. 37

| MODULE IDENTIFIER | INPUT EVENT TYPE | AGGREGATE ATTRIBUTE NAME | OCCURRENCE EVENT ATTRIBUTE | OCCURRENCE NODE ID | INSTALLATION DESTINATION NODE ID |
|---|---|---|---|---|---|
| TEMPERATURE ALERT | TEMPERATURE | NONE | | TEMPERATURE SENSOR X | HOME GW-X |
| TEMPERATURE ALERT | TEMPERATURE | NONE | | TEMPERATURE AND HUMIDITY SENSOR Y | MOBILE GW-Y |
| AVERAGE TEMPERATURE CALCULATION | TEMPERATURE | TEMPERATURE SENSOR ID | TEMPERATURE SENSOR ID= "TEMPERATURE SENSOR X" | TEMPERATURE SENSOR X | HOME GW-X |
| AVERAGE TEMPERATURE CALCULATION | TEMPERATURE | TEMPERATURE SENSOR ID | TEMPERATURE SENSOR ID= "TEMPERATURE AND HUMIDITY SENSOR Y" | TEMPERATURE AND HUMIDITY SENSOR Y | MOBILE GW-Y |
| AVERAGE HUMIDITY CALCULATION | HUMIDITY | HUMIDITY SENSOR ID | HUMIDITY SENSOR ID= "HUMIDITY SENSOR X" | HUMIDITY SENSOR X | HOME GW-X |
| AVERAGE HUMIDITY CALCULATION | HUMIDITY | HUMIDITY SENSOR ID | HUMIDITY SENSOR ID= "TEMPERATURE AND HUMIDITY SENSOR Y" | TEMPERATURE AND HUMIDITY SENSOR Y | MOBILE GW-Y |
| DISCOMFORT INDEX CALCULATION | AVERAGE TEMPERATURE AND AVERAGE HUMIDITY | HOME ID | HOME ID="HOME X" | HOME GW-X | HOME GW-X |
| DISCOMFORT INDEX CALCULATION | AVERAGE TEMPERATURE AND AVERAGE HUMIDITY | HOME ID | HOME ID="HOME Y" | MOBILE GW-Y | MOBILE GW-Y |

FIG. 41

| MODULE IDENTIFIER | INPUT EVENT TYPE | OUTPUT EVENT TYPE | AGGREGATE ATTRIBUTE NAME | EVENT TRANSMISSION INTERVAL | DATA COMPRESSION |
|---|---|---|---|---|---|
| TEMPERATURE ALERT | TEMPERATURE | TEMPERATURE ALERT | NONE | 0 | FALSE |
| AVERAGE TEMPERATURE CALCULATION | TEMPERATURE | AVERAGE TEMPERATURE | TEMPERATURE SENSOR ID | 600 | FALSE |
| AVERAGE HUMIDITY CALCULATION | HUMIDITY | AVERAGE HUMIDITY | HUMIDITY SENSOR ID | 600 | FALSE |
| DISCOMFORT INDEX CALCULATION | AVERAGE TEMPERATURE AND AVERAGE HUMIDITY | DISCOMFORT INDEX | HOME ID | 3600 | TRUE |

FIG. 46

| MODULE IDENTIFIER | INPUT EVENT TYPE | OUTPUT EVENT TYPE | AGGREGATE ATTRIBUTE NAME | REFERENCE TABLE NAME | REFERENCE COLUMN |
|---|---|---|---|---|---|
| TEMPERATURE ALERT | TEMPERATURE | TEMPERATURE ALERT | NONE | NONE | NONE |
| AVERAGE TEMPERATURE CALCULATION | TEMPERATURE | AVERAGE TEMPERATURE | TEMPERATURE SENSOR ID | TABLE A | COLUMN K COLUMN X |
| AVERAGE HUMIDITY CALCULATION | HUMIDITY | AVERAGE HUMIDITY | HUMIDITY SENSOR ID | TABLE A | COLUMN K COLUMN Y |
| DISCOMFORT INDEX CALCULATION | AVERAGE TEMPERATURE AND AVERAGE HUMIDITY | DISCOMFORT INDEX | HOME ID | TABLE A | COLUMN K COLUMN Z |

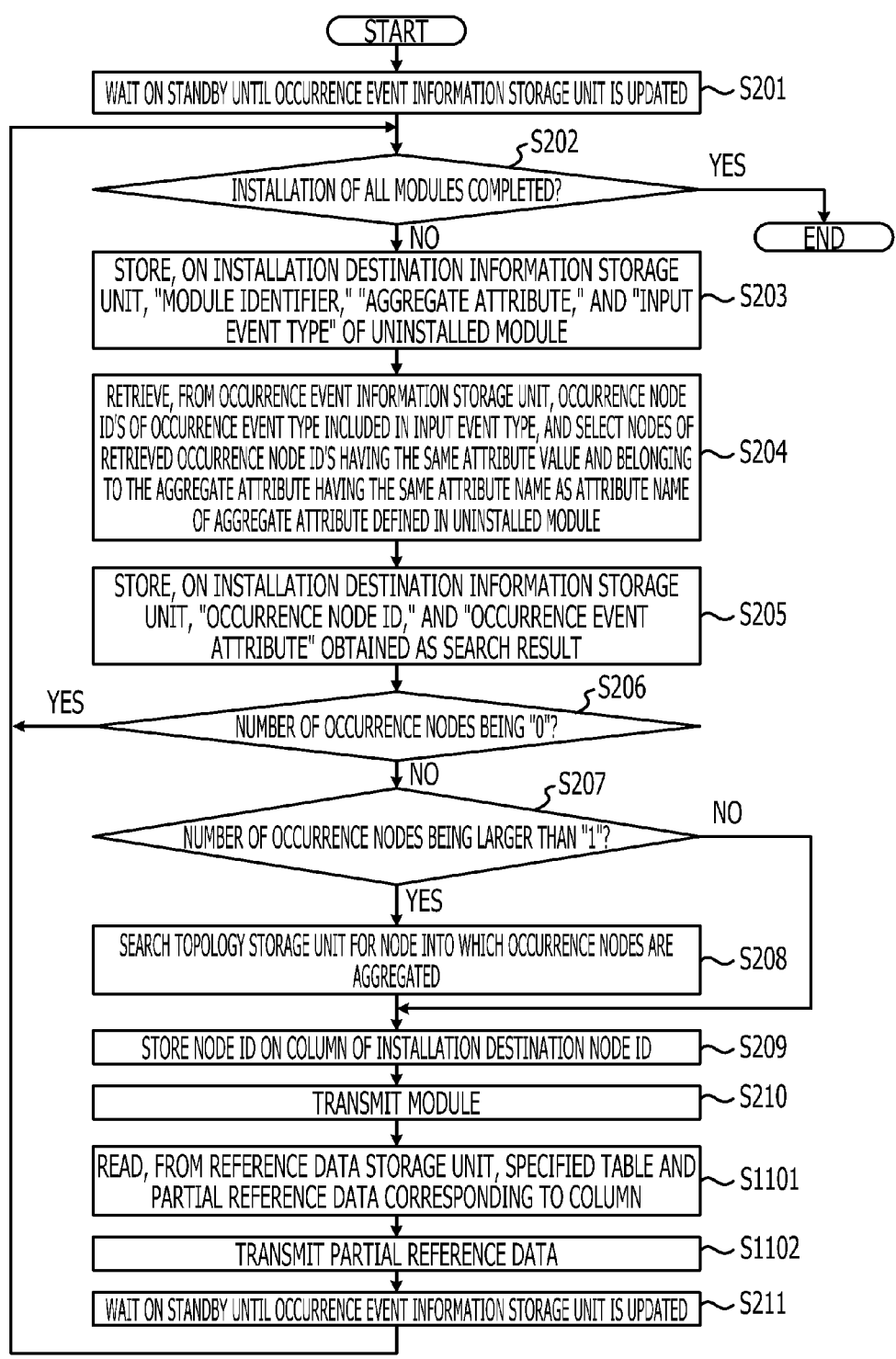

EVENT COLLECTION METHOD AND INFORMATION PROCESSING APPARATUS

CROSS-REFERENCE TO RELATED APPLICATION(S)

This application is based upon and claims the benefit of priority of the prior Japanese Patent Application No. 2011-186629, filed on Aug. 29, 2011, the entire contents of which are incorporated herein by reference.

FIELD

The embodiments discussed herein are related to an event collection method and an information processing apparatus.

BACKGROUND

A sensor network that collects sensing data acquired by a sensor node as an event is known. A variety of services that include emitting an alert or controlling a device is provided in response to an event acquired by a server node via the sensor network.

If the server node collects events from sensor nodes, all the events converge on the server node when they are notified. As a result, the load on the server node increases, and network bandwidth becomes tight as traffic on the network increases.

Techniques that have been disclosed control the load of a server node and network traffic. A system disclosed as one of the techniques improves system performance and/or resource consumption by transferring a filter agent that filters data from a consumption node to a data generation node. Another disclosed technique relates to a sensor network system that uses a script with a nested structure, and causes an intermediate node or a lower node to execute part of the script.

The above-described techniques are disclosed in Japanese Laid-open Patent Publication Nos. 2008-97603 and 2006-344017.

SUMMARY

According to an aspect of the invention, an event collection method executed by a computer that collects an event from a sensor network that is connected to a plurality of nodes that includes a sensor node that transmits a detected event and an intermediate node that relays the event, the event collection method includes: storing module definition information, the module definition information serving to manage in an associated state a module identifier that identifies a module that processes the event, an input event type that indicates a type of the event processed by the module, and an aggregate attribute name that categorizes the event that is aggregated by the module; collecting the event that occurs in the sensor node, and storing occurred event information, the occurred event information serving to manage in an associated state an occurred event type that indicates a type of the collected event, an occurred event attribute that includes an attribute name and an attribute value associated with the collected event, and an occurrence node identifier that identifies the sensor node where the collected event has occurred; collecting connection relation information in relation to the sensor node, and storing topology information that serves to manage the connection relation information; retrieving on a per process basis for the module, based on the module definition information and the occurred event information, the occurrence node identifier categorized by the attribute value that corresponds to the attribute name identified by the aggregate attribute name, with the input event type associated with the occurred event type; determining, when there is a single retrieved occurrence node identifier with respect to the process of the module, a node identified by the occurrence node identifier as an installation destination of the module that is identified by the module identifier; referencing, when there is a plurality of retrieved occurrence node identifiers with respect to the process of the module, the topology information and determining an upper node common to the plurality of occurrence node identifiers as an installation destination of the module identified by the module identifier; and installing the module at the node determined to be the installation destination of the module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a structure of information stored in a module storage unit;

FIG. 4 illustrates an example of a structure of information stored in a module definition storage unit;

FIG. 5 illustrates an example of a structure of information stored in a topology storage unit;

FIG. 6 illustrates an example of a structure of information stored in an event storage unit;

FIG. 7 illustrates an example of a structure of information stored in an occurred event information storage unit;

FIG. 8 illustrates an example of a structure of information stored in an installation destination information storage unit;

FIG. 9 illustrates a transition from the installation state indicated by the installation destination information storage unit of FIG. 8;

FIG. 10 illustrates a transition from the event occurrence state indicated by the occurred event information storage unit of FIG. 7;

FIG. 11 illustrates a transition from the installation state indicated by the installation destination information storage unit of FIG. 9;

FIG. 12 illustrates a transition from the event occurrence state indicated by the occurred event information storage unit of FIG. 10;

FIG. 14 illustrates a transition from the topology indicated by the topology storage unit of FIG. 5;

FIG. 15 illustrates a transition from the installation state indicated by the installation destination information storage unit of FIG. 9;

FIG. 16 illustrates a transition from the event occurrence state indicated by the occurred event information storage unit of FIG. 10;

FIG. 22 illustrates an example of a structure of information stored in a topology storage unit;

FIG. 23 illustrates an example of a structure of information stored in an installation destination information storage unit;

FIG. 24 illustrates an example of a structure of information stored in an occurred event information storage unit;

FIG. 25 illustrates an example of a structure of information stored in the installation destination information storage unit;

FIG. 34 illustrates an example of a structure of information stored in a topology storage unit;

FIG. 35 illustrates an example of a structure of information stored in an installation destination information storage unit;

FIG. 36 illustrates an example of a structure of information stored in an occurred event information storage unit;

FIG. 37 illustrates an example of a structure of information stored in the installation destination information storage unit;

FIG. 41 illustrates an example of a structure of information stored in a module definition storage unit;

FIG. 46 illustrates an example of a structure of information stored in a module definition storage unit;

FIG. 50 is a flowchart illustrating a module installation process of the sixth embodiment.

DESCRIPTION OF EMBODIMENTS

The above-described related art techniques still remain unable to control network traffic as described below.

The two related art systems have difficulty in responding to a change of topology of the sensor network caused by addition or removal of a sensor node or relay node. If the topology of the sensor network changes, the systems are unable to appropriately re-install the filter agent or the script in the lower node. A change in the topology of the sensor network increases the network traffic compared to before the change in the two systems.

Embodiments provide an event collection method and an information processing apparatus to control network traffic.

Embodiments of an event collection method and an information processing apparatus are described in detail below with reference to the drawings. The embodiments are not limited to techniques described herein. The embodiments may be combined to an extent that does not interfere with the process content of each of the embodiments.

First Embodiment

[System Configuration]

Figure 1:
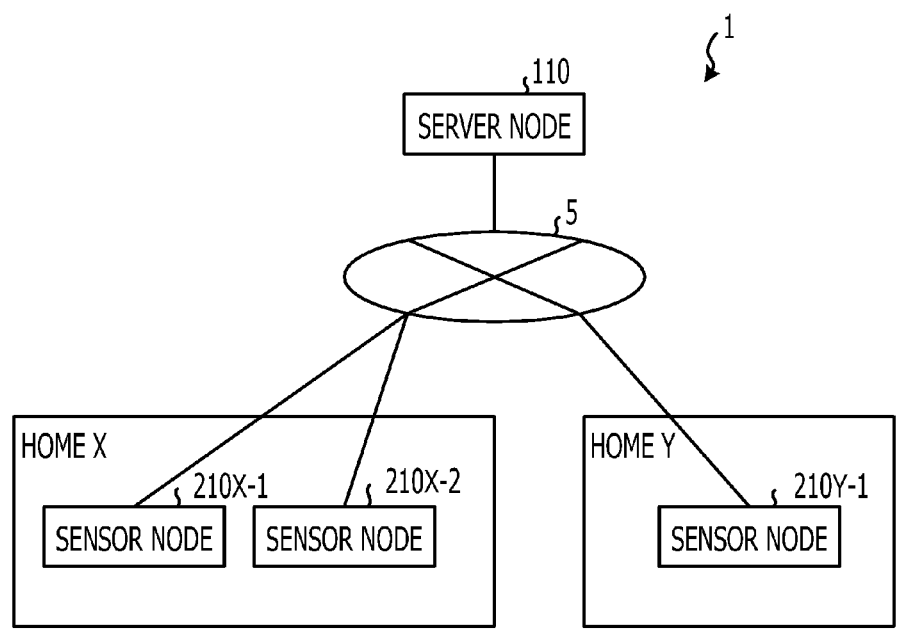
FIG. 1 illustrates a system configuration of a sensor network system of a first embodiment.

A system configuration of a sensor network system 1 of a first embodiment is described first. FIG. 1 illustrates the system configuration of the sensor network system 1 of the first embodiment. The sensor network system 1 of FIG. 1 collects, as an event, sensing data sensed by a sensor node 210, and provides a variety of services in response to the collected event.

As illustrated in FIG. 1 the sensor network system 1 includes a server node 110, and sensor nodes 210X-1, 210X-2, and 210Y-1. In FIG. 1, event data is collected by the server node 110 from the sensor nodes 210X-1 and 210X-2 arranged at home X, and the sensor node 210Y-1 arranged at home Y. Below, sensor nodes 210X-1, 210X-2, and 210Y-1 are also referred to generically as the "sensor node 210" without differentiating one sensor node from another.

The sensor node 210 is connected to the server node 110 via a network 5 in a manner that allows the sensor node 210 and the server node 110 to communicate with each other. The network 5 is not limited to a wireless or a wired network. The network 5 may be a communication network such as the Internet, a local area network (LAN), or a virtual private network (VPN). As illustrated in FIG. 1, three sensor nodes 210 are included. The number of sensor nodes is optional as long as at least a plurality of sensor nodes is used.

The sensor node 210 is a communication terminal with a sensor. The sensor node 210 may be one of a variety of apparatuses including a personal computer, a peripheral device of the personal computer, an audio-visual apparatus, a cell phone, a portable terminal of personal handyphone system, or a home electrical appliance. The sensors mounted on the sensor node 210 may be an environment sensor, such as a temperature sensor that measures temperature, a humidity sensor that measures humidity, and a temperature and humidity sensor that measures both temperature and humidity. The examples of the sensor mounted on the sensor node 210 are herein environment sensors. Sensors installed in the sensor node 210 may further include a global positioning system (GPS) sensor, an acceleration sensor, and a gyro sensor.

The server node 110 functions as a root node of the sensor network, and provides a variety of services in response to an event. In one operation example, the server node 110 performs distributed processing on an event by installing a module, which processes an event received from the sensor node 210, at a node lower than the server node 110. The module incorporates a filtering process and an aggregate process that act on an event that serves as a trigger for a service providing process that is to be executed by a service providing application.

The server node 110 of the embodiment acquires a topology of the sensor network. If the topology is changed, the server node 110 of the embodiment acquires from each node the type of the event output from the node, and an attribute name and an attribute value of an aggregate attribute that is an aggregate of a plurality of nodes including the node. The server node 110 of the embodiment selects nodes that output events whose types are a portion out of the types of a plurality of events input to the module and, out of the nodes, are nodes that have the same attribute value and belong to an aggregate attribute that has the same attribute name as that of an aggregate attribute defined in the module. If a plurality of nodes is selected, the server node 110 references the topology of the sensor network, and installs the module at an upper node that has the plurality of nodes thereunder.

Even if the topology of the sensor network changes, from among the nodes on which the events aggregated by the module are collected, the server node 110 of the embodiment may place a module in a distributed fashion on a node that collects sensing data and is as low as possible. The server node 110 of the embodiment installs the module on the node over the sensor network appropriately, thereby reducing traffic on the sensor network. The server node 110 of the embodiment installs the modules in a distributed fashion, and may prevent the concentration of load on the server node 110.

As illustrated in FIG. 1, the sensor node 210 is illustrated as a node lower than the server node 110. As is described below, a gateway node that relays communication between the sensor node 210 and the server node 110 may be included as a node lower than the server node 110. In the discussion that follows, the sensor node 210 and a gateway node 310 to be discussed below may also generally referred to as a "lower node", distinct from the server node 110, which is the root node.

[Server Node Configuration]

Figure 2:
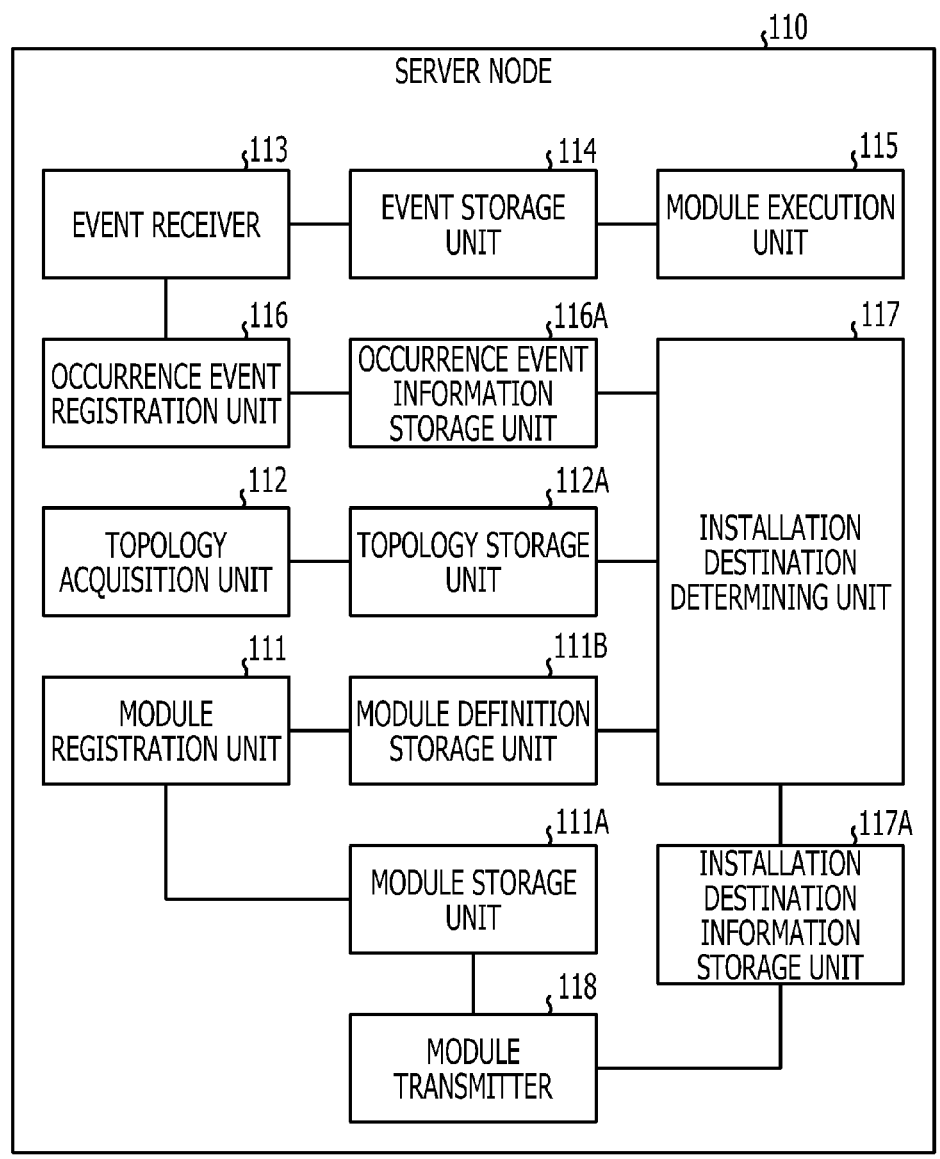
FIG. 2 is a functional block diagram of a server node of the first embodiment.

A functional structure of the server node of the embodiment is described. FIG. 2 is a functional block diagram illustrating the server node 110 of the first embodiment. The server node 110 includes a variety of functional blocks included in a related-art server, such as an input device and an audio output device, in addition to the functional blocks of FIG. 2.

As illustrated in FIG. 2, the server node 110 includes module registration unit 111, module storage unit 111A, module definition storage unit 111B, topology acquisition unit 112, and topology storage unit 112A. The server node 110 further includes event receiver 113, event storage unit 114, module execution unit 115, occurred event registration unit 116, and occurred event information storage unit 116A. The server node 110 further includes installation destination information storage unit 117A, installation destination determining unit 117, and module transmitter 118.

The module registration unit 111 is a processing unit for registering modules. In one operation example, the module registration unit 111 receives the uploading of a module that is programmed by a developer so that an event, which serves as a trigger for a variety of processes that provide services, is filtered and aggregated. Upon receiving the module, the module registration unit 111 registers the module uploaded to the server node 110 on the module storage unit 111A. The module registration unit 111 further receives a definition of the uploaded module via a terminal device used by the developer, and then registers the definition of the received module in the module definition storage unit 111B to be discussed below.

The module storage unit 111A is a storage unit that stores the module. In one operation example, if a module is uploaded, the module registration unit 111 registers the module in the module storage unit 111A. In another operation example, the module storage unit 111A is referenced by the module transmitter 118 to be discussed below when installing the module in a lower node such as the sensor node 210 or the gateway node 310.

In one operation example, the module storage unit 111A stores data associated with a module identifier and a binary code. The module identifier identifies the module. An identifier may be attached to the module. For example, a function name is attached to a module programmed using the C language, and a class name is attached to a module programmed using Java (registered trademark). The binary code refers to compiled binary data that is a module body.

FIG. 3 illustrates a structure for information stored in the module storage unit 111A. In the example of FIG. 3, binary codes are associated with four module identifiers: "temperature alert", "average temperature calculation", "average humidity calculation", and "discomfort index calculation". The "temperature alert" is a module identifier for a module that emits an alert if the temperature becomes equal to or higher than a specific value. If the "temperature alert" module is installed on a lower node, an event transmitted from the lower node to the server node 110 is filtered. The "average temperature calculation" is the module identifier of a module that calculates the average value of temperatures during a specific period of time, and "average humidity calculation" is the module identifier of a module that calculates the average humidity during the specific period of time. The "discomfort index" is a module identifier for a module that calculates a discomfort index from the average temperature and the average humidity. If the modules "average temperature calculation", "average humidity calculation", and "discomfort index" are installed on lower nodes, the events transmitted from the lower node to the server node 110 are aggregated.

As illustrated in FIG. 3, the binary code of the modules are stored. However, the module is not necessarily stored in binary code. Data may be stored in a format other than binary code. For example, if the module is a script language, text data in which a script is described may be stored. Uncompiled source code may be stored. If using uncompiled source code, the source code may be compiled when the module is installed on a lower node, such as the sensor node 210. Alternatively, the source code may be compiled on a node lower than the installation destination.

The module definition storage unit 111B stores a definition of the module. In one operation example, if the definition of a module is uploaded together with the module, the module registration unit 111 registers the definition of the module in the module definition storage unit 111B. In another operation example, the module definition storage unit 111B is referenced by the installation destination determining unit 117, which is to be discussed later, to determine the installation destination of the module.

In one operation example, the module definition storage unit 111B stores data in which the module identifier, input event type, output event type, and aggregate attribute of a module are associated with each other. The "input event type" is the type of an event that serves as an input to the process executed by the module. The "output event type" is the type of an event that serves as an output of the process executed by the module. The "aggregate attribute name" is the name of an aggregate attribute that serves as a framework under which a plurality of nodes is aggregated.

FIG. 4 illustrates an example of a structure of information stored in the module definition storage unit 1118. The module "temperature alert" illustrated in the example in FIG. 4 indicates that a temperature event is input and that an alert event is output. An aggregate attribute name is not attached to the "temperature alert" because only one temperature event is input each time through the process. The module "average temperature calculation" illustrated in FIG. 4 indicates that a plurality of temperature events is input and that a single average temperature event is output. A temperature sensor ID is attached as an aggregate attribute name to the "average temperature calculation" because a plurality of temperature events are input in a single process, and a temperature sensed by the same sensor node 210 is handled. For the same reason, in the example of the module "average temperature calculation", a humidity sensor ID is attached as an aggregate attribute name to the module "average humidity calculation" illustrated in FIG. 4. The example of a module "discomfort index calculation" illustrated in FIG. 4 indicates that the average temperature event and the average humidity event are input and that a discomfort index event is output. A home ID is attached as an aggregate name to the "discomfort index calculation" because the average temperature event and the average humidity event are input to a single process, and because a temperature sensed by the nodes that make up the sensor node 210 arranged in the same home are handled.

The topology acquisition unit 112 acquires information on the connection configuration of the sensor network, that is, a topology of the sensor network. In one operation example, the topology acquisition unit 112 acquires, from each lower node in the sensor network, which includes the sensor node 210 and the gateway node 310, inter-node connection information that represents which upper node the lower node is connected to. The topology acquisition unit 112 then registers the inter-node connection information acquired from the lower nodes in the topology storage unit 112A, which is described below. The following discussion is based on the premise that the inter-node connection information is acquired by detecting that the lower node automatically recognizes an upper node using a protocol, such as universal plug and play (UPnP). Alternatively, the server node 110 may recognize the connection state with the lower node.

The topology storage unit 112A stores the topology of the sensor network. In one operation example, the topology storage unit 112A stores the inter-node connection information that is registered as the topology by the topology acquisition unit 112 if the inter-node connection information is acquired from the lower node. In another operation example, the topology storage unit 112A is referenced by the installation destination determining unit 117, which is discussed below, in order to determine the installation destination of the module.

In one operation example, the topology storage unit 112A stores data that includes a lower node ID and an upper node ID associated together. The "lower node ID" herein refers to an identifier that identifies a lower node, and the "upper node ID" herein refers to an identifier that identifies an upper node.

FIG. 5 illustrates an example of a structure of information stored in the topology storage unit 112A. In the example of FIG. 5, the sensor node 210X-1 of FIG. 1 is the temperature sensor X arranged in the home X, the sensor node 210X-2 is the humidity sensor X arranged in the mode X, and the sensor node 210Y-1 is the temperature and humidity sensor Y arranged in the home Y. As illustrated in FIG. 5, the upper nodes of the temperature sensor X, the humidity sensor X, and the temperature and humidity sensor Y are respectively the server node 110, which is the cloud. The example indicates that a relay node, such as the gateway node 310, is not present between the sensor node 210 and the server node 110.

The event receiver 113 is a processing unit that receives an event. In one operation example, the event receiver 113 stores the event in the event storage unit 114, which is discussed below, upon receiving the event from a lower node such as the sensor node 210 or the gateway node 310. The event receiver 113 then outputs the event received from the lower node to the occurred event registration unit 116, which is discussed below. The event receiver 113 is not restricted to receiving an unprocessed event that is sensed by the sensor node 210. The event may be processed by a module installed on a lower node, and the event receiver 113 may receive the processed event.

The event storage unit 114 is a storage unit that stores an event. The event storage unit 114 is so arranged as to be referenced by a service providing application that provides a service that is triggered by the generation of an event.

In one operation example, when an event is received from a lower node, the event is registered in the event storage unit 114 by the event receiver 113. In another operation example, if a module has processed an event, the event storage unit 114 stores for registration an event produced after processing is performed by the module execution unit 115, which is discussed later.

In one operation example, the event storage unit 114 stores and associates together data that includes an event type name, event occurrence time, and an event attribute. The "event type" is an identifier that identifies the type of an event. The "event occurrence time" is the occurrence time of the event, that is, the time the event was sensed by the sensor node 210. The "event attribute" is the properties or origin of the event. For example, the event attribute may include a set of attribute data. The event attribute data may include sensing data collected as an event, a type of processed data, and an aggregate attribute that is an aggregate of a plurality of nodes that include an occurrence node where the event occurred. The following discussion is based on the premise that each piece of attribute data included in the event attribute is constructed of a pair of an attribute name and an attribute value.

FIG. 6 illustrates an example of a structure of information stored in the event storage unit 114. A first record illustrated in FIG. 6 indicates an event in that the temperature sensor X at the home X measured a temperature of 28 degrees Celsius at 12:00:00, on Jul. 13, 2011. A second record illustrated in FIG. 6 indicates an event in that the humidity sensor X at the home X measured a humidity of 50% at 12:00:10 on Jul. 13, 2011. A third record illustrated in FIG. 6 indicates an event in that the temperature and humidity sensor Y at the home Y measured a temperature of 30 degrees Celsius at 12:00:20 on Jul. 13, 2011. A fourth record illustrated in FIG. 6 indicates an event in that the temperature and humidity sensor Y at the home Y measured a humidity of 70% at 12:00:30 on Jul. 13, 2011.

The events thus stored in the event storage unit 114 are referenced as a trigger to execute a service providing process by the service providing application. FIG. 6 illustrates an unprocessed event sensed by the sensor node 210. However, if the module is installed on a lower node, a new event processed by the module may also be stored.

The module execution unit 115 controls and executes a module installed on the server node 110. In one operation example, if the event receiver 113 has received an event, the module execution unit 115 determines whether a module having the received event as an input event type is installed. If the module is installed on the server node 110, the module execution unit 115 executes the module, thereby processing the event. The module execution unit 115 then stores in the event storage unit 114 data processed by the module as a new event.

The occurred event registration unit 116 registers an occurred event that occurs on a lower node, such as the sensor node 210 or the gateway node 310. In one operation example, if the event receiver 113 has received an event, the occurred event registration unit 116 determines whether the received event has already been registered as an occurred event in the occurred event information storage unit 116A, which is described below. If the received event has not been registered as an occurred event, the occurred event registration unit 116 registers the event received from the lower node in the occurred event information storage unit 116A.

The occurred event information storage unit 116A stores information related to an occurred event. The occurred event information storage unit 116A is so arranged as to manage events that occur on a lower node such as the sensor node 210 or the gateway node 310.

In one operation example, if an event has been received from a lower node, the occurred event registration unit 116 registers the occurred event in the occurred event information storage unit 116A. In another operation example, installation destination determining unit 117, which is discussed below, references the occurred event information storage unit 116A in order to determine the installation destination of the module.

In one operation example, the occurred event information storage unit 116A stores data that is associated together and includes an occurrence node ID, an occurred event type and an occurred event attribute. The "occurrence node ID" is an identifier that identifies an occurrence node. The "occurred event type" is an identifier that identifies the type of the occurred event. The "occurred event attribute" is an event attribute of the occurrence node.

FIG. 7 illustrates an example of a structure of information stored in the occurred event information storage unit 116A. A first record of FIG. 7 indicates the occurrence of an event in that the temperature sensor X measures the temperature at home X. A second record of FIG. 7 indicates the occurrence of an event in that the humidity sensor X measures the humidity at the home X. A third record of FIG. 7 indicates the occurrence of an event in that the temperature and humidity sensor Y measures the temperature at home Y. A fourth record of FIG. 7 indicates the occurrence of an event in that the temperature and humidity sensor Y measures the humidity at the home Y. In the example of FIG. 7, the occurred event is an unprocessed event that is detected by the sensor node 210. If the module is installed on a lower node, a new event processed by the module may be stored as an occurred event.

The installation destination information storage unit 117A stores information related to the installation destination of the module. In one operation example, if the topology of the sensor network has changed, the installation destination determining unit 117 accesses the installation destination information storage unit 117A.

In one operation example, the installation destination information storage unit 117A stores data that is associated together and includes module identifier, input event type, aggregate attribute name, occurred event attribute, occurrence node ID, and installation destination ID. The "installation destination node ID" refers to an identifier that identifies the location at which the module is to be installed, such as the sensor node 210, the gateway node 310 that is discussed below, or the server node 110.

FIG. 8 illustrates an example of a structure of information stored in the installation destination information storage unit 117A. The table illustrated in FIG. 8 may result when the installation destination determining unit 117 starts determining the installation destination of the module in response to the detection of a change in the topology of the sensor network. In other words, FIG. 8 illustrates a table that may be obtained when the module identifier, the input event type, and the aggregate attribute name for all columns have been copied from the module definition storage unit 111B. A filling operation for the remaining columns that include the installation destination node ID is described below with reference to FIGS. 9 and 11.

The installation destination determining unit 117 determines the installation destination of the module. In one operation example, the installation destination determining unit 117 performs a process described below if the topology storage unit 112A has been updated, that is, if the topology of the sensor network has changed.

In the process, the installation destination determining unit 117 writes onto columns that correspond to the installation destination information storage unit 117A column data for the module identifier, the input event type, and the aggregate attribute name from the definition of the module stored in the module definition storage unit 111B. The columns of the occurred event attribute, the occurrence node ID, and the installation destination node ID remain blank on the installation destination information storage unit 117A, as illustrated in FIG. 8.

The installation destination determining unit 117 then retrieves, from the occurrence node IDs stored in the occurred event information storage unit 116A, an occurrence node ID that has an occurred event type that is included in the input event type of the uninstalled module. The installation destination determining unit 117 further selects, from the retrieved occurrence node IDs, nodes that have the same attribute value and belong to an aggregate attribute that has the same attribute name as the attribute name of the aggregate attribute defined in the uninstalled module. The installation destination determining unit 117 then writes the occurrence node ID thus retrieved and the occurred event attribute that corresponds to the occurrence node ID to the installation destination information storage unit 117A.

If a plurality of occurrence node IDs are registered in the installation destination information storage unit 117A, the installation destination determining unit 117 performs the following process. The installation destination determining unit 117 retrieves the node ID of the lowest node among the sensor nodes 210 or the gateway node 310 that corresponds to the occurrence node IDs and that are all registered as lower nodes under the upper node IDs stored in the topology storage unit 112A. The installation destination determining unit 117 then registers the node ID thus retrieved in the installation destination node ID column.

If a single occurrence node ID is registered in the installation destination information storage unit 117A, no room is available to select a node for module installation. The installation destination determining unit 117 registers the previously retrieved occurrence node ID in the installation destination node ID column.

If the installation destination node ID is registered in the installation destination information storage unit 117A, the module transmitter 118, which is discussed below, transmits the module stored in the module storage unit 111A to the node that corresponds to the installation destination node ID.

The installation destination determining unit 117 then waits on standby until the occurred event information storage unit 116A is updated with an occurred event newly acquired from a lower node through the module installation. The installation destination determining unit 117 then repeats the module installation until no more uninstalled modules are available.

If no occurrence node ID at all is registered in the installation destination information storage unit 117A, there is a possibility that the occurred events from the lower nodes are not fully registered in the occurred event information storage unit 116A. If so, the installation destination determining unit 117 waits until the occurred event information storage unit 116A is updated, and then repeats the module installation.

The module transmitter 118 transmits a module to a lower node such as the sensor node 210 or the gateway node 310. In one operation example, if the installation destination determining unit 117 registers the installation destination node ID in the installation destination information storage unit 117A, the module transmitter 118 transmits the module stored in the module storage unit 111A to the node corresponding to the installation destination node ID.

(1) First Specific Example of Module Installation

Referring to FIGS. 9 through 12, a first specific example of the module installation is described. FIG. 9 illustrates a transition from an installation state indicated by the installation destination information storage unit 117A of FIG. 8. FIG. 10 illustrates a transition from an event occurrence state indicated by the occurred event information storage unit 116A of FIG. 7. FIG. 11 illustrates a transition from an installation state indicated by the installation destination information storage unit 117A of FIG. 9. FIG. 12 illustrates a transition from an event occurrence state indicated by the occurred event information storage unit 116A of FIG. 10.

When the module installation starts, the installation destination determining unit 117 compares the occurred event type column in the occurred event information storage unit 116A illustrated in FIG. 7 with the input event type column in the installation destination information storage unit 117A illustrated in FIG. 8. The input event types of the module "temperature alert" and the module "average temperature calculation" match the occurred event types of the occurrence node ID "temperature sensor X" and the occurred event node "temperature and humidity sensor Y", that is, the input event types and the occurred event types are "temperature". The input event type of the module "average humidity calculation" matches the occurred event types of the occurrence node ID "humidity sensor X" and the occurrence node ID "temperature and humidity sensor Y", that is, the input event type and the occurred event type are "humidity".

The installation destination determining unit 117 retrieves the occurrence node IDs "temperature sensor X", "humidity sensor X", and "temperature and humidity sensor Y", for the modules "temperature alert", "average temperature calculation", and "average humidity calculation".

The installation destination determining unit 117 further compares the aggregate attributes defined in the uninstalled modules "temperature alert", "average temperature calculation", and "average humidity calculation" with the occurred event attributes that correspond to the occurrence node IDs "temperature sensor X", "humidity sensor X", and "temperature and humidity sensor Y".

The module "temperature alert" does not perform aggregate processing of events, but performs a filtering process on the events. If the filtering process is performed on the event, the aggregate attribute name is not defined in the module, and the same lower node becomes a target of the filtering process. Therefore, the module identifier is related to the occurrence node ID on a one-to-one correspondence basis. In such a case, out of the occurrence node IDs, nodes having the same attribute value and belonging to an aggregate attribute that has the same attribute name as the attribute name of an aggregate attribute defined in an uninstalled module, are not retrieved, but it is preferable to install the module at the node where the event occurs. In an exceptional case, attribute values belonging to an aggregate attribute that have the same attribute name as an attribute name of an aggregate attribute defined in the uninstalled modules, out of the occurrence node IDs, are considered to be equal. As illustrated in FIG. 9, the "temperature sensor X" and the "temperature and humidity sensor Y", which are occurrence nodes where the events occur, become installation destinations of the module "temperature alert".

Each of the modules "average temperature calculation", and "average humidity calculation" executes an aggregate process on events. If an aggregate process is performed on the events, the aggregate attribute name is defined in the module. In the calculation of the average value, the same lower node becomes a target of the aggregate process, and the module identifier is associated with the occurrence node ID on a one-to-one correspondence basis. Although nodes that have the same attribute value and belong to an aggregate attribute that has the same attribute name as an attribute name of an aggregate attribute defined in the module, which is among the occurrence node IDs, are retrieved, a plurality of occurrence node IDs are not retrieved. As illustrated in FIG. 9, the "temperature sensor X" and the "temperature and humidity sensor Y" as the occurrence nodes where the events occur are determined as installation destinations for the modules "average temperature calculation", and "average humidity calculation"

In this way, the modules "temperature alert", "average temperature calculation", and "average humidity calculation" are installed on the occurrence nodes for the temperature sensor X, the humidity sensor X, and the temperature and humidity sensor Y. As a result, the server node 110 is newly notified of a temperature alert event, an average temperature event, and an average humidity event, which are results of the occurrence nodes processing temperature events and humidity events. As illustrated in cross-hatched portions of FIG. 10, the occurred event registration unit 116 registers in the occurred event information storage unit 116A occurred events with occurred event types "temperature alert", "average temperature calculation", and "average humidity calculation".

When the occurred events are newly added to the occurred event information storage unit 116A as illustrated in FIG. 10, the installation destination determining unit 117 performs the following process. The installation destination determining unit 117 compares the occurred event type column of the records in the occurred event information storage unit 116A of FIG. 10 with the column of the input event type column for the uninstalled module of the installation destination information stored in the installation destination information storage unit 117A of FIG. 9.

The input event type of the module "discomfort index calculation" matches the occurred event type of the occurrence node ID "temperature sensor X" and the occurrence node ID "humidity sensor X", that is, both the input event type and the occurred event type are "average temperature" and "average humidity". Also, the input event type of the "discomfort index calculation" module matches the occurred event type of the occurrence node ID "temperature sensor Y", that is, both the input event type and the occurred event type are "average temperature" and "average humidity". As a result, in relation to the module "discomfort index calculation", the installation destination determining unit 117 selects three occurrence nodes with occurrence node IDs "temperature sensor X", "humidity sensor X", and "temperature and humidity sensor Y".

The installation destination determining unit 117 selects nodes that have the same attribute value and belong to an aggregate attribute with the same attribute name as an attribute name of an aggregate attribute defined in an uninstalled module among the occurrence nodes that have occurrence node IDs "temperature sensor X", "humidity sensor X", and "temperature and humidity sensor Y".

Since the module "discomfort index calculation" executes aggregate process on events, the attribute name "home ID" of the aggregate attribute is defined in the module "discomfort index calculation" as illustrated in FIG. 4. As illustrated in FIG. 10, the occurred event attributes of the occurrence node IDs "temperature sensor X" and "humidity sensor X" include attribute data of the aggregate attribute that includes both the attribute name "home ID" and the attribute value "home X". Also as illustrated in FIG. 10, the occurred event attribute of the occurrence node ID "temperature and humidity sensor Y" includes attribute data of the aggregate attribute that includes both the attribute name "home ID" and the attribute value "home Y".

Each of the occurrence nodes that has the occurrence node ID "temperature sensor X", "humidity sensor X", or "temperature and humidity sensor Y" has "home ID" as an attribute name of the aggregate attribute. The occurrence node IDs "temperature sensor X" and "humidity sensor X" have "home X" as an attribute value of the aggregate attribute while the occurrence node ID "temperature and humidity sensor Y" has "home Y" as an attribute value of the aggregate attribute.

The "discomfort index calculation" module is arranged independently, that is, one copy for the home X and another copy for the home Y. More specifically, as illustrated in a cross-hatched portion in FIG. 11, the occurrence node IDs "temperature sensor X" and "humidity sensor X" and the occurred event attributes thereof are written in the columns that correspond to the module "discomfort index calculation" in the installation destination information storage unit 117A. Also as illustrated in a cross-hatched portion in FIG. 11, The occurrence node ID "temperature and humidity sensor Y" and the occurred event attributes thereof are written on the columns that correspond to the module "discomfort index calculation" in the installation destination information storage unit 117A.

The module "discomfort index calculation" for the home X includes the two occurrence nodes that correspond to the occurrence node IDs "temperature sensor X" and "humidity sensor X". For this reason, of the upper node IDs stored in the topology storage unit 112A of FIG. 5 that have the two occurrence nodes of occurrence node IDs "temperature sensor X" and "humidity sensor X" thereunder, the node ID of the lowest node is retrieved. For example, as illustrated in FIG. 5, each occurrence node that corresponds to the occurrence node IDs "temperature sensor X" and "humidity sensor X" is connected to the server node 110, which is a cloud, and a relay node, such as the gateway node 310, is not present between the occurrence node and the server node 110. As a result, "cloud" is stored in the column of the installation destination node ID for the module "discomfort index calculation" for the home X as illustrated in FIG. 11. In this way, the module "discomfort index calculation" for the home X is installed in the server node 110.

On the other hand, the module "discomfort index calculation" for the home Y includes only the occurrence node ID "temperature and humidity sensor Y". It is preferable to install the module on the "temperature and humidity sensor Y" as an occurrence node. As illustrated in FIG. 11, the "temperature and humidity sensor Y" is stored in the installation destination node ID column of the module "discomfort index calculation" for the home Y. As a result, the module "discomfort index calculation" for the home Y is installed on the sensor node 210Y-1.

The module "discomfort index calculation" for the home X of FIG. 11 is installed on the cloud, and the module "discomfort index calculation" for the home Y is installed on the temperature and humidity sensor Y. The server node 110, as the cloud, processes the average temperature event and the average humidity event. The server node 110 is newly notified of the discomfort index event which is generated by the temperature and humidity sensor Y processing the average temperature event and the average humidity event. As illustrated in a cross-hatched portion in FIG. 12, the occurred event of the occurred event type "discomfort index" that has "cloud" as the occurrence node ID is registered in the occurred event information storage unit 116A. Also, the occurred event of the occurred event type "discomfort index" that has "temperature and humidity sensor Y" as the occurrence node ID is registered in the occurred event information storage unit 116A.

(2) Second Specific Example of Module Installation

Figure 13:
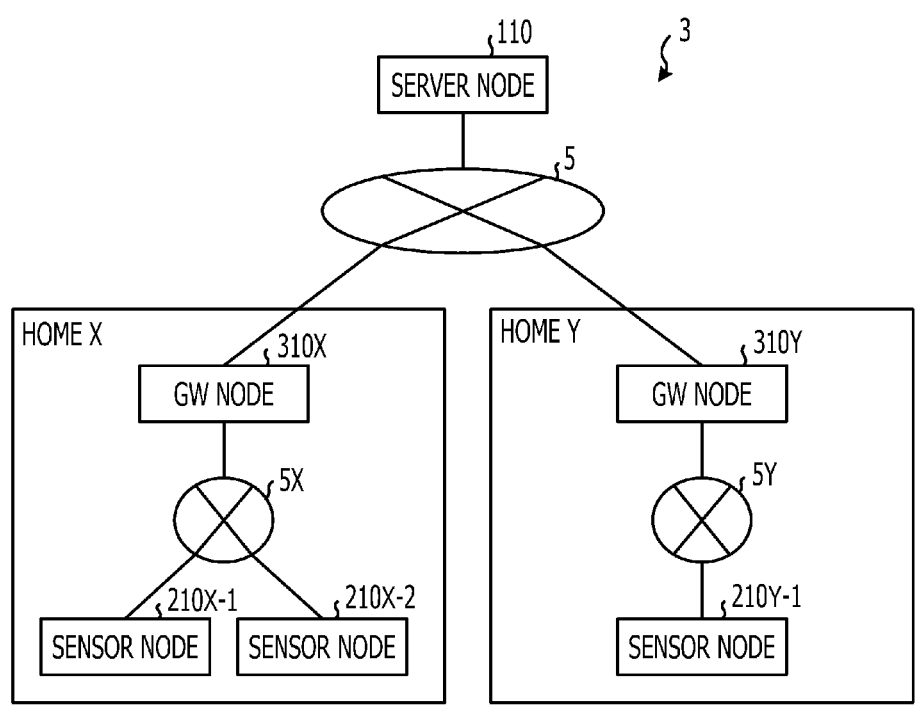
FIG. 13 illustrates an example of a topology change of the sensor network of FIG. 1.

A second specific example of the module installation is described below with reference to FIGS. 13 to 16. FIG. 13 illustrates an example of a topology change of the sensor network of FIG. 1. FIG. 14 illustrates a transition from the topology from the topology storage unit 112A of FIG. 5. FIG. 15 illustrates a transition from the installation state indicated by the installation destination information storage unit 117A of FIG. 9. FIG. 16 illustrates a transition from the event occurrence state indicated by the occurred event information storage unit 116A of FIG. 10.

A sensor network system 3 of FIG. 13 is different from the sensor network system 1 of FIG. 1 in that the sensor network system 3 additionally includes a gateway node 310X between the server node 110 and the sensor nodes 210X-1 and 210X-2. The sensor network system 3 is further different from the sensor network system 1 in that the sensor network system 3 additionally includes a gateway node 310Y between the server node 110 and the sensor node 210Y-1. The following discussion is based on the premise that the gateway node 310X arranged at the home X is a home gateway, and that the gateway node 310Y arranged at the home Y is a mobile gateway.

The sensor nodes 210X-1 and 210X-2 are connected for communication to the gateway node 310X via a home network 5X. The sensor node 210Y-1 is connected for communication to the gateway node 310Y via a wireless local area network (LAN) 5Y.

If the gateway node 310X and the gateway node 310Y are added, the topology of the sensor network changes. The connection configuration of FIG. 5 where the temperature sensor X and the humidity sensor X are directly connected to the server node 110 as the cloud changes in topology to the connection configuration of FIG. 14 where the temperature sensor X and the humidity sensor X are connected to the server node 110 via the home gateway X. Furthermore, the connection configuration of FIG. 5 where the temperature and humidity sensor Y is directly connected to the server node 110 as the cloud changes in topology to the connection configuration of FIG. 14 where the temperature and humidity sensor Y is connected to the server node 110 via the mobile gateway Y. As illustrated in FIG. 14, the gateway node 310X of FIG. 13 is the home gateway X arranged at the home X, and the gateway node 310Y is the mobile gateway Y arranged at the home Y.

If the topology of the sensor network has changed as illustrated in FIG. 14, the installation setting of a module stored in the installation destination information storage unit 117A is discarded, and each module is re-installed starting with the module installation start state of FIG. 8.

Because the second specific example of the module installation is identical to the first specific example of the module installation in the transition phase from the installation start of the module of FIG. 8 to the installation state of the module illustrated in FIG. 9, and discussion thereof second specific example is left out of the second specific example. Also, the second specific example of the module installation is identical to the first specific example of the module installation in the transition phase from the event occurrence state of FIG. 7 to the event occurrence state of FIG. 10, and discussion thereof is left out of the second specific example.

If the occurred events as cross-hatched in FIG. 10 are newly added to the occurred event information storage unit 116A, the module installation state of FIG. 9 is updated to the module installation state of FIG. 15. The module installation state of FIG. 15 is different from the module installation state of FIG. 11 in that the module "discomfort index calculation" for the home X is installed not in the cloud but in the home gateway X as in the installation state of FIG. 15.

The module "discomfort index calculation" for the home X is installed not at the cloud but at the home gateway X because the home gateway X is on the lower node side of the upper nodes that have the occurrence node IDs "temperature sensor X" and "humidity sensor X" thereunder. On the other hand, the module "discomfort index calculation" for the home Y is installed on the temperature and humidity sensor Y regardless of the addition of the mobile gateway Y. This is because even if the mobile gateway Y is added, there is no change in the fact that the occurrence node is only the temperature and humidity sensor Y.

If the installation position of the module "discomfort index calculation" for the home X as illustrated in FIG. 15 is changed from the cloud to the home gateway X, the average temperature event and the average humidity event, which had been processed at the cloud, come to be processed at the home gateway X. Along with this change, as illustrated by cross-hatching in FIG. 16, the occurred event of the occurred event type "discomfort index" that has "home gateway X" as the occurrence node ID is registered in the occurred event information storage unit 116A.

A variety of integrated circuits or electronic circuits may be used for the module registration unit 111, the topology acquisition unit 112, the event receiver 113, the module execution unit 115, the occurred event registration unit 116, the installation destination determining unit 117, and the module transmitter 118. For example, integrated circuits may include an application specific integrated circuit (ASIC). Electronic circuits may include a central processing unit (CPU) or a micro processing unit (MPU).

A semiconductor memory device or a storage device may be used for storage units that include the module storage unit 111A, the module definition storage unit 111B, the topology storage unit 112A, the event storage unit 114, the occurred event information storage unit 116A, and the installation destination information storage unit 117A. The semiconductor memory devices may include video random access memory (VRAM), random access memory (RAM), read only memory (ROM), or flash memory. The storage devices may include a hard disk or an optical disk.

[Configuration of a Sensor Node]

Figure 17:
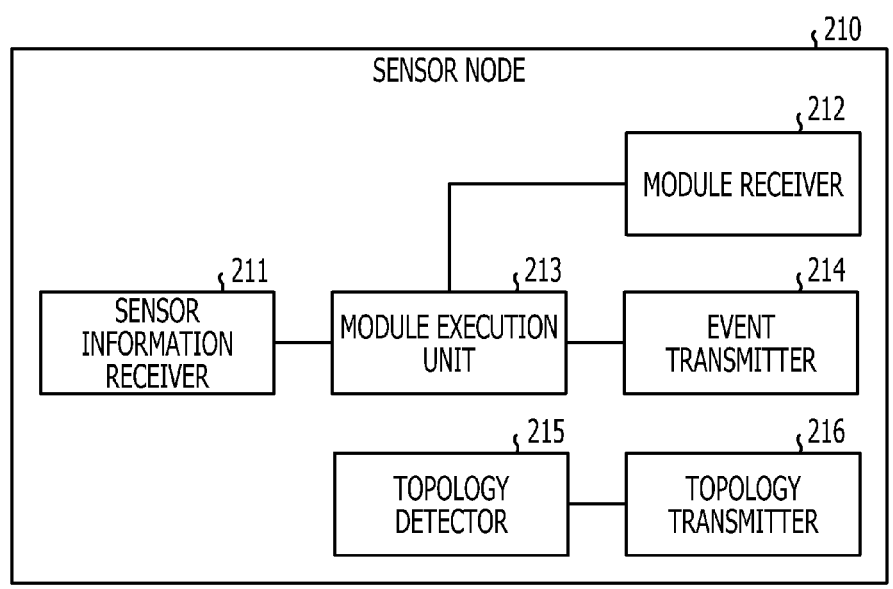
FIG. 17 is a functional block diagram illustrating a sensor node of the first embodiment.

A function of the sensor node 210 of an embodiment is described below. FIG. 17 is a functional block diagram of the sensor node 210 of the first embodiment. The sensor node 210 of FIG. 17 includes sensor information receiver 211, module receiver 212, module execution unit 213, event transmitter 214, topology detector 215, and topology transmitter 216.

The sensor information receiver 211 receives sensor information from a sensor device housed in or attached to the sensor node 210. In one operation example, the sensor information receiver 211 receives information of temperature measured by a temperature sensor if the temperature sensor is housed in the sensor node 210. In another operation example, the sensor information receiver 211 receives information of humidity measured by a humidity sensor if the humidity sensor is housed in the sensor node 210. If a plurality of sensor devices are housed in the sensor node 210, one sensor information receiver 211 may be arranged on a per sensor device basis.

The module receiver 212 receives a module from the server node 110. The module received by the module receiver 212 is output to the module execution unit 213 that controls the execution of the module.

The module execution unit 213 controls the execution of a module installed on the sensor node 210. In one operation example, if sensor information is received by the sensor information receiver 211, the module execution unit 213 determines whether a module having the received sensor information as an input event type is installed on the sensor node 210. If the module is installed on the sensor node 210, the module execution unit 213 processes the event by executing the module. The module execution unit 213 then outputs to the event transmitter 214 data processed by the module as a new event. If the module is not installed on the sensor node 210, the module execution unit 213 directly outputs the sensor information to the event transmitter 214 without processing the sensor information.

The event transmitter 214 transmits an event to an upper node. In one operation example, the event transmitter 214 transmits to the upper node either an event processed by the module execution unit 213 or sensor information received from the sensor device by the sensor information receiver 211. When sensor information is transmitted to the upper node, the event transmitter 214 attaches to the sensor information the node ID of the sensor node 210 as an occurrence node as well as the attribute name and attribute value of the aggregate attribute that serves as an aggregate of a plurality of nodes that includes the sensor node 210. The event transmitter 214 then transmits to the upper node the event that includes the node ID of the occurrence node and the aggregate attribute together with the sensor information.

The attribute name and attribute value of the "aggregate attribute" may be built into a device driver at the manufacturing stage of the sensor node 210. If the sensor device is a temperature sensor, a humidity sensor, or a temperature and humidity sensor, the device driver may be constructed so that aggregate attributes such as "home ID", "room ID", and "floor ID", as bases for measuring temperature and humidity, are attached to the event. When a communication connection is established between the sensor node 210 and the server node 110, the sensor node 210 may automatically retrieve from the server node 110 the attribute value of the home ID of another sensor node 210 that was previously attached. If a room layout of the home X or the home Y is registered in the server node 110, the sensor node 210 may automatically retrieve the attribute value of the aggregate attribute such as "room ID" and "floor ID", in addition to "home ID".

The topology detector 215 detects, as a topology, connection information of the nodes that indicate whether the sensor node 210 is connected to an upper node. In one operation example, the topology detector 215 detects a topology using a protocol, such as UPnP, to either recognize that the gateway node 310 is present in the same local network as that of the sensor node 210, or to receive a notification of the presence of the gateway node 310 from the server node 110. The network connection with the server node 110 may be established by setting an address, such as a URL, of the server node 110.

The topology transmitter 216 transmits the topology detected by the topology detector 215 to the server node 110. In one operation example, the topology transmitter 216 transmits to the server node 110 the node ID of the upper node connected to the sensor node 210.

[Configuration of a Gateway Node]

Figure 18:
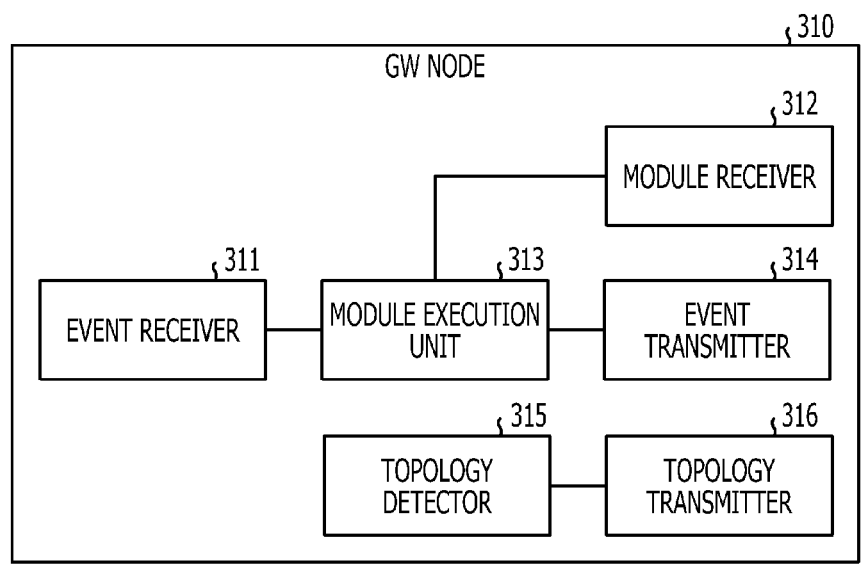
FIG. 18 is a functional block diagram illustrating a gateway node of the first embodiment.

A functional structure of a gateway node 310 of the first embodiment is described below. FIG. 18 is a functional block diagram illustrating a gateway node 310 of the first embodiment. The gateway node 310 of FIG. 18 includes event receiver 311, module receiver 312, module execution unit 313, event transmitter 314, topology detector 315, and topology transmitter 316.

The event receiver 311 receives an event. In one operation example, the event transmitter 314 receives an event from a sensor node 210 or a gateway node 310, which are a lower node.

The module receiver 312 receives a module from the server node 110. The module received by the module receiver 312 is output to the module execution unit 313 that controls the execution of the module.

The module execution unit 313 controls the execution of the module that is installed on the gateway node 310. In one operation example, if the event receiver 311 receives an event, the module execution unit 313 determines whether a module that has the received event as an input event type has been installed on the gateway node 310. If the module is installed on the gateway node 310, the module execution unit 313 executes the module, thereby processing the event. The module execution unit 313 then outputs to the event transmitter 314 data processed by the module as a new event. If the module is not installed on the gateway node 310, the module execution unit 313 directly outputs sensor information to the event transmitter 314 without processing the sensor information.

The event transmitter 314 transmits an event to an upper node. In one operation example, the event transmitter 314 transmits to the upper node an event processed by the module execution unit 313 or an event received by the event receiver 311.

The topology detector 315 detects, as a topology, connection information of the nodes that indicates whether the gateway node 310 is connected to an upper node or not. In one operation example, the topology detector 315 detects a topology using a protocol, such as UPnP, to either recognize another gateway node 310 present in the same local network as that of the gateway node 310, or receive notification of the presence of the other gateway node 310 from the server node 110. The network connection with the server node 110 may be established by setting an address, such as a URL, of the server node 110.

The topology transmitter 316 transmits the topology detected by the topology detector 315 to the server node 110. In one operation example, the topology transmitter 316 transmits to the server node 110 the node ID of the upper node connected to the gateway node 310.

[Processing Flow]

A flow of the process of the sensor network system of an embodiment is described below. A general process that is executed by the sensor node 210 is described first, followed by the discussion of a module installation process that is executed by the server node 110.

(1) General Process

Figure 19:
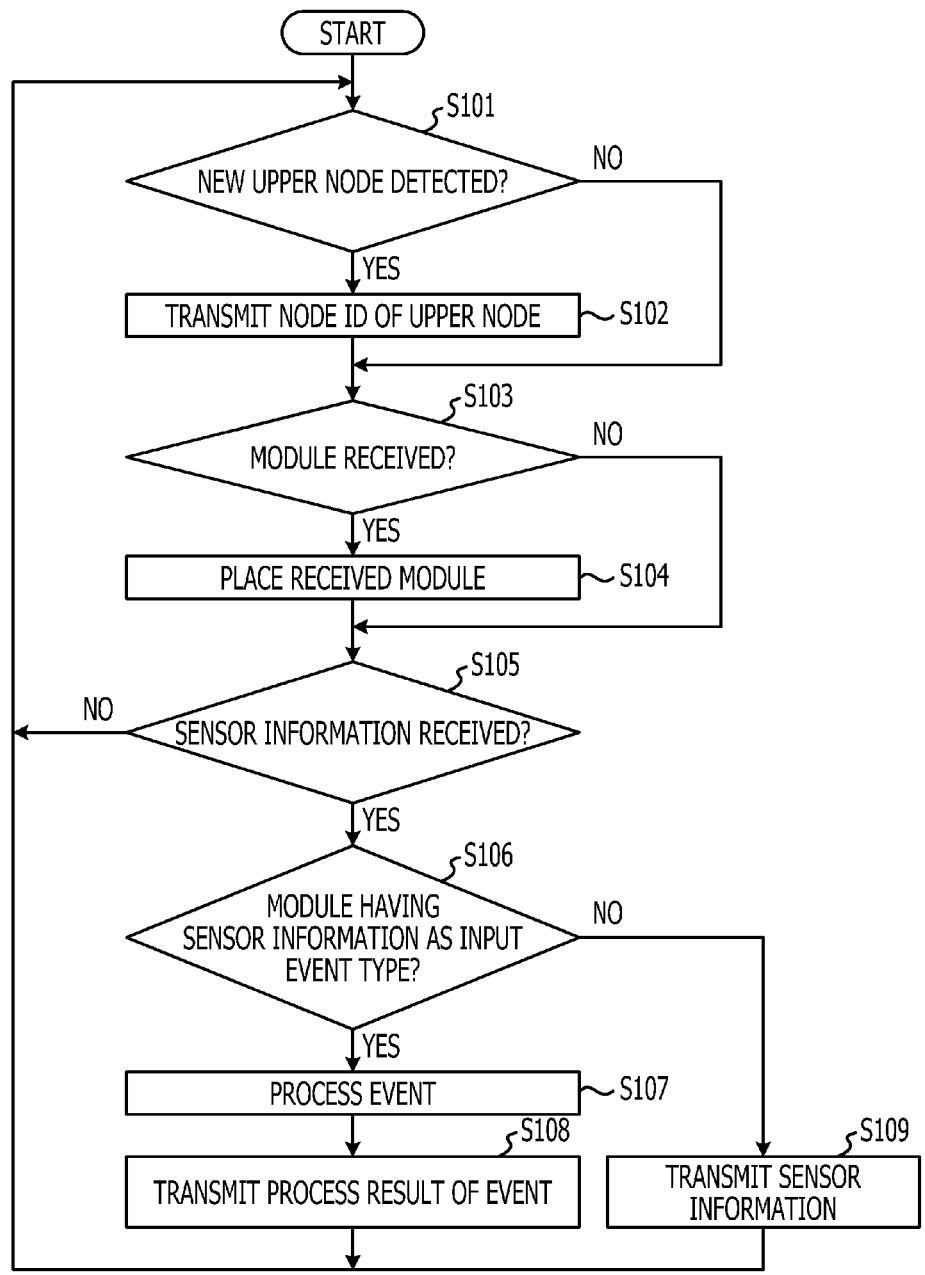
FIG. 19 is a flowchart illustrating an overall process of the sensor node of the first embodiment.

FIG. 19 is a flowchart illustrating the general process of the sensor node 210 of the first embodiment. The general process is executed repeatedly as long as the sensor node 210 remains powered on.

As illustrated in FIG. 19, if a new upper node is detected (yes in step S101), the sensor node 210 transmits the node ID of the upper node to the server node 110 (S102). If no new upper node is detected (no in step S101), the sensor node 210 skips step S102 and proceeds to step S103.

If a module is received from the server node 110 (yes in step S103), the sensor node 210 installs the module received from the server node 110 (step S104). If no module is received (no in step S103), the sensor node 210 skips step S104 and proceeds to step S105.

If sensor information is received from the sensor device (yes in step S105), the sensor node 210 determines whether a module that has the sensor information as an input event type is installed (step S106). If no sensor information is received (no in step S105), the sensor node 210 returns to step S101

If the module is installed (yes in step S106), the sensor node 210 executes the module, thereby processing the event (step S107). The sensor node 210 transmits the processed event to the upper node (step S108).

If no module is installed (no in step S106), the sensor node 210 adds the occurrence node ID and aggregate attribute to the sensor information received from the sensor device, and then transmits the sensor information with the occurrence node ID and aggregate attribute added thereto to the upper node (step S109).

In this way, the sensor node 210 repeats steps S101 through S109 until the sensor node 210 is powered off.

The general process of the sensor node 210 has been discussed. The general process executed by the gateway node 310 as a relay node remains the same except step S105. More specifically, the general process of the gateway node 310 is identical to the general process of the sensor node 210 except that in step S105 an event is received in place of sensor information.

(2) Module Installation Process

Figure 20:
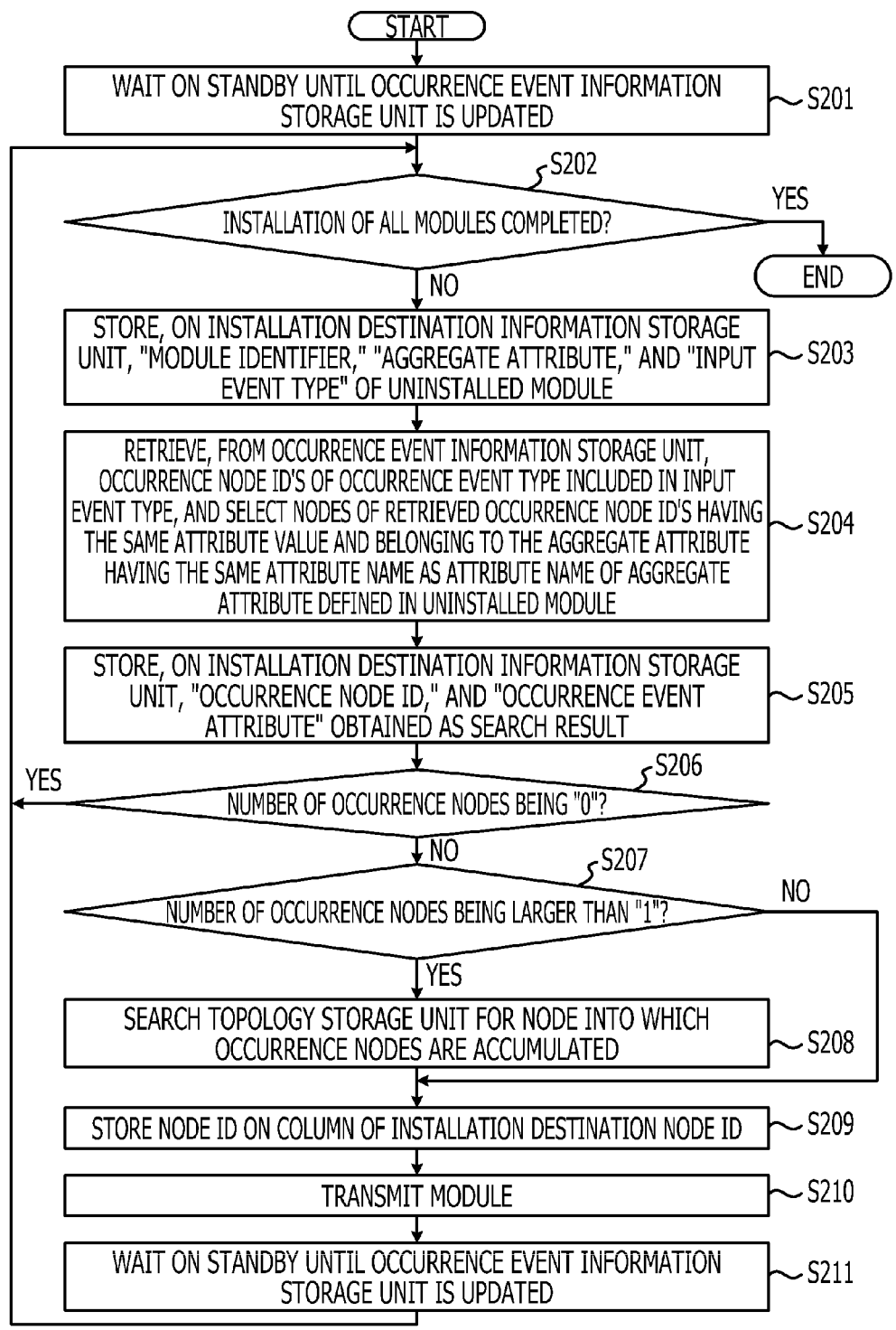
FIG. 20 is a flowchart illustrating a module installation process of the first embodiment.

The module installation process of an embodiment is described below. FIG. 20 is a flowchart illustrating the module installation process of the first embodiment. The module installation process is initiated when the topology of the sensor network changes.

As illustrated in FIG. 20, the server node 110 waits until the occurred event information storage unit 116A has been updated (step S201). When the occurred event information storage unit 116A is updated, the server node 110 determines whether all the modules have been installed (step S202). Since no module has been installed (no in step S202), the server node 110 proceeds to step S203.

The server node 110 stores the column data of the module identifier, the input event type, and the aggregate attribute name out of the definition of the module, which is stored in the module definition storage unit 111B, in the corresponding columns of the installation destination information storage unit 117A (step S203).

After performing operation in step S203, the server node 110 performs an operation in step S204 as below. The server node 110 retrieves out of the occurrence node IDs stored in the occurred event information storage unit 116A, an occurrence node ID of an occurred event type that is included in the input event type of an uninstalled module. The server node 110 further selects, from the retrieved occurrence node IDs, nodes that have the same attribute value and belong to the aggregate attribute that has the same attribute name as the attribute name of the aggregate attribute defined in the uninstalled module.

The server node 110 writes in the installation destination information storage unit 117A the retrieved occurrence node ID and the occurred event attribute that corresponds to the occurrence node ID (step S205).

If the number of occurrence node IDs is 0 (yes in step S206), there is a possibility that the occurred events from the lower nodes are not fully registered in the occurred event information storage unit 116A. In such a case, the server node 110 returns to step S202.

If the number of occurrence node IDs is plural (yes in step S207), the server node 110 performs an operation in step S208 as discussed below. The server node 110 retrieves, out of the upper node IDs stored in the topology storage unit 112A, a node ID of the lowest node of upper nodes that have the sensor nodes 210 or the gateway node 310 corresponding to the occurrence node IDs all registered as lower nodes thereunder. The server node 110 then registers the node ID thus retrieved in the column of the installation destination node ID (step S209).

If the number of occurrence node IDs is one (no in step S207), there are not enough nodes to install a module on. The server node 110 registers the previously retrieved occurrence node ID in the installation destination node ID column (step S209).

The server node 110 transmits the module stored in the module storage unit 111A to the node corresponding to the installation destination node ID (step S210). The server node 110 waits until the occurred event information storage unit 116A is updated (step S211), and then returns to step S202.

The server node 110 repeats operations in steps S203 through S211 until all the modules are installed (no in step S202). When all the modules have been installed (yes in step S202), the server node 110 completes the process.

[Effect of the First Embodiment]

Even if the topology of the sensor network changes, the server node 110 of the embodiment installs modules in a distributed fashion on a node that is as low as possible and that collects sensing data from nodes where events aggregated by the modules are collected. Therefore, the server node 110 of the embodiment may appropriately install modules on the nodes over the sensor network, and thereby traffic over the sensor network may be eased. The server node 110 of the embodiment installs the modules in a distributed fashion, which may thereby prevent load concentration on the server node 110.

The server node 110 of the embodiment installs the module on the lowest node of the upper nodes. The server node 110 of the embodiment may install the module on a node closest to the occurrence node from among the nodes where the events aggregated by the module concentrate. The server node 110 may appropriately install the modules in a distributed fashion.

Second Embodiment

The network traffic may be eased by installing a module that processes an event on a node as low as possible in the first embodiment, but a lower node having the module installed thereon may be unable to execute the module. In that regard, the second embodiment relates to a method to install a module only when the lower node is able to execute the module.

[Server Node Configuration]

Figure 21:
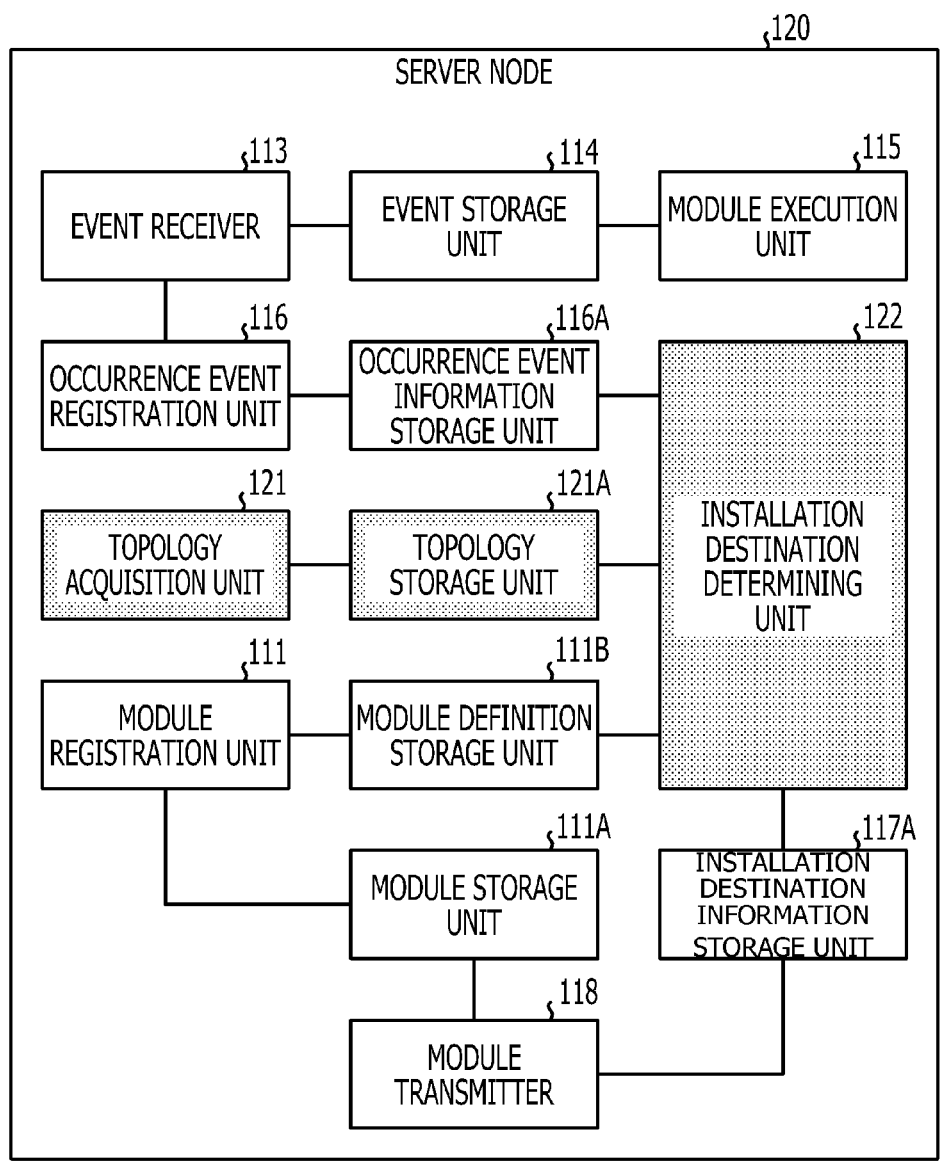
FIG. 21 is a functional block diagram illustrating a server node of a second embodiment.

FIG. 21 is a functional block diagram illustrating a server node 120 of the second embodiment. The difference between the server node 120 of FIG. 21 and the server node 110 of FIG. 2 is in part of the process executed by the topology acquisition unit 121 and the installation destination determining unit 122, and information stored in the topology storage unit 121A. In the discussion that follows, functional blocks that are the same as those of the first embodiment are designated with the same reference numerals and discussion thereof is omitted.

The topology acquisition unit 121 is the same as the topology acquisition unit 112 of FIG. 2 in that the connection information of the nodes that represents which upper node the lower node is connected to is retrieved, but is different from the topology acquisition unit 112 of FIG. 2 in that an execution enable flag indicating whether the lower node is able to process the event is further retrieved.

The topology storage unit 121A is different from the topology storage unit 112A of FIG. 2 in that the topology storage unit 121A associates the execution enable flag with a lower node ID and an upper node ID. The "execution enable flag" is a flag that indicates whether the lower node is enabled to execute the module, and has a value of true or false. FIG. 22 illustrates an example of a structure of information stored in the topology storage unit 121A. As illustrated in FIG. 22, none of the lower nodes of the temperature sensor X, the humidity sensor X, and the temperature and humidity sensor Y execute the module, and the module is executed by only the upper nodes, which includes the home gateway X, and the mobile gateway Y, and the root node as the cloud.

The installation destination determining unit 122 is different from the installation destination determining unit 117 of FIG. 2 as described below. Even if the node is selected through matching of the occurred event type and the input event type and matching of the attribute name and attribute value of the aggregate attribute, the installation destination determining unit 122 does not determine the node as the module installation destination unless the execution enable flag is true.

(3) A Specific Example 3 of the Module Installation

A specific example 3 of the module installation is described below with reference to FIGS. 23 through 25. FIGS. 23 and 25 illustrate examples of structures of information stored in the installation destination information storage unit 117A. FIG. 24 illustrates an example of a structure of information stored in the occurred event information storage unit 116A.

Because the execution enable flag "false" is set on each of the lower nodes, no modules are installed on the lower nodes of the temperature sensor X, the humidity sensor X, and the temperature and humidity sensor Y, as illustrated in FIG. 23. Instead, the modules "temperature alert", "average temperature calculation", and "average humidity calculation" are installed on the home gateway X and the mobile gateway Y. As a result, the server node 120 is newly notified of a temperature alert event, average temperature event, and average humidity event, into which the home gateway X and the mobile gateway Y as relay nodes have processed one or more temperature events and one or more humidity events. As denoted by cross-hatched portions of FIG. 24, the occurred event registration unit 116 registers the occurred events for occurred event types "temperature alert", "average temperature", and "average humidity" on the occurred event information storage unit 116A.

If the cross-hatched occurred events as illustrated in FIG. 24 are newly added to the occurred event information storage unit 116A, the module installation state of FIG. 23 is updated to the module installation state of FIG. 25. The module installation state of FIG. 25 is different from the module installation state of FIG. 15 in that the module "discomfort index calculation" for the home Y is installed on the mobile gateway Y rather than the temperature and humidity sensor Y. The module "discomfort index calculation" for the home Y is installed on the mobile gateway Y because the temperature and humidity sensor Y is unable to execute the module, as "false" is set in the execution enable flag of the temperature and humidity sensor Y.

[A Flow of the Process]

A flow of the process of the network sensor system of the embodiment is described below. A general process executed by the sensor node 210 is described first, followed by a discussion of a module installation process executed by the server node 120.

(1) General Process

Figure 26:
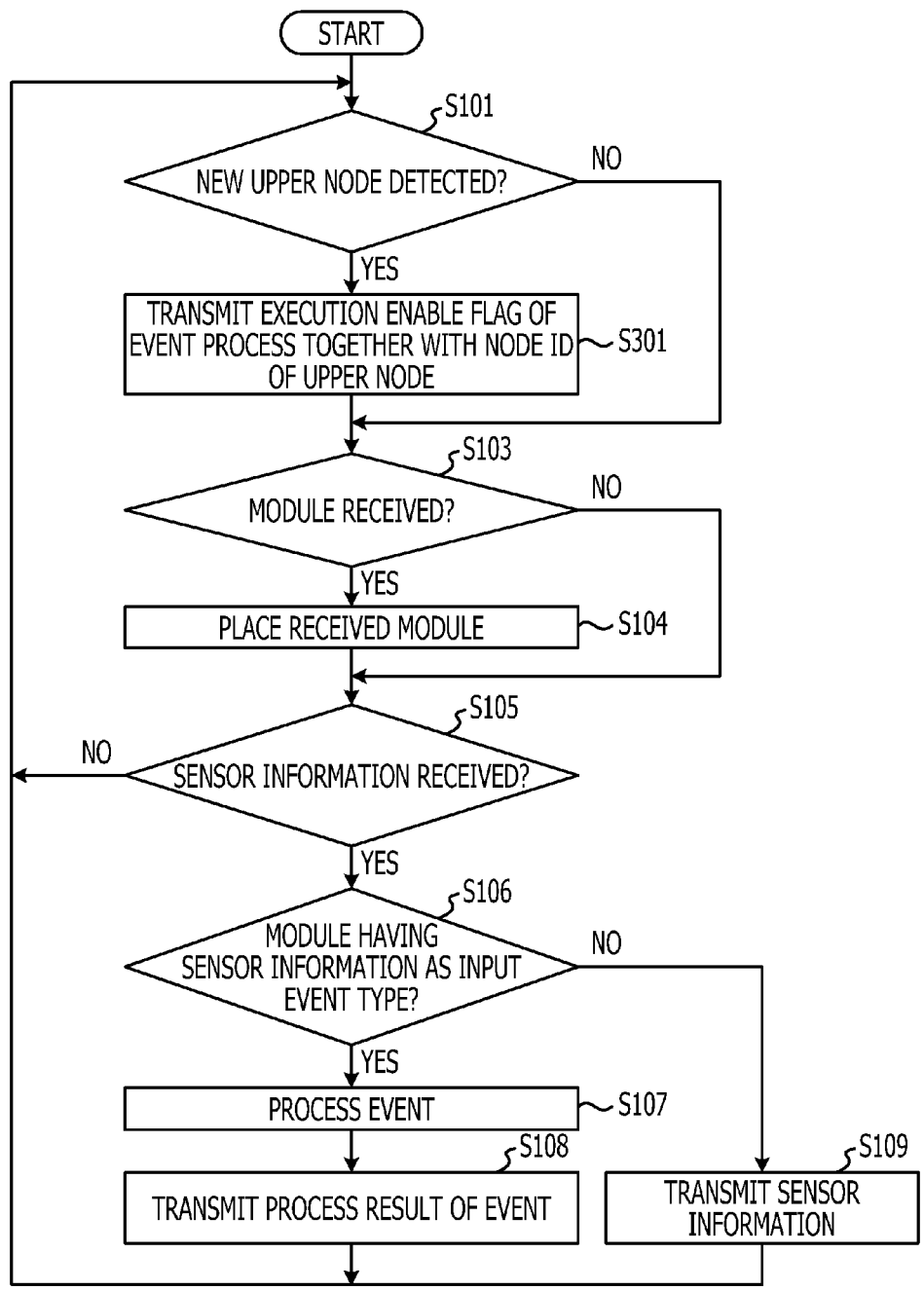
FIG. 26 is a flowchart illustrating an overall process of a sensor node of the second embodiment.

FIG. 26 is a flowchart illustrating the general process of the sensor node 210 of the first embodiment. The general process is executed repeatedly as long as the sensor node 210 remains powered on. The general process of the sensor node 210 of FIG. 26 is different from the general process of the sensor node 210 of FIG. 19 in that step S102 is replaced with step S301 in the general process of FIG. 26.

As illustrated in FIG. 26, if a new upper node is detected (yes in step S101) the sensor node 210 transmits the node ID of the upper node to the server node 110, and also transmits to the server node 120 the execution enable flag related to the process of the event (step S301). If no new upper node is detected (no in step S101), the sensor node 210 skips step S301 and proceeds to step S103.

If a module is received from the server node 120 (yes in step S103), the sensor node 210 installs the module received from the server node 120 (step S104). If no module is received (no in step S103), the sensor node 210 skips step S104 and proceeds to step S105.

If sensor information is received from a sensor device (yes in step S105), the sensor node 210 determines whether a module that has the sensor information as an input event type is installed (step S106). If no sensor information is received (no in step S105), the sensor node 210 returns to step S101

If the module is installed (yes in step S106), the sensor node 210 executes the module, thereby processing the event (step S107). The sensor node 210 transmits the processed event to the upper node (step S108).

If no module is installed (no in step S106), the sensor node 210 adds the occurrence node ID and aggregate attribute to the sensor information received from the sensor device, and then transmits the sensor information with the occurrence node ID and aggregate attribute added thereto to the upper node (step S109).

Subsequent to step S108 or step S109, the sensor node 210 returns to step S101. The sensor node 210 repeats steps S101 through S109 until the sensor node 210 is powered off.

The general process of the sensor node 210 has been discussed. The general process executed by the gateway node 310 as a relay node remains the same except for step S105. More specifically, the general process of the gateway node 310 is identical to the general process of the sensor node 210 except that an event instead of sensor information is received in step S105.

(2) Module Installation Process

Figure 27:
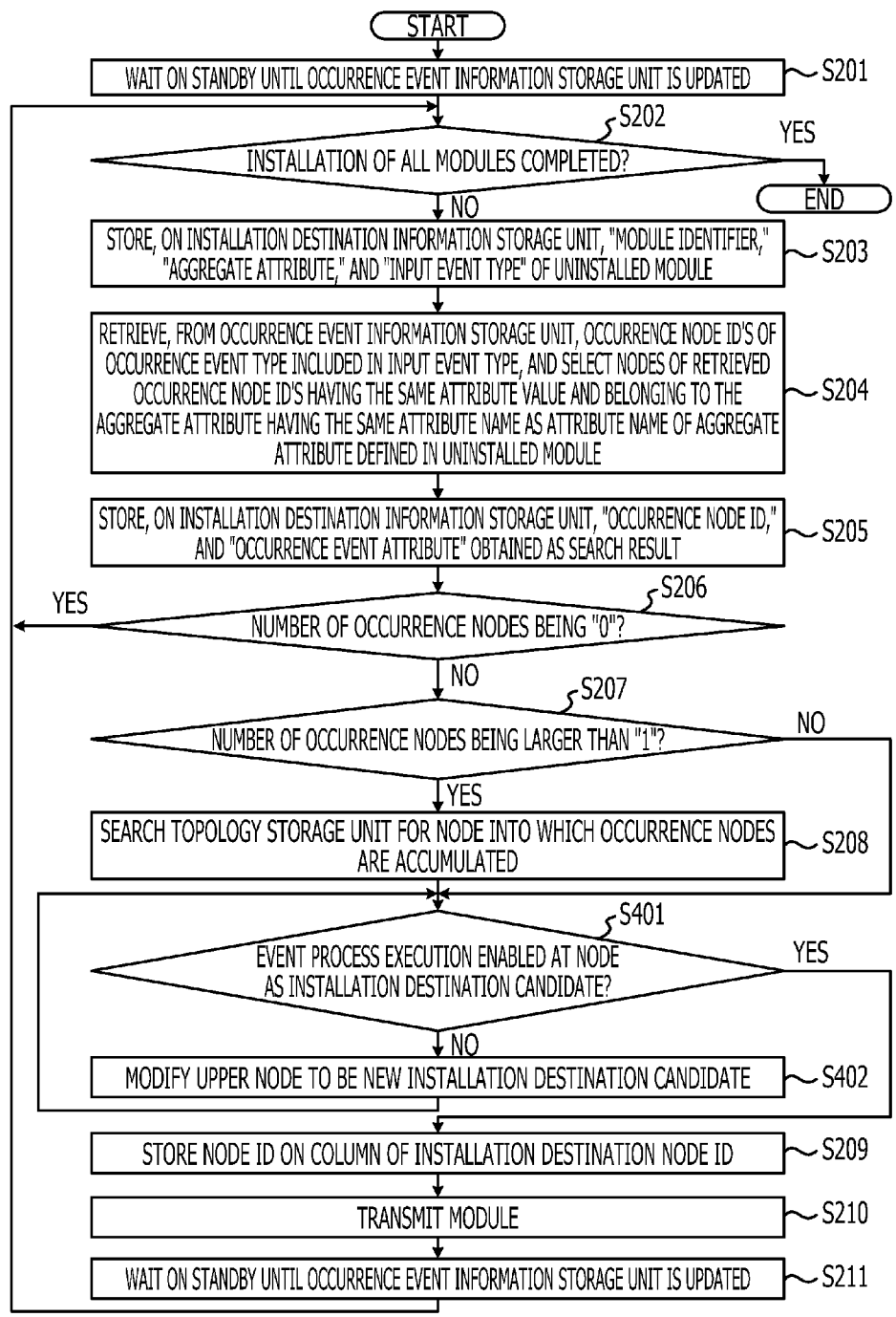
FIG. 27 is a flowchart illustrating a module installation process of the second embodiment.

The module installation process of the embodiment is described below. FIG. 27 is a flowchart illustrating the module installation process of the second embodiment. The module installation process is initiated when the topology of the sensor network has changed. The module installation process of FIG. 27 is different from the module installation process of FIG. 20 in that steps S401 and S402 are additionally performed.

As illustrated in FIG. 27, the server node 120 waits on standby until the occurred event information storage unit 116A has been updated (step S201). When the occurred event information storage unit 116A is updated, the server node 120 determines whether all the modules have been installed (step S202). Since no module has been installed (no in step S202), the server node 120 proceeds to step S203.

The server node 120 stores the column data of the module identifier, the input event type, and the aggregate attribute name, which are from the definition of the module stored in the module definition storage unit 111B, in the corresponding columns of the installation destination information storage unit 117A (step S203).

After step S203, the server node 120 performs step S204 as below. The server node 120 retrieves from the occurrence node IDs stored in the occurred event information storage unit 116A, an occurrence node ID of an occurred event type that is included in the input event type of an uninstalled module. The server node 120 further selects, from the retrieved occurrence node IDs, nodes that have the same attribute value and belong to the aggregate attribute that has the same attribute name as the attribute name of the aggregate attribute defined in the uninstalled module.

The server node 120 writes in the installation destination information storage unit 117A the retrieved occurrence node ID and the occurred event attribute corresponding to the occurrence node ID (step S205).

If the number of occurrence node IDs is 0 (yes in step S206), there is a possibility that the occurred events from the lower nodes are not fully registered in the occurred event information storage unit 116A. In such a case, the server node 110 returns to step S202.

If the number of occurrence node IDs is plural (yes in step S207), the server node 120 performs an operation in step S208 as discussed below. The server node 120 retrieves, from the upper node IDs stored in the topology storage unit 121A, a node ID of the lowest node of upper nodes that have the sensor nodes 210 or the gateway node 310 corresponding to the occurrence node IDs all registered as lower nodes thereunder.

If the number of occurrence node IDs is one (no in step S207), the server node 120 retrieves the occurrence node ID as an installation destination candidate for the module.

The server node 120 determines whether the event processing process is enabled depending on whether the execution enable flag of the node as the installation destination candidate thus retrieved is true or false (step S401).

If the node that is the installation destination candidate is not enabled to process the event (no in step S401), the server node 120 modifies an upper node of the candidate to be a new installation destination candidate (step S402).

If the node serving as the installation destination candidate is enabled to process the event (yes in step S401), the server node 120 registers the previously retrieved occurrence node ID in the installation destination node ID column (step S209).

The server node 120 transmits the module stored in the module storage unit 111A to the node that corresponds to the installation destination node ID (step S210). The server node 120 waits until the occurred event information storage unit 116A is updated (step S211), and then returns to step S202.

The server node 120 repeats operations in steps S203 through S211 until all the modules are installed (no in step S202). When all the modules have been installed (yes in step S202), the server node 120 completes the process.

[Effect of the Second Embodiment]

The server node 120 of the embodiment retrieves, from a node, execution enable information that represents whether the node is enabled to execute a module. The server node 120 of the embodiment installs the module on an upper node, from which execution enable information indicating whether the upper node is enabled to execute the module is received. Because the server node 120 of the embodiment may be able to prevent the installation of the module on a node that is not enabled to execute module, network traffic may be eased and the modules may be properly installed in a distributed fashion.

Third Embodiment

A third embodiment is related to a method of possibly preventing the destruction of an event that occurs when installing a module. In the method, events are accumulated on lower nodes during the installation of the module, and the accumulated events are then transmitted when the installation of the module is complete.

[Server Node Configuration]

Figure 28:
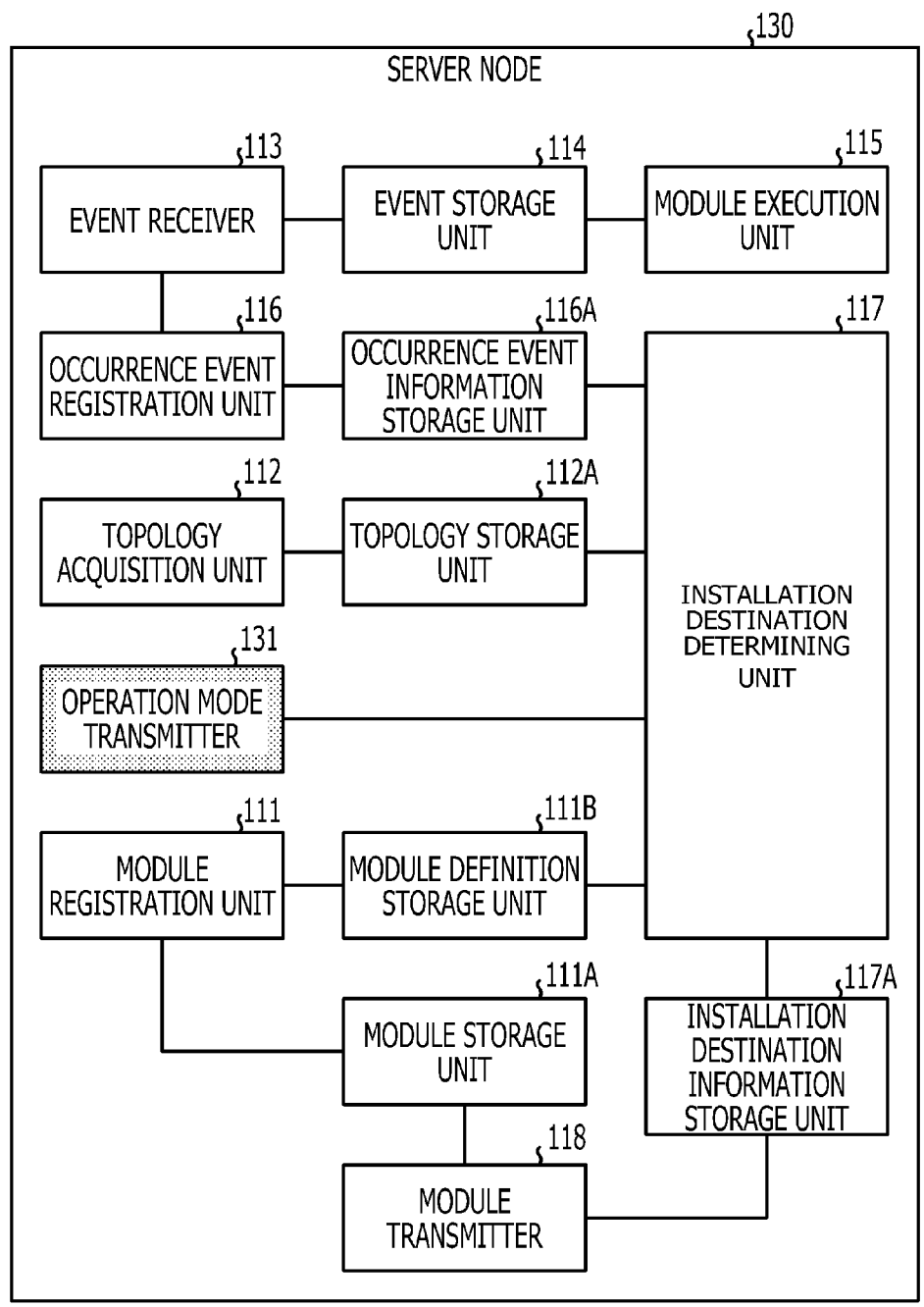
FIG. 28 is a functional block diagram illustrating a server node of a third embodiment.

FIG. 28 is a functional block diagram illustrating a server node 130 of the third embodiment. In the discussion that follows, the functional blocks that are the same as those of the first embodiment are designated with the same reference numerals and discussion thereof is omitted.

The server node 130 of FIG. 28 is different from the server node 110 of FIG. 2 in that the server node 130 further includes an operation mode transmitter 131. The operation mode transmitter 131 transmits the operation mode of the server node 130. In one operation example, if the topology storage unit 112A is updated, the operation mode transmitter 131 transmits, to a lower node, operation mode information indicating that a module installation mode is under way in which a module is to be installed. When the installation of all the modules is complete, the operation mode transmitter 131 then transmits operation mode information indicating that an event collection mode is under way in which events are collected or processed.

[Sensor Node Configuration]

Figure 29:
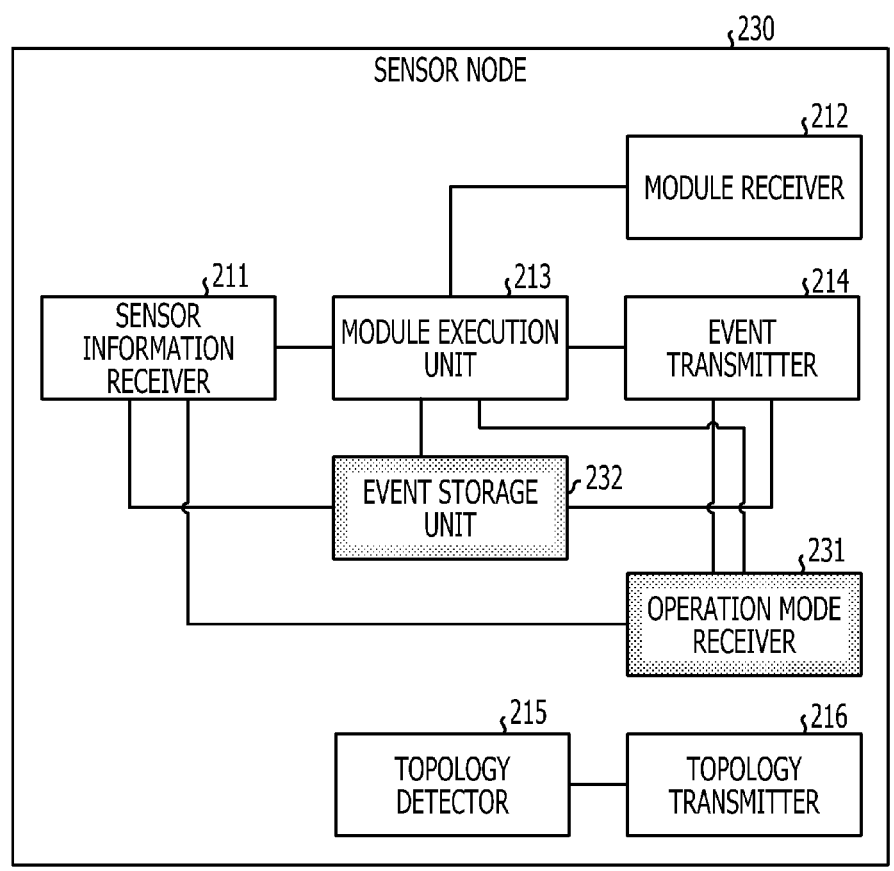
FIG. 29 is a functional block diagram illustrating of a sensor node of the third embodiment.

FIG. 29 is a functional block diagram illustrating a sensor node 230 of the third embodiment. The sensor node 230 of FIG. 29 is different from the sensor node 210 of FIG. 17 in that the sensor node 230 further includes an operation mode receiver 231 and an event storage unit 232.

The operation mode receiver 231 receives the operation mode information from the operation mode transmitter 131. In one operation example, upon receiving operation mode information that indicates a module installation mode, the operation mode receiver 231 updates the operation mode of the server node 130, which is managed by an internal memory (not illustrated), to the "module installation mode". The operation mode receiver 231 instructs the sensor information receiver 211 to store sensor information received from the sensor device in the event storage unit 232. The operation mode receiver 231 further instructs the module execution unit 213 to store the event that holds the processed sensor information in the event storage unit 232. Upon receiving operation mode information that indicates an event collection mode, the operation mode receiver 231 updates the operation mode of the server node 130, which is managed by the internal memory (not illustrated), to "event collection mode". The operation mode receiver 231 then instructs the event transmitter 214 to transmit an event stored in the event storage unit 232 to the server node 130.

The event storage unit 232 stores an event. If the server node 130 is in module installation mode, the event storage unit 232 is used to temporarily store sensor information received by the sensor information receiver 211 and an event processed by the module execution unit 213. The schema of the event storage unit 232 is the same as the schema of the event storage unit 114 of FIG. 2.

[Gateway Node Configuration]

Figure 30:
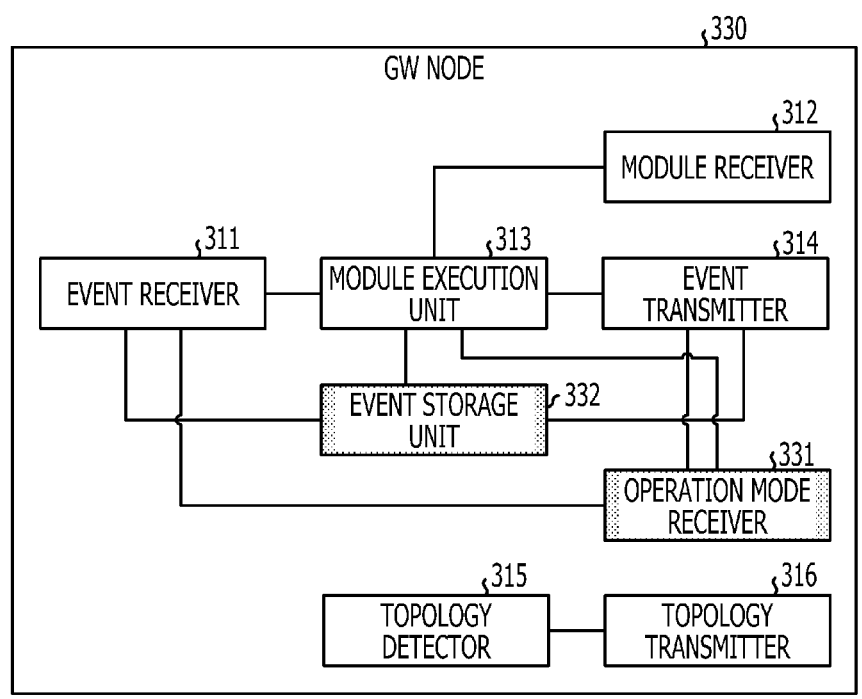
FIG. 30 is a functional block diagram illustrating a gateway node of the third embodiment.

FIG. 30 is a functional block diagram illustrating a gateway node 330 of the third embodiment. The gateway node 330 of FIG. 30 is different from the gateway node 310 of FIG. 18 in that the gateway node 330 further includes an operation mode receiver 331 and an event storage unit 332.

The operation mode receiver 331 receives operation mode information from the operation mode transmitter 131. In one operation example, upon receiving operation mode information that indicates module installation mode, the operation mode receiver 331 updates the operation mode of the server node 130 managed by the internal memory (not illustrated) to the "module installation mode". The operation mode receiver 331 then instructs the event receiver 311 to store an event received from a lower node in the event storage unit 332. The operation mode receiver 331 further instructs the module execution unit 313 to store a new event resulting from processing the event onto the event storage unit 332. Upon receiving operation mode information that indicates event collection mode, the operation mode receiver 331 updates the operation mode of the server node 130 managed by the internal memory (not illustrated) to "event collection mode". The operation mode receiver 331 then instructs the event transmitter 314 to transmit an event stored in the event storage unit 332 to the server node 130.

The event storage unit 332 stores an event. If the server node 130 is in module installation mode, the event storage unit 332 is used to temporarily store an event received by the event receiver 311 and an event processed by the module execution unit 313. The schema of the event storage unit 332 is the same as the schema of the event storage unit 114 of FIG. 2.

[Processing Flow]

A flow of the process of the network sensor system of the embodiment is described below. A general process executed by the sensor node 230 is described first, followed by the discussion of a module installation process executed by the server node 130.

(1) General Process

Figure 31:
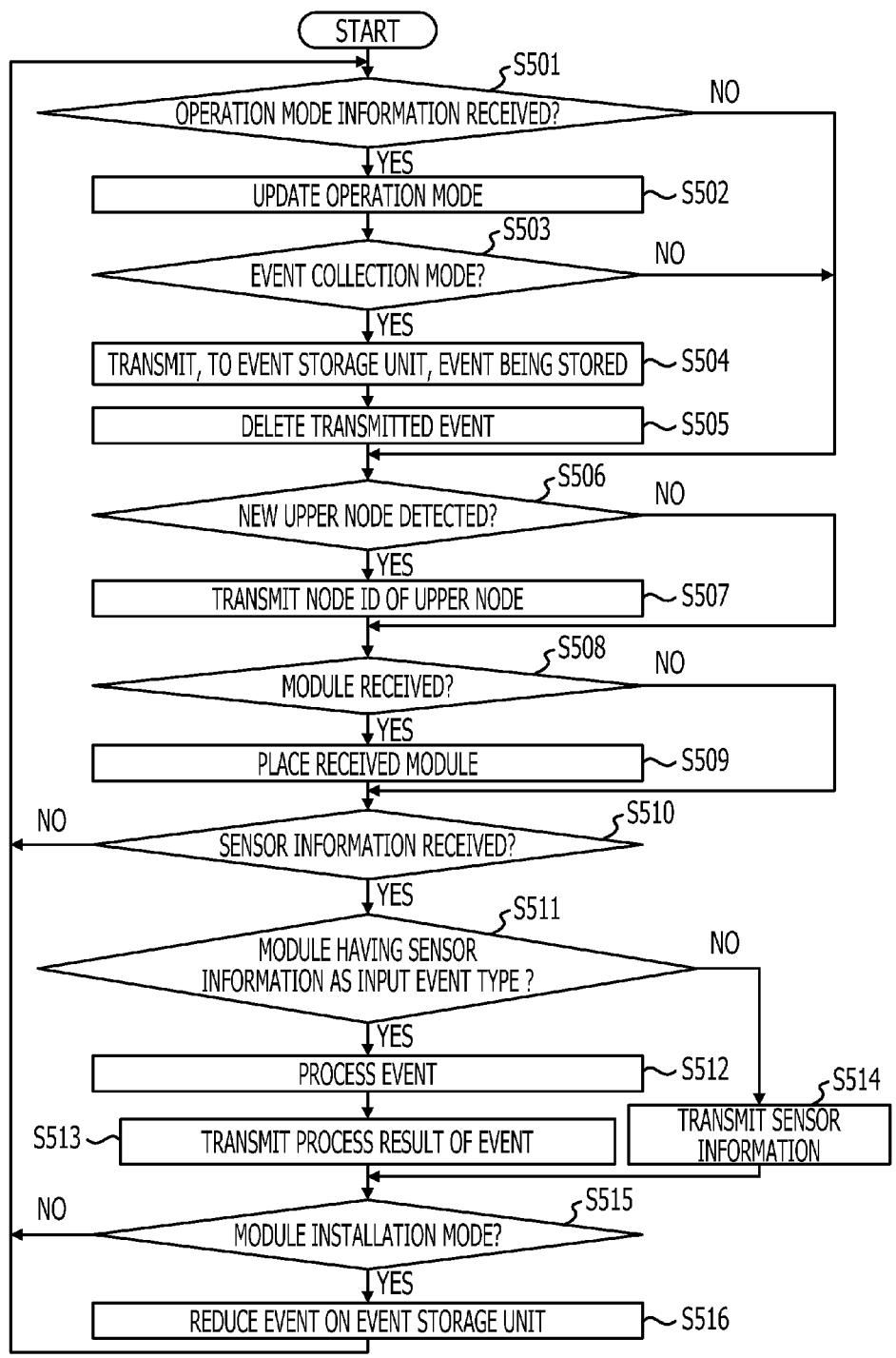
FIG. 31 is a flowchart illustrating an overall process of the sensor node of the third embodiment.

FIG. 31 is a flowchart illustrating the general process of the sensor node 230 of the first embodiment. The general process is executed repeatedly as long as the sensor node 230 remains powered on.

Upon receiving operation mode information (yes in step S501) as illustrated in FIG. 31, the sensor node 230 updates the operation mode of the server node 130 managed by the internal memory (not illustrated) to "module installation mode" (step S502). If no operation mode information has been received (no in step S501), processing proceeds to step S506.

If the operation mode is event collection mode (yes in step S503), the sensor node 230 transmits, to the server node 130, an event stored in the event storage unit 232 (step S504). The sensor node 230 deletes from the event storage unit 232 the event transmitted to the server node 130 (step S505). If the operation mode is not event collection mode (no in step S503), processing proceeds to step S506.

If a new upper node is detected (yes in step S506), the sensor node 230 transmits the node ID of the upper node to the server node 130 (step S507). If no new upper node is detected (no in step S506), the sensor node 230 skips step S507 and proceeds to step S508.

Upon receiving a module from the server node 130 (yes in step S508), the sensor node 230 installs the module received from the server node 130 (step S509). If no module has been received (no in step S508), the sensor node 230 skips step S509 and proceeds to step S510.

Upon receiving sensor information from the sensor device (yes in step S510), the sensor node 230 determines whether a module that takes the sensor information as an input event type has been installed (step S511). If no sensor information has been received (no in step S510), processing returns to step S501.

If the module has been installed (yes in step S511), the sensor node 230 processes the event by executing the module (step S512). The sensor node 230 then transmits the processed event to the upper node (step S513).

If no module has been installed (no in step S511), the sensor node 230 attaches information, such as the occurrence node ID, the aggregate attribute, and the like, to the sensor information received from the sensor device, and then transmits the sensor information with the occurrence node ID and the aggregate attribute attached thereto to the upper node (step S514).

If the operation mode is module installation mode (yes in step S515), the sensor node 230 stores the event on the event storage unit 232 (step S516), and then returns to step S501 to start over. If the operation mode is not module installation mode (no in step S515), the sensor node 230 returns to step S501 to start over.

The general process of the sensor node 230 has been discussed. The general process executed by the gateway node 330 as a relay node is the same except step S510. More specifically, the general process of the gateway node 330 is identical to the general process of the sensor node 230 except that an event in place of sensor information is received in step S510.

(2) Module Installation Process

Figure 32:
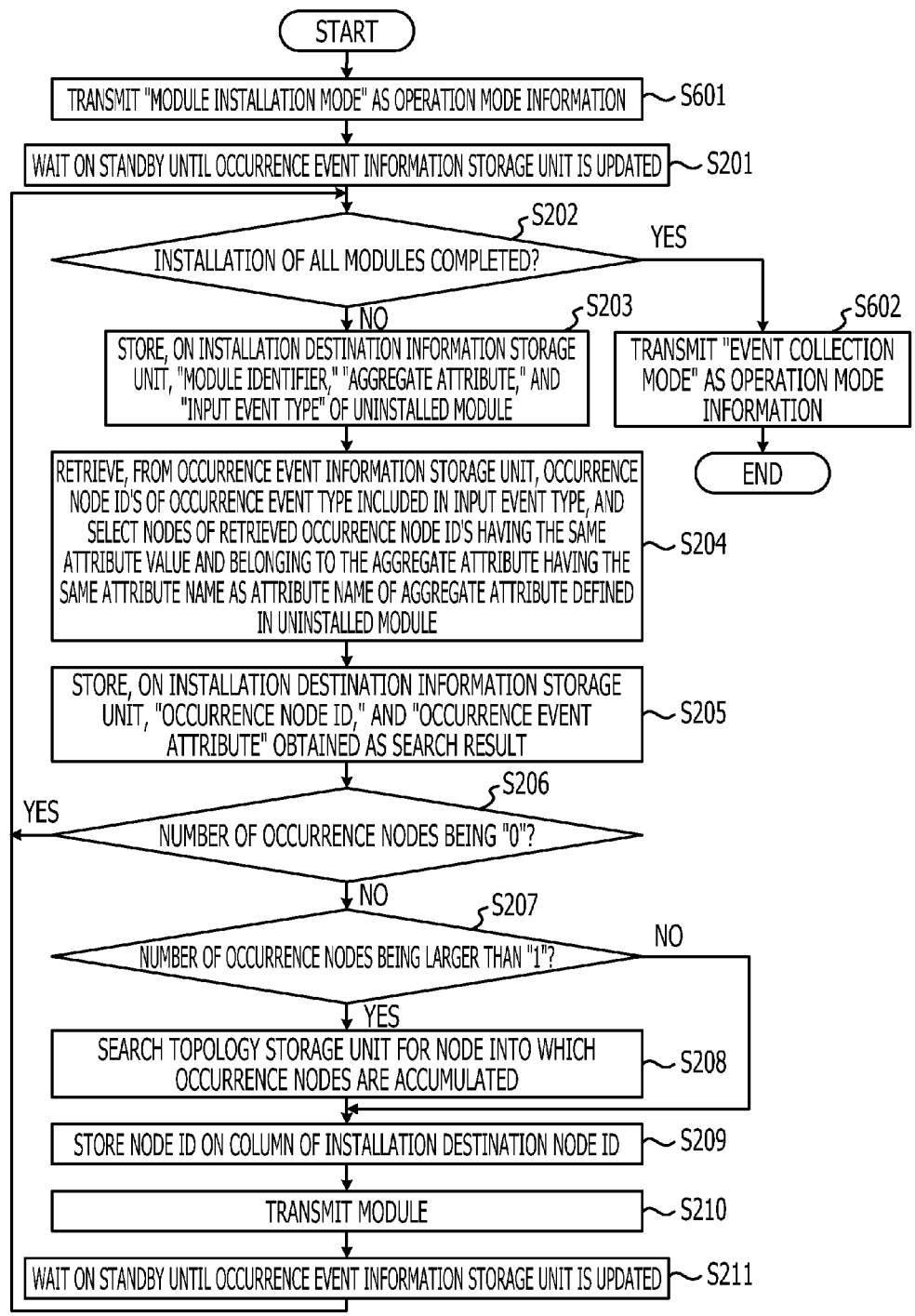
FIG. 32 is a flowchart illustrating a module installation process of the third embodiment.

The module installation process of the embodiment is described below. FIG. 32 is a flowchart illustrating the module installation process of the third embodiment. The module installation process is initiated when the topology of the sensor network changes. The module installation process of FIG. 32 is different from the module installation process of FIG. 20 in that the module installation process of FIG. 32, step S601 and step S602 are additionally performed.

As illustrated in FIG. 32, the server node 130 transmits to a lower node operation mode information that indicates the module installation mode for installing a module is under way (step S601). The server node 130 waits until the occurred event information storage unit 116A has been updated (step S201).

When the occurred event information storage unit 116A is updated, the server node 130 determines whether all the modules have been installed (step S202). Since no module has been installed (no in step S202), the server node 130 proceeds to step S203.

The server node 130 stores the column data for the module identifier, the input event type, and the aggregate attribute name from the definition of the module, which is stored in the module definition storage unit 111B, in the corresponding columns of the installation destination information storage unit 117A (step S203).

After performing operation in step S203, the server node 130 performs an operation in step S204 as below. The server node 130 retrieves from the occurrence node IDs stored in the occurred event information storage unit 116A, an occurrence node ID of the occurred event type that is included in the input event type of an uninstalled module. The server node 130 further selects, from the retrieved occurrence node IDs, nodes that have the same attribute value and belong to the aggregate attribute that has the same attribute name as the attribute name of the aggregate attribute defined in the uninstalled module.

The server node 130 writes in the installation destination information storage unit 117A the retrieved occurrence node ID and the occurred event attribute that correspond to the occurrence node ID (step S205).

If the number of occurrence node IDs is 0 (yes in step S206), there is a possibility that the occurred events from the lower nodes are not fully registered in the occurred event information storage unit 116A. In such a case, the server node 110 returns to step S202.

If the number of occurrence node IDs is plural (yes in step S207), the server node 130 performs an operation in step S208 as discussed below. The server node 130 retrieves from the upper node IDs stored in the topology storage unit 121A, a node ID of the lowest node among upper nodes that have the sensor nodes 230 or the gateway node 330 corresponding to the occurrence node IDs all registered as the lower nodes thereunder.

The server node 130 registers the node ID retrieved as an installation destination candidate in the column of the installation destination node ID (step S209).

If the number of occurrence node IDs is one (no in step S207), there are not enough nodes to install a module on. The server node 130 registers the previously retrieved occurrence node ID on the column of the installation destination node ID (step S209).

The server node 130 transmits the module stored in the module storage unit 111A to the node corresponding to the installation destination node ID (step S210). The server node 130 waits until the occurred event information storage unit 116A is updated (step S211), and then returns to step S202.

The server node 130 repeats operations in steps S203 through S211 until all the modules are installed (no in step S202).

When all the modules have been installed (yes in step S202), the server node 130 transmits to the lower node operation mode information indicating that the event process mode in which events are collected or processed is under way (step S602), and then ends the process.

[Effects of the Third Embodiment]

As described above, the server node 130 transmits to a node an instruction to cause the node to output an event stored on the node when the module installation is complete. As a result, server node 130 may prevent the destruction of an event that occurs during the module installation.

Fourth Embodiment

According to the first embodiment, the module processing the event is installed on a node that is as low as possible. Causing the lower node having the module installed thereon to execute the module may be an undesirable operation. A fourth embodiment relates to a method of installing the modules in a distributed fashion with regard to node load on the lower node as well as network cost.

[Server Node Configuration]

Figure 33:
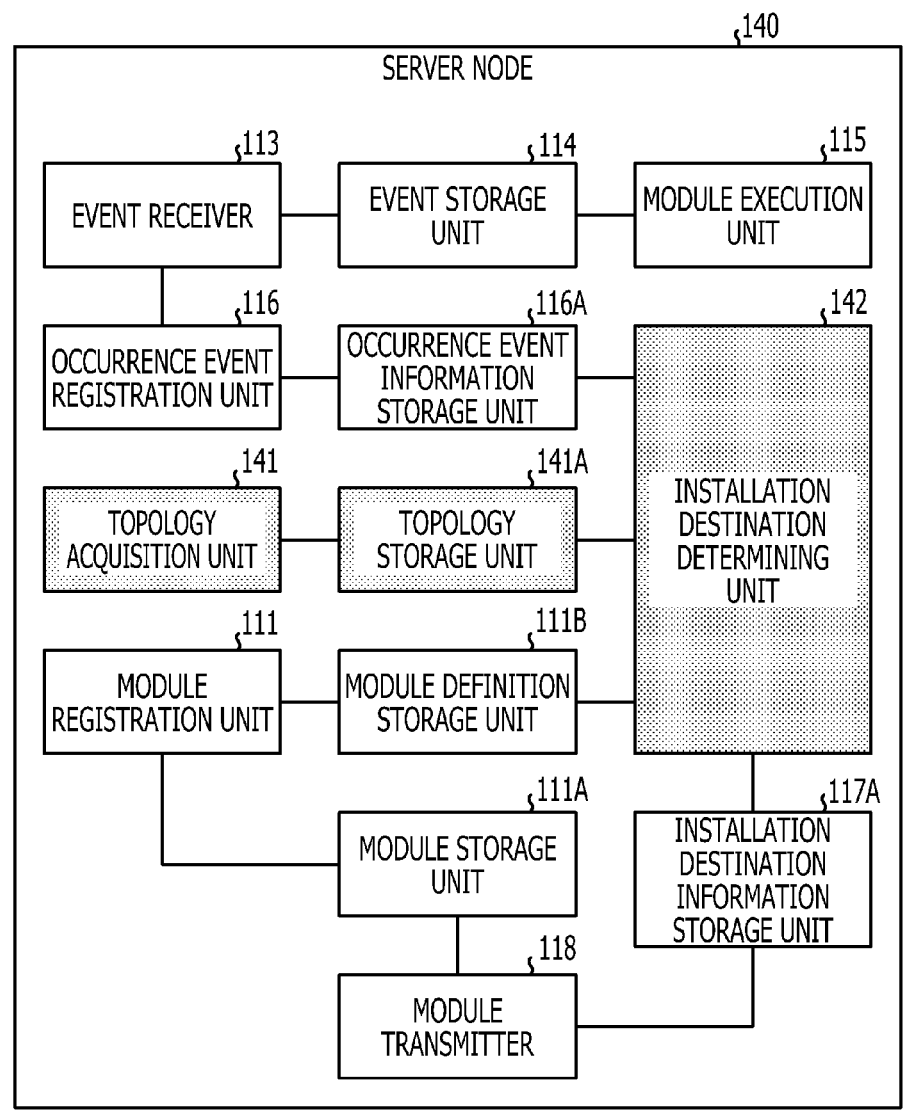
FIG. 33 is a functional block diagram illustrating a server node of a fourth embodiment.

FIG. 33 is a functional block diagram illustrating a server node 140 of the fourth embodiment. The differences of server node 140 of FIG. 33 over server node 110 of FIG. 2 is in terms of part of the process executed by a topology acquisition unit 141 and an installation destination determining unit 142, and information stored in the topology storage unit 141A. In the discussion that follows, functional blocks identical to those in the first embodiment are designated with the same reference numerals and the discussion thereof is omitted.

The topology acquisition unit 141 is the same as the topology acquisition unit 112 of FIG. 2 in that the connection information of the nodes representing which upper node the lower is connected to is retrieved, but different from the topology acquisition unit 112 of FIG. 2 in that information about node load on the lower node and network cost is also retrieved.

The topology storage unit 141A is different from the topology storage unit 112A of FIG. 2 in that the node load and the network cost are associated with the lower node ID and the upper node ID. The "node load" refers to a measure that indicates the load on the lower node. For example, the node load may be a CPU usage rate or a memory usage rate. The "network cost" refers to a measure that indicates the cost for network communication between the lower node and the upper node. For example, in a per-packet charge system of a cell phone network where cost increases in response to network communication amount, the network cost may be a cost per communication amount unit.

FIG. 34 illustrates an example of a structure of information stored in the topology storage unit 141A. As illustrated in FIG. 34, the lower nodes as the temperature sensor X, the humidity sensor X, and the temperature and humidity sensor Y have higher load than the upper nodes. FIG. 34 illustrates that a network cost is incurred between the mobile gateway Y and the cloud and that no network cost is incurred between other nodes.

Even if a node is selected through matching of the occurred event type and the input event type and matching of the attribute name and attribute value of the aggregate attribute, the installation destination determining unit 142 may prefer not to determine the node as the module installation destination. In one operation example, the installation destination determining unit 142 determines whether a network cost is incurred between the node selected through the matching and the upper node thereof. If a network cost is incurred with the upper node, the installation destination determining unit 142 installs the module on the node selected through the matching. If no network cost is incurred with the upper node, the installation destination determining unit 142 compares the node load of the node selected through the matching with the node load of the upper node, and installs the module on the node having a lower node load. One of the node load and the network cost may be used as a condition for module installation.

[Fourth Specific Example of Module Installation]

A fourth specific example of module installation is described below with reference to FIGS. 35 through 37. FIGS. 35 and 37 illustrate examples of structures of information stored in the installation destination information storage unit 117A. FIG. 36 illustrates an example of a structure of information stored in the occurred event information storage unit 116A.

As illustrated in FIG. 34, no network cost is incurred between the nodes of the home gateway X and both the temperature sensor X and the humidity sensor X, and in addition, the temperature sensor X and the humidity sensor X have higher node load than the home gateway X. No network cost is incurred between the nodes of the temperature and humidity sensor Y and the mobile gateway Y, and the temperature and humidity sensor Y has a higher node load than the mobile gateway Y. Therefore, no modules are installed on the temperature sensor X, the humidity sensor X, and the temperature and humidity sensor Y. However, the mobile gateway Y has a higher node load than the cloud, and a network cost is incurred between the mobile gateway Y and the cloud. Therefore, no module is installed on the cloud. As a result, the modules "temperature alert", "average temperature calculation", "average humidity calculation" are installed on both the home gateway X and the mobile gateway Y, as illustrated in FIG. 35.

The home gateway X and the mobile gateway Y as relay nodes process temperature events and humidity events into a temperature alert event, an average temperature event, and an average humidity event. The server node 140 is newly notified of a temperature alert event, the average temperature event, and the average humidity event. The occurred event registration unit 116 registers the occurred events of the occurred event types "temperature alert", "average temperature", and "average humidity" in the occurred event information storage unit 116A, as cross-hatched in FIG. 36. If the occurred events are added to the occurred event information storage unit 116A as cross-hatched in FIG. 36, the module installation state of FIG. 35 is updated to the module installation state of FIG. 37. If the occurred events of the occurred event types "temperature alert", "average temperature", and "average humidity" are added as illustrated in FIG. 37, the module "discomfort index calculation" is installed on the home gateway X and the mobile gateway Y in accordance with the node load and the network cost.

[Process Flow]

A flow of the process of the network sensor system of the embodiment is described below. A general process executed by the sensor node 240 is described first, followed by a discussion of a module installation process executed by the server node 140.

(1) General Process

Figure 38:
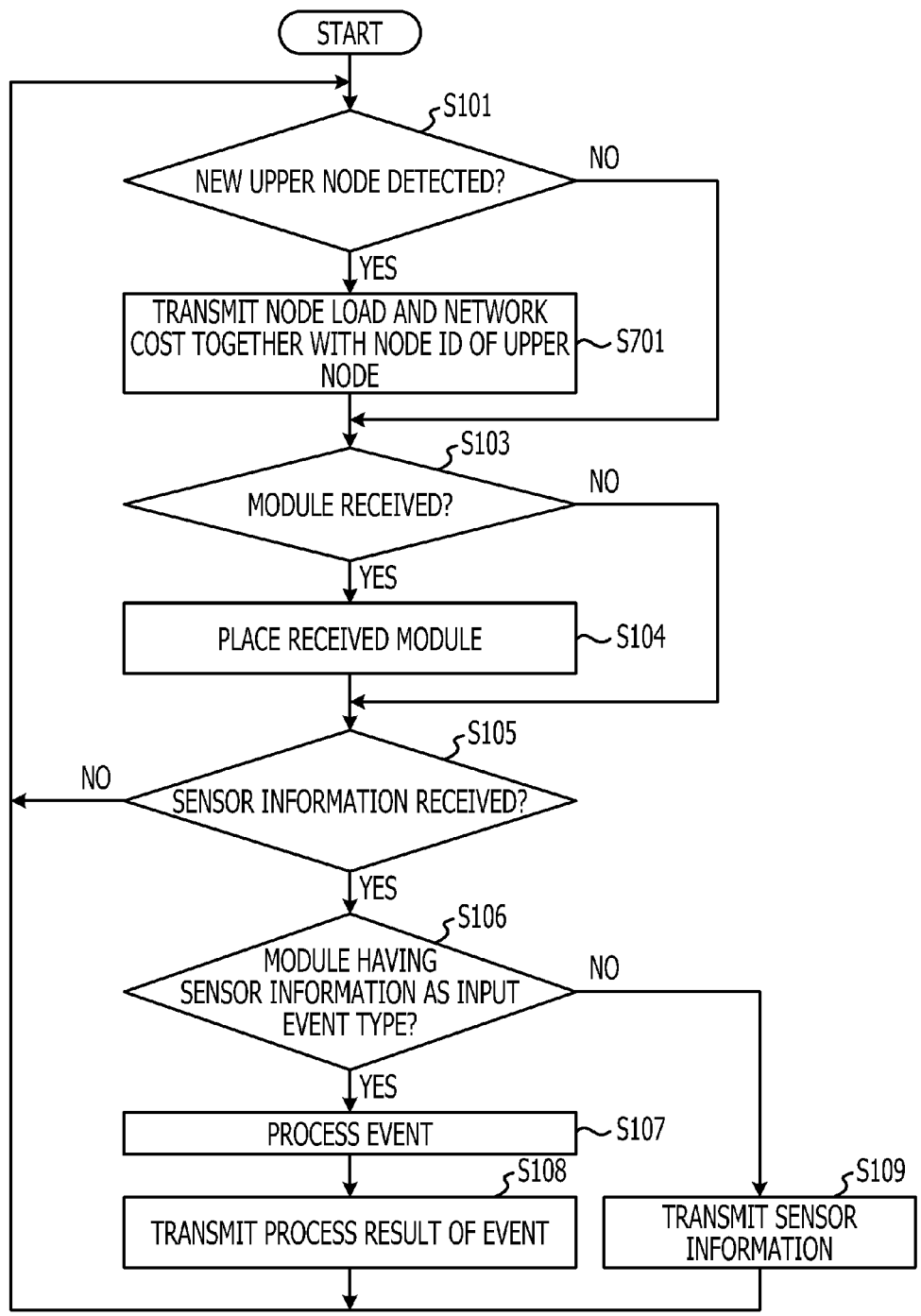
FIG. 38 is a flowchart illustrating an overall process of a sensor node of the fourth embodiment.

FIG. 38 is a flowchart illustrating the general process of the sensor node 240 of the fourth embodiment. The general process is executed repeatedly as long as the sensor node 240 remains powered on. The general process of the sensor node 240 of FIG. 38 is different from the general process of the sensor node 210 of FIG. 19 in that step S102 is replaced with step S701 in the general process of FIG. 38.

If a new upper node is detected (yes in step S101) as illustrated in FIG. 38, the sensor node 240 performs the following process. The sensor node 240 transmits to the server node 140 the node ID of the upper node, the node load of the sensor node 240 and the network cost with the upper node (step S701). If no new upper node is detected (no in step S101), the sensor node 240 skips step S701 and proceeds to step S103.

If a module is received from the server node 140 (yes in step S103), the sensor node 240 installs the module received from the server node 140 (step S104). If no module is received (no in step S103), the sensor node 240 skips step S104 and proceeds to step S105.

If sensor information is received from the sensor device (yes in step S105), the sensor node 240 determines whether a module having the sensor information as an input event type is installed (step S106). If no sensor information is received (no in step S105), the sensor node 240 returns to step S101

If the module is installed (yes in step S106), the sensor node 240 executes the module, thereby processing the event (step S107). The sensor node 240 transmits the processed event to the upper node (step S108).

If no module is installed (no in step S106), the sensor node 240 adds the occurrence node ID and aggregate attribute to the sensor information received from the sensor device, and then transmits the sensor information with the occurrence node ID and aggregate attribute added thereto to the upper node (step S109).

The general process of the sensor node 240 has been discussed. The general process executed by the gateway node 340 as a relay node remains the same except for step S105. More specifically, the general process of the gateway node 340 is identical to the general process of the sensor node 240 except that an event in place of sensor information is received in step S105.

(2) Module Installation Process

Figure 39:
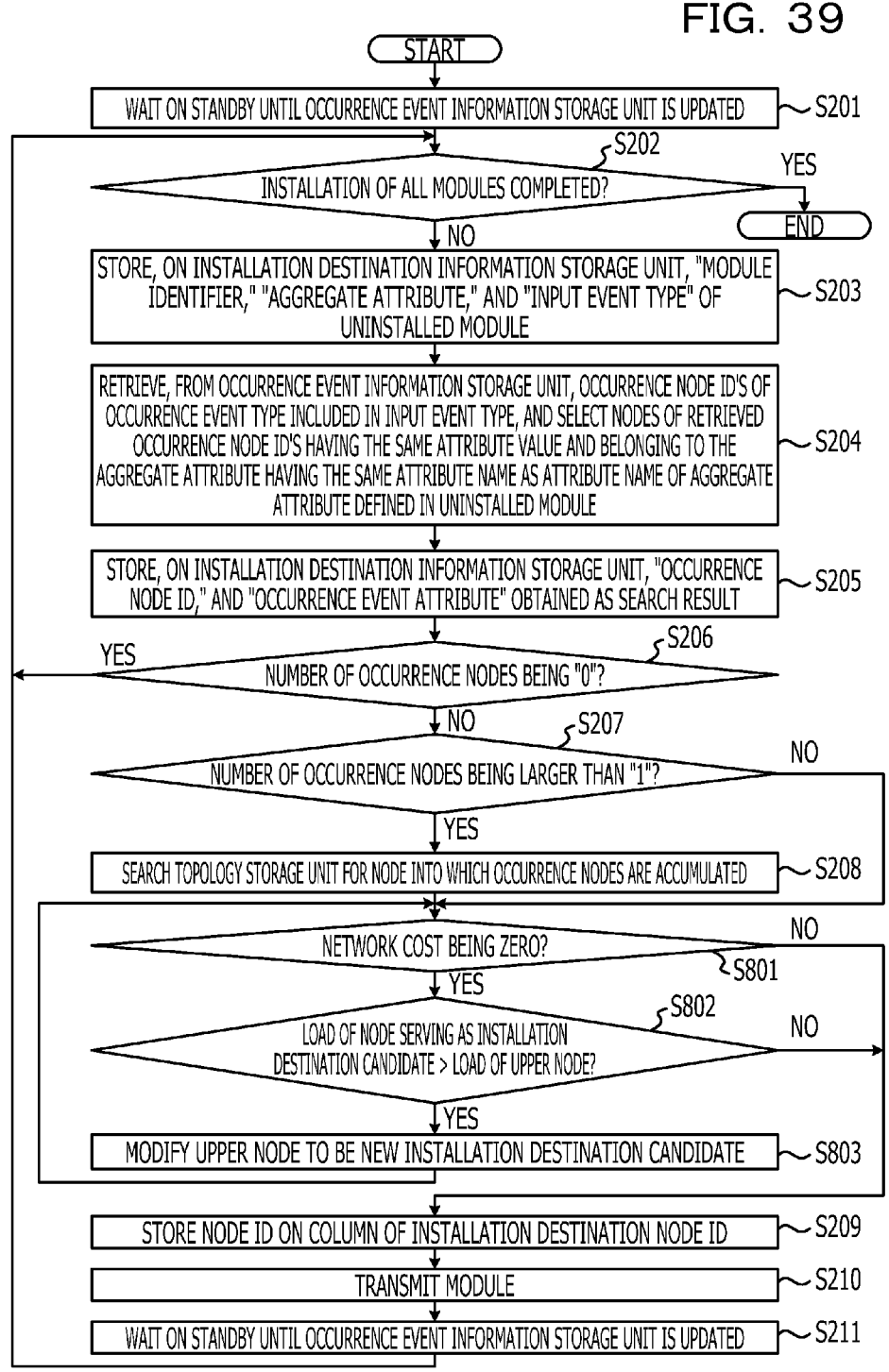
FIG. 39 is a flowchart illustrating a module installation process of the fourth embodiment.

The module installation process of the embodiment is described below. FIG. 39 is a flowchart illustrating the module installation process of the fourth embodiment. The module installation process is initiated when the topology of the sensor network changes. The module installation process of FIG. 39 is different from the module installation process of FIG. 20 in that steps S801 to S803 are also performed.

As illustrated in FIG. 39, the server node 140 waits until the occurred event information storage unit 116A has been updated (step S201). When the occurred event information storage unit 116A is updated, the server node 140 determines whether all the modules have been installed (step S202). Since no module has been installed (no in step S202), the server node 140 proceeds to step S203.

The server node 140 stores column data of the module identifier, the input event type, and the aggregate attribute name, which is from the definition of the module stored in the module definition storage unit 111B, in the corresponding columns of the installation destination information storage unit 117A (step S203).

After the performing operation in step S203, the server node 140 performs an operation in step S204 as below. The server node 140 retrieves, from the occurrence node IDs stored in the occurred event information storage unit 116A, an occurrence node ID of the occurred event type included in the input event type of an uninstalled module. The server node 140 further selects, from the retrieved occurrence node IDs, nodes that have the same attribute value and belong to the aggregate attribute that have the same attribute name as the attribute name of the aggregate attribute defined in the uninstalled module.

The server node 140 writes in the installation destination information storage unit 117A the retrieved occurrence node ID and the occurred event attribute that correspond to the occurrence node ID (step S205).

If the number of occurrence node IDs is 0 (yes in step S206), there is a possibility that the occurred events from the lower nodes are not fully registered in the occurred event information storage unit 116A. In such a case, the server node 140 returns to step S202.

If the number of occurrence node IDs is plural (yes in step S207), the server node 140 performs an operation in step S208 as discussed below. The server node 140 retrieves, from the upper node IDs stored in the topology storage unit 121A, a node ID of the lowest node of upper nodes that have the sensor nodes 240 or the gateway node 340 that correspond to the occurrence node IDs all registered as the lower nodes thereunder.

If the number of occurrence node IDs is one (no in step S207), the server node 140 retrieves the occurrence node ID as an installation destination candidate for the module.

The server node 140 determines whether a network cost is incurred between the node serving as the installation destination candidate retrieved as described above and the upper node thereof (step S801). If zero network cost is incurred between the node serving as the installation destination candidate retrieved as described above and the upper node thereof (yes in step S801), the server node 140 further determines whether the node load of the node serving as the installation destination candidate is higher than the node load of the upper node (step S802).

If the node load of the node serving as the installation destination candidate is higher than the node load of the upper node (yes in step S802), the server node 140 sets the upper node of the candidate as the new installation destination candidate (step S803), and then returns to step S801.

If a network cost is incurred between the node serving as the installation destination candidate retrieved described above and the upper node thereof (no in step S801), the server node 140 registers the node ID retrieved as the installation destination candidate in the column of the installation destination node ID (step S209). If the node load of the node serving as the installation destination candidate is less than or equal to the node load of the upper node (no in step S802), the server node 140 performs the operation in step S209.

The server node 140 transmits the module stored in the module storage unit 111A to the node that corresponds to the installation destination node ID (step S210). The server node 140 waits until the occurred event information storage unit 116A is updated (step S211), and then returns to step S202.

The server node 140 repeats operations in steps S203 through S211 until all the modules are installed (no in step S202). When all the modules have been installed (yes in step S202), the server node 140 ends the process.

[Effect of the Fourth Embodiment]

As described above, the server node 140 of the embodiment retrieves from the node the node load and the network cost between the node and the node's upper node. The server node 140 of the embodiment installs the module in an upper node having load and the network cost that satisfies a specific condition, out of the upper nodes that have nodes thereunder. The server node 140 of the embodiment installs the modules not only from the standpoint of network traffic but also from the standpoint of load and network cost. The server node 140 of the embodiment may thus optimize the module installation in a distributed fashion.

Fifth Embodiment

A fifth embodiment relates to a method for controlling a transmission interval with which a sensor node transmits an event to a server node, and for improving a transmission efficiency of the event by compressing event data.

[Server Configuration]

Figure 40:
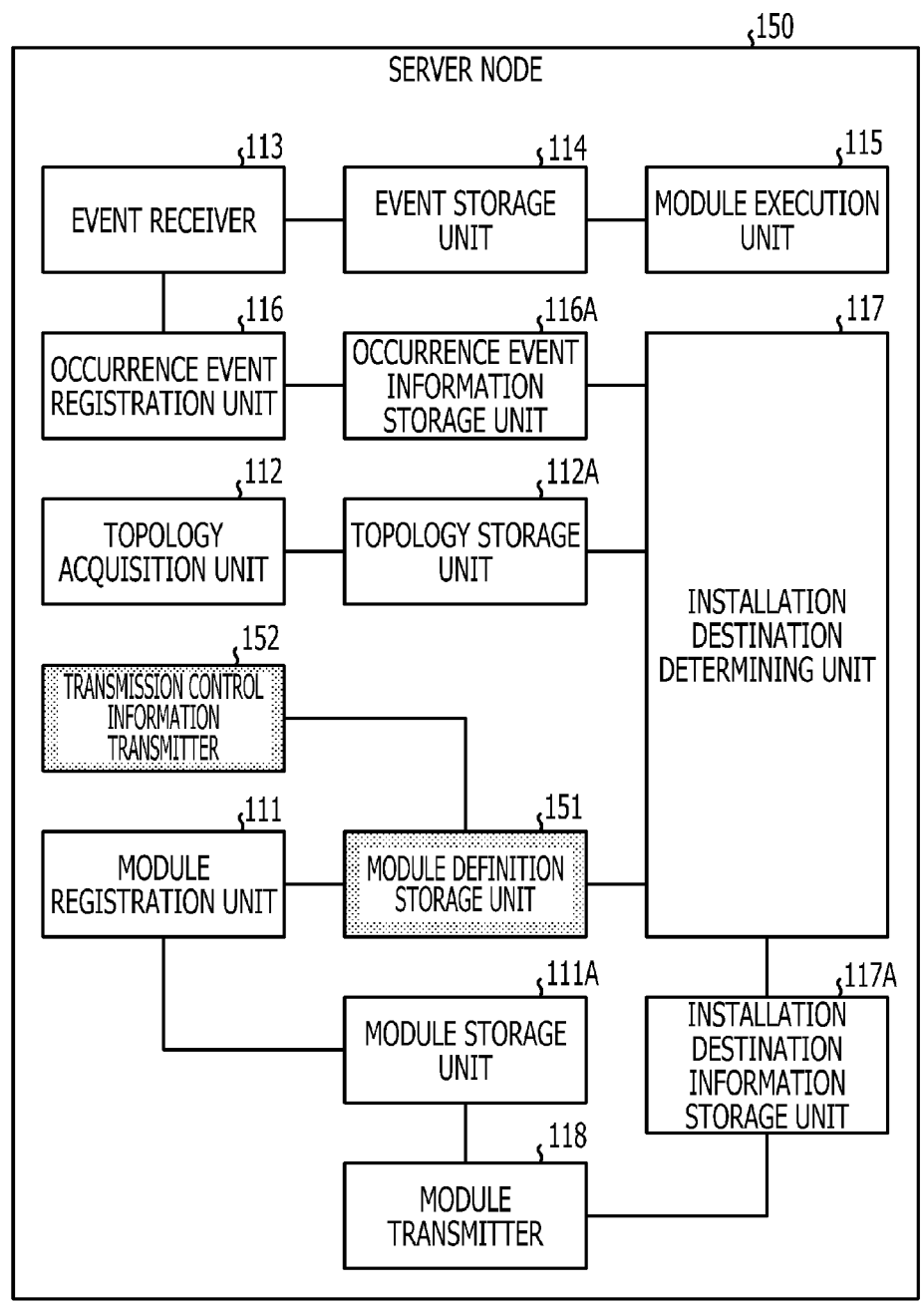
FIG. 40 is a functional block diagram illustrating a server node of a fifth embodiment.

FIG. 40 is a functional block diagram illustrating of a server node 150 of the fifth embodiment. As illustrated in FIG. 40, the server node 150 is different from the server node 110 of FIG. 2 in that the server node 150 further includes a module definition storage unit 151 and a transmission control information transmitter 152. In the discussion that follows, functional blocks that are the same as those of the first embodiment are designated with the same reference numerals and the discussion thereof is omitted.

In comparison with the counterpart in the first embodiment, the module definition storage unit 151 stores transmission control information of an event associated with the definition of a module. FIG. 41 illustrates an example of a structure of information stored in the module definition storage unit 151. As illustrated in FIG. 41, the temperature alert is set to be transmitted to the upper node with zero seconds, that is, immediately. The average temperature and the average humidity are set to be transmitted every 600 seconds (that is, 10 minutes). The discomfort index is set to be transmitted at a time every 3600 seconds (that is, 1 hour). Out of these pieces of information, the discomfort index is compressed before being transmitted. If a data compression value is "true", data are set to be compressed. If the data compression value is "false", data are not set to be compressed.

The transmission control information transmitter 152 transmits, as transmission control information, the transmission interval and the data compression setting, from the items stored in the module definition storage unit 151.

[Sensor Node Configuration]

Figure 42:
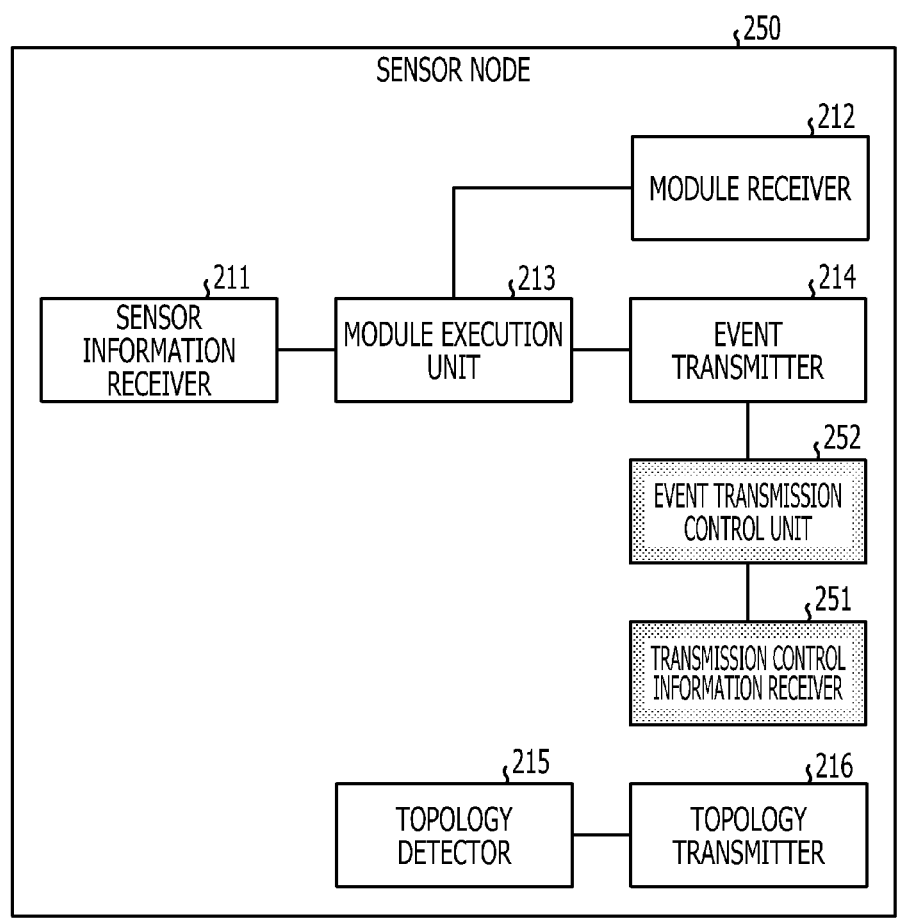
FIG. 42 is a functional block diagram illustrating a sensor node of the fifth embodiment.

FIG. 42 is a functional block diagram illustrating a sensor node 250 of the fifth embodiment. The sensor node 250 of the fifth embodiment is different from the sensor node 210 of FIG. 17 in that the sensor node 250 further includes a transmission control information receiver 251 and an event transmission control unit 252.

The transmission control information receiver 251 receives transmission control information output by the transmission control information transmitter 152. The transmission control information thus received is output to the event transmission control unit 252 as described below.

The event transmission control unit 252 controls the transmission of the event to the upper node in accordance with the transmission control information. In one operation example, the event transmission control unit 252 controls the event transmitter 214 so that the event transmitter 214 transmits the event to the upper node at the transmission interval set in the transmission control information. In another operation example, the event transmission control unit 252 controls the event transmitter 214 such that the event transmitter 214 compresses event data, and then transmits the compressed event data to the upper node if the transmission control information includes a setting to compress data.

[Gateway Node Configuration]

Figure 43:
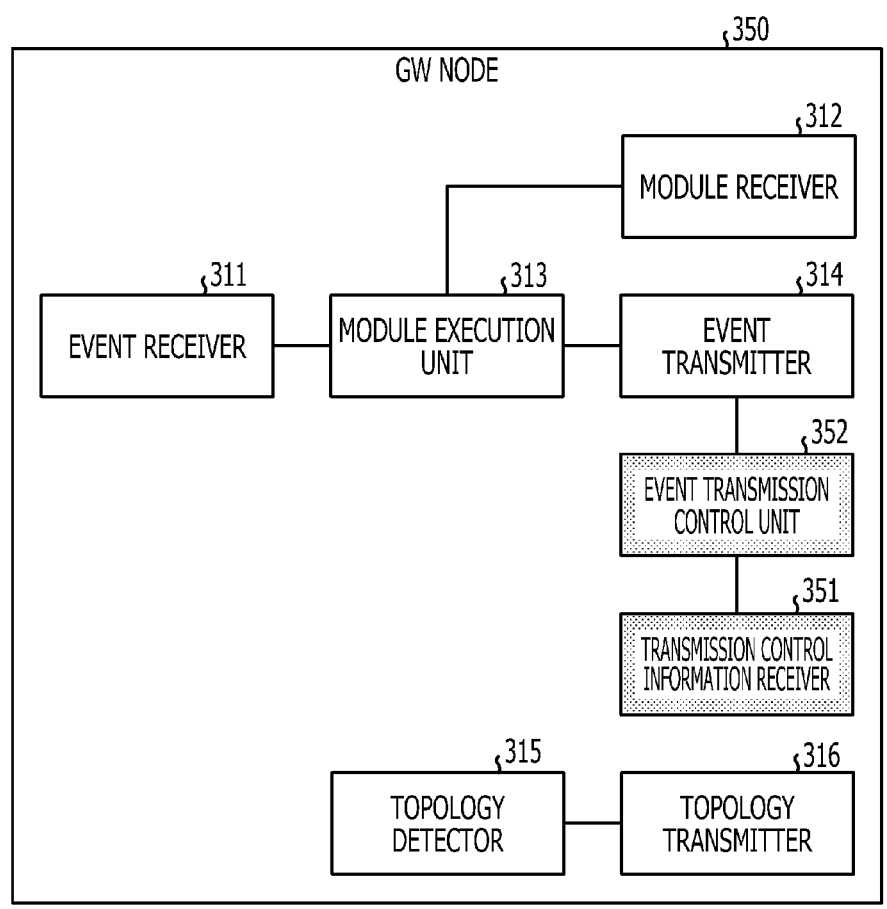
FIG. 43 is a functional block diagram illustrating a gateway node of the fifth embodiment.

FIG. 43 is a functional block diagram illustrating a gateway node 350 of the fifth embodiment. The gateway node 350 of FIG. 43 is different from the gateway node 310 of FIG. 18 in that the gateway node 350 further includes a transmission control information receiver 351 and an event transmission control unit 352.

The transmission control information receiver 351 receives the transmission control information transmitted by the transmission control information transmitter 152. The transmission control information thus received is output to the event transmission control unit 352.

The event transmission control unit 352 controls the transmission of the event to the upper node in accordance with the transmission control information. In one operation example, the event transmission control unit 352 controls the event transmitter 314 so that the event transmitter 314 transmits the event to the upper node at the transmission interval set in the transmission control information. In another operation example, the event transmission control unit 352 controls the event transmitter 314 such that the event transmitter 314 compresses event data, and then transmits the compressed event data to the upper node if the transmission control information includes a setting to compress data.

[Process Flow]

Figure 44:
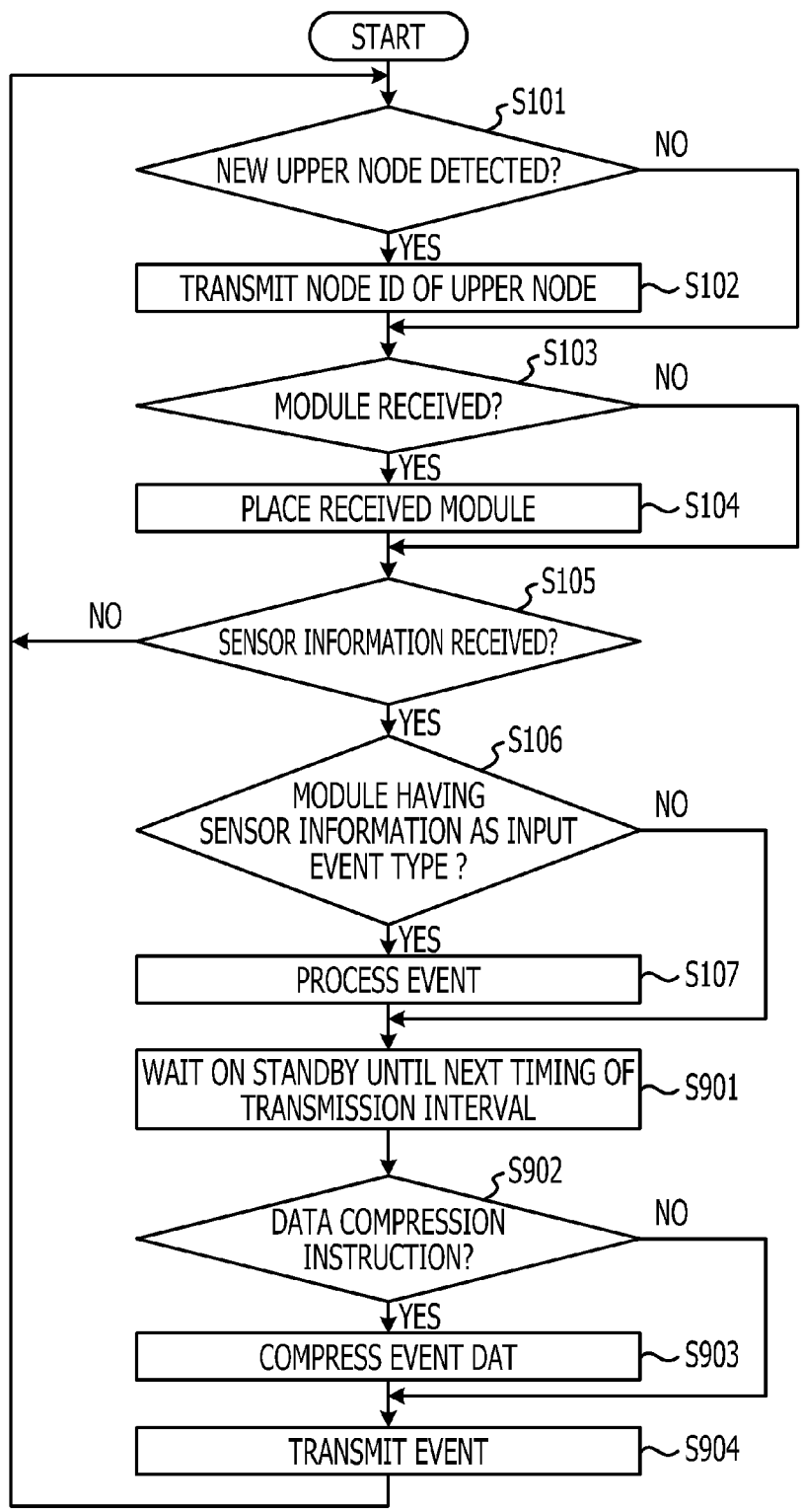
FIG. 44 is a flowchart illustrating an overall process of the sensor node of the fifth embodiment.

FIG. 44 is a flowchart illustrating a general process of the sensor node 250 of the first embodiment. The general process is executed repeatedly as long as the sensor node 250 remains powered on. The general process of the sensor node 250 of FIG. 44 is different from the general process of the sensor node 210 of FIG. 19 in that the sensor node 250 performs steps S901 through S904 in place of steps S108 through S109.

If a new upper node is detected (yes in step S101) as illustrated in FIG. 44, the sensor node 250 transmits the node ID of the upper node to the server node 150 (S102). If no new upper node is detected (no in step S101), the sensor node 250 skips step S102 and proceeds to step S103.

If a module is received from the server node 150 (yes in step S103), the sensor node 250 installs the module received from the server node 150 (step S104). If no module is received (no in step S103), the sensor node 250 skips step S104 and proceeds to step S105.

If sensor information is received from the sensor device (yes in step S105), the sensor node 250 determines whether a module that has the sensor information as an input event type is installed (step S106). If no sensor information is received (no in step S105), the sensor node 250 returns to step S101

If the module is installed (yes in step S106), the sensor node 250 executes the module, thereby processing the event (step S107). The sensor node 250 waits until the transmission interval set in the transmission control information has elapsed since the event was previously transmitted (step S901).

If no module is installed (no in step S106), the sensor node 250 performs the following process. That is, the sensor node 250 waits until the transmission interval set in the transmission control information has elapsed since the sensor information was previously transmitted (step S901).

If the transmission control information includes a setting to perform data compression (yes in step S902), the sensor node 250 compresses the event data (step S903), and transmits the compressed event data to the upper node (step S904). If the transmission control information does not include a setting to perform data compression (no in step S902), the sensor node 250 transmits the event to the upper node without compression (step S904).

In this way, the sensor node 250 repeats steps S101 through S107 and steps S901 through S904 until the sensor node 250 is powered off.

The general process of the sensor node 250 has been discussed. The general process executed by the gateway node 350 as a relay node remains the same except step S105. More specifically, the general process of the gateway node 350 is to the same as the general process of the sensor node 250 except that an event in place of sensor information is received in step S105.

[Effect of the Fifth Embodiment]

As described above, the server node 150 of the embodiment transmits sensor information to the lower node when the sensor node transmits the event to the server node. The server node 150 of the embodiment may increase the transmission efficiency of the event because the sensor node controls the transmission interval and may compress event data before transmitting the event.

Sixth Embodiment

A sixth embodiment relates to a method of executing an event processing process efficiently on a lower node by storing, on the lower node, a portion of reference data that is referenced when the module performs a process.

[Server Node Configuration]

Figure 45:
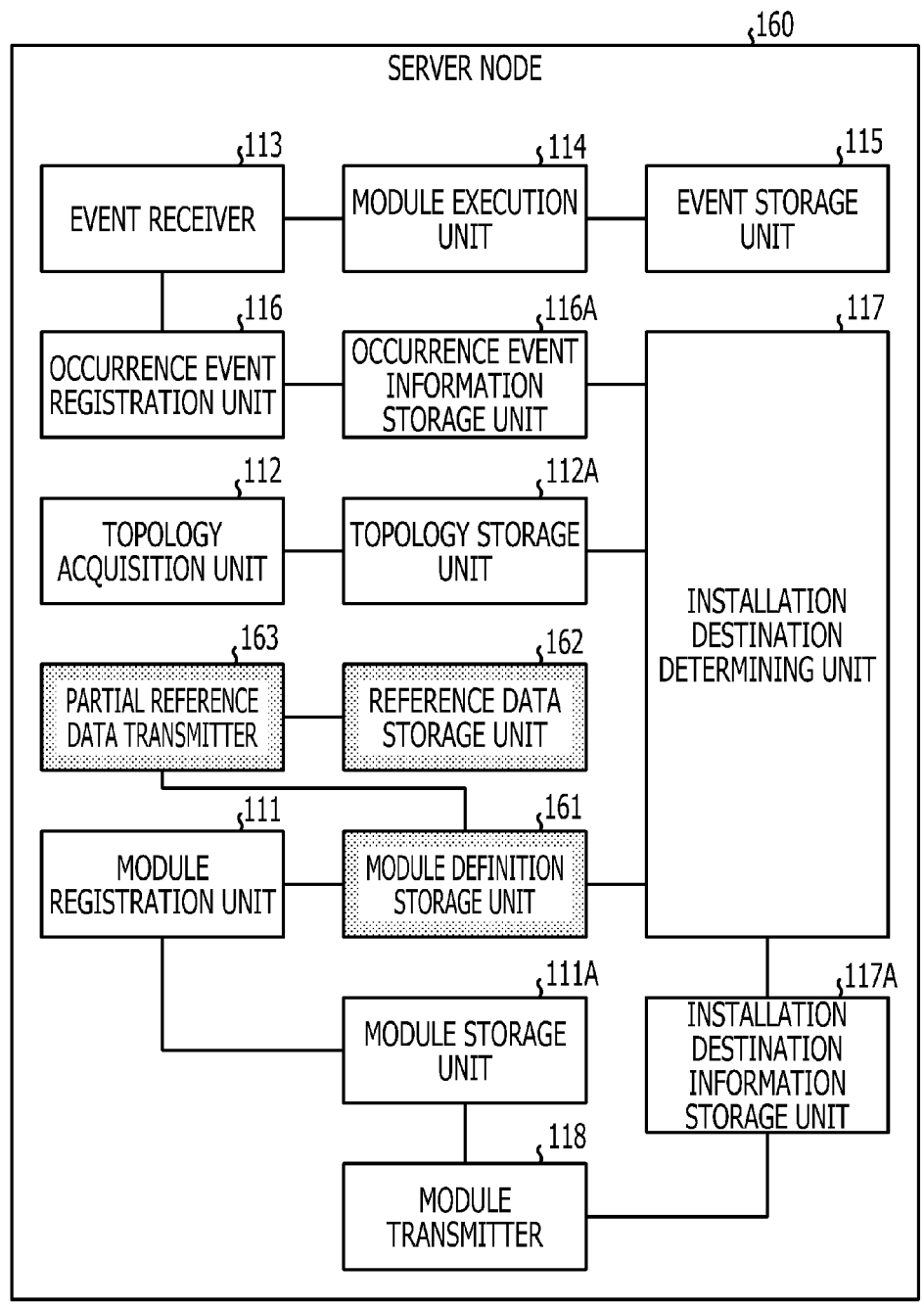
FIG. 45 is a functional block diagram illustrating a server node of a sixth embodiment.

FIG. 45 is a functional block diagram illustrating the server node 160 of the sixth embodiment. As illustrated in FIG. 45, the server node 160 is different from the server node 110 of FIG. 2 in that the server node 160 includes module definition storage unit 161, reference data storage unit 162, and partial reference data transmitter 163. In the discussion that follows, functional blocks that are the same as those of the first embodiment are designated with the same reference numerals and the discussion thereof is omitted.

The difference between the module definition storage unit 161 and the counterpart thereof in the first embodiment is that the module definition storage unit 161 stores, in addition to the definition of the module, a table name and a reference column that are referenced when the module processes the event. FIG. 46 illustrates an example of a structure of information stored in the module definition storage unit 161. As illustrated in FIG. 46, the table name referenced when the modules "average temperature calculation", "average humidity calculation", and "discomfort index calculation" process the event are all table A, which is commonly shared. The columns referenced in table A are column K. The column K is commonly referenced by the modules "average temperature calculation", "average humidity calculation", and "discomfort index calculation". Other columns referenced are, in order, "X", "Y", and "Z", which are different from each other.

The reference data storage unit 162 stores data referenced when a module processes an event. The reference data storage unit 162 stores data referenced by all the modules stored in the module storage unit 111A.

The partial reference data transmitter 163 retrieves partial reference data that corresponds to a module installed on the lower node, from the reference data stored in the reference data storage unit 162, and then transmits the retrieved partial reference data to the lower node. In one operation example, when a module is installed, the partial reference data transmitter 163 reads from the module definition storage unit 161 a reference table and a reference column that correspond to the module. The partial reference data transmitter 163 then retrieves partial reference data that corresponds to the reference table name and the reference column, from the reference data stored in the reference data storage unit 162, and transmits the retrieved partial reference data to the lower node where the module is installed.

[Sensor Node Configuration]

Figure 47:
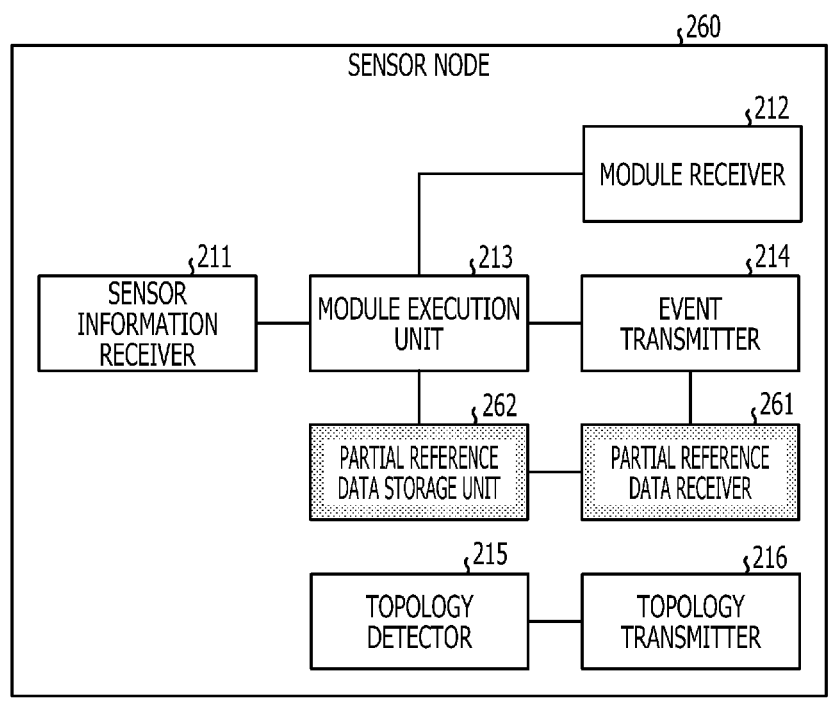
FIG. 47 is a functional block diagram illustrating a sensor node of the sixth embodiment.

FIG. 47 is a functional block diagram illustrating a sensor node 260 of the sixth embodiment. As illustrated in FIG. 47, the difference between the sensor node 260 and the sensor node 210 of FIG. 17 is that the sensor node 260 further includes a partial reference data receiver 261 and a partial reference data storage unit 262.

The partial reference data receiver 261 receives partial reference data transmitted by the partial reference data transmitter 163. The partial reference data thus received are registered in the partial reference data storage unit 262.

The partial reference data storage unit 262 stores partial reference data. The partial reference data storage unit 262 is referenced by the module execution unit 213 when a module installed on the sensor node 260 processes an event.

[Gateway Node Configuration]

Figure 48:
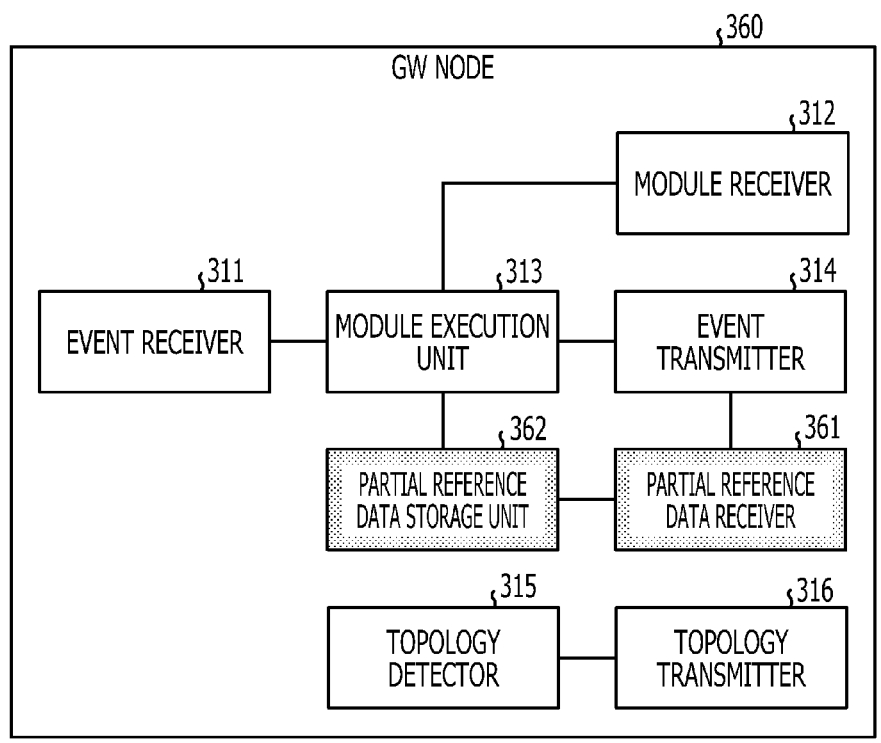
FIG. 48 is a functional block diagram illustrating a gateway node of the sixth embodiment.

FIG. 48 is a functional block diagram illustrating a gateway node 360 of the sixth embodiment. As illustrated in FIG. 48, the gateway node 360 is different from the gateway node 310 of FIG. 17 in that the gateway node 360 includes a partial reference data receiver 361 and a partial reference data storage unit 362.

The partial reference data receiver 361 receives partial reference data transmitted by the partial reference data transmitter 163. The partial reference data thus received are registered in the partial reference data storage unit 362.

The partial reference data storage unit 362 stores partial reference data. The partial reference data storage unit 362 is referenced by the module execution unit 313 when a module installed on the gateway node 360 processes the event.

[Process Flow]

A flow of the process of the sensor network system of the embodiment is described below. A general process executed by the sensor node 260 is described first, followed by a discussion of a module installation process executed by the server node 160.

(1) General Process

Figure 49:
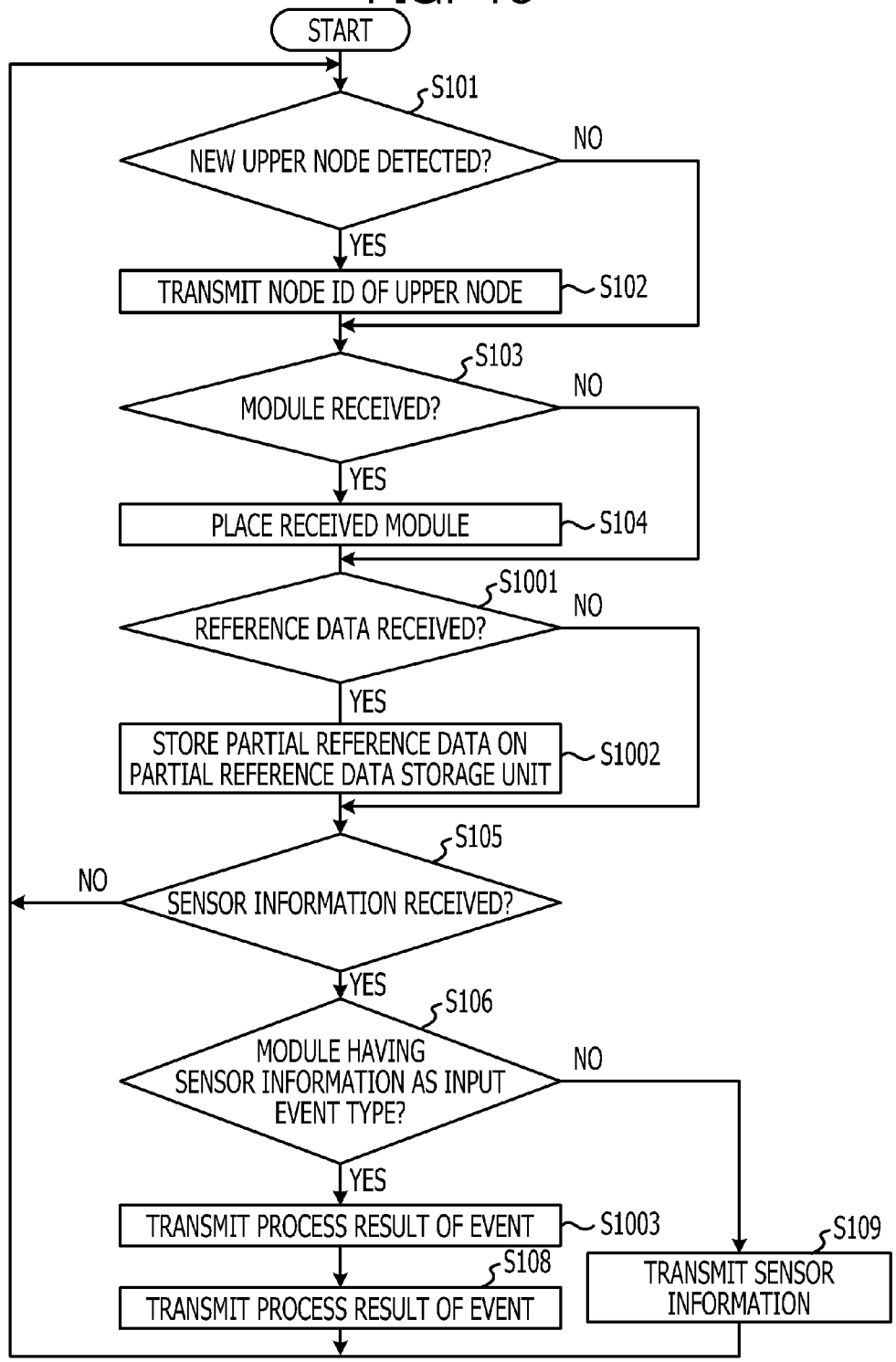
FIG. 49 is a flowchart illustrating an overall process of the sensor node of the sixth embodiment.

FIG. 49 is a flowchart illustrating the general process of the sensor node 260 of the first embodiment. The general process is executed repeatedly as long as the sensor node 260 remains powered on. The general process of the sensor node 260 of FIG. 49 is different from the general process of the sensor node 210 of FIG. 19 in that the general process of the sensor node 260 further includes steps S1001 through S1003.

As illustrated in FIG. 49, if a new upper node is detected (yes in step S101), the sensor node 260 transmits the node ID of the upper node to the server node 160 (S102). If no new upper node is detected (no in step S101), the sensor node 260 skips step S102 and proceeds to step S103.

If a module is received from the server node 160 (yes in step S103), the sensor node 260 installs the module received from the server node 160 (step S104). If no module is received (no in step S103), the sensor node 260 skips step S104 and proceeds to step S1001.

If partial reference data is received (yes in step S1001), the sensor node 260 stores the partial reference data in the partial reference data storage unit 262 (step S1002). If no partial reference data is received (no in step S1001), the sensor node 260 skips step S1002 and proceeds to step S105.

If sensor information is received from the sensor device (yes in step S105), the sensor node 260 determines whether a module having the sensor information as an input event type is installed (step S106). If no sensor information is received (no in step S105), the sensor node 260 returns to step S101

If the module is installed (yes in step S106), the sensor node 260 executes the module, thereby processing the event (step S1003). The sensor node 260 transmits the processed event to the upper node (step S108).

If no module is installed (no in step S106), the sensor node 260 adds the occurrence node ID and aggregate attribute to the sensor information received from the sensor device, and then transmits the sensor information with the occurrence node ID and aggregate attribute added thereto to the upper node (step S109).

The general process of the sensor node 260 has been discussed. The general process executed by the gateway node 360 as a relay node remains the same except step S105. More specifically, the general process of the gateway node 360 is to the same as the general process of the sensor node 260 except that an event in place of sensor information is received in step S105.

(2) Module Installation Process

The module installation process of the embodiment is described below. FIG. 50 is a flowchart illustrating the module installation process of the sixth embodiment. The module installation process is initiated when the topology of the sensor network changes. The module installation process of FIG. 50 is different from the module installation process of FIG. 20 in that the module installation process of FIG. 50 further includes steps S1101 and S1102.

As illustrated in FIG. 50, the server node 160 waits on standby until the occurred event information storage unit 116A has been updated (step S201). When the occurred event information storage unit 116A is updated, the server node 160 determines whether all the modules have been installed (step S202). Since no module has been installed (no in step S202), the server node 160 proceeds to step S203.

The server node 160 stores the column data of the module identifier, the input event type, and the aggregate attribute name from the definition of the module stored in the module definition storage unit 111B in the corresponding columns of the installation destination information storage unit 117A (step S203).

After performing operation in step S203, the server node 160 performs an operation in step S204 as below. The server node 160 retrieves, from the occurrence node IDs stored in the occurred event information storage unit 116A, an occurrence node ID of the occurred event type that is included in the input event type of an uninstalled module. The server node 160 further selects, from the retrieved occurrence node IDs, nodes that have the same attribute value and belong to the aggregate attribute that has the same attribute name as the attribute name of the aggregate attribute defined in the uninstalled module.

The server node 160 writes, in the installation destination information storage unit 117A, the retrieved occurrence node ID and occurred event attribute that correspond to the occurrence node ID (step S205).

If the number of occurrence node IDs is 0 (yes in step S206), there is a possibility that the occurred events from the lower nodes are not fully registered in the occurred event information storage unit 116A. In such a case, the server node 160 returns to step S202.

If the number of occurrence node IDs is plural (yes in step S207), the server node 160 performs an operation in step S208 as discussed below. That is, the server node 160 retrieves, from the upper node IDs stored in the topology storage unit 112A, a node ID of the lowest node of upper nodes that have the sensor nodes 260 or the gateway node 360 corresponding to the occurrence node IDs all registered as the lower nodes thereunder. The server node 160 then registers the node ID thus retrieved in the column of the installation destination node ID (step S209).

If the number of occurrence node IDs is one (no in step S207), there are not enough nodes to have a module installed therewithin. The server node 160 registers the previously retrieved occurrence node ID in the column of the installation destination node ID (step S209).

The server node 160 transmits the module stored in the module storage unit 111A to the node that corresponds to the installation destination node ID (step S210). The server node 160 reads from the module definition storage unit 161 the reference table and the reference column that correspond to the module, and reads the partial reference data that correspond to the reference table and the reference column of the reference data stored in the reference data storage unit 162 (step S1101).

The server node 160 transmits the partial reference data read from the reference data storage unit 162 to the lower node where the module is to be installed (step S1102). The server node 160 waits until the occurred event information storage unit 116A is updated (step S211), and then returns to step S202.

The server node 160 repeats operations in steps S203 through S211 until all the modules are installed (no in step S202). When all the modules have been installed (yes in step S202), the server node 160 completes the process.

[Effect of the Sixth Embodiment]

As described above, the server node 160 of the embodiment stores part of the reference data, which is referenced in a module's process, in the lower node. The server node 160 of the embodiment may allow a lower node to process an event efficiently.

According to the first through sixth embodiments, a sensor node or a gateway node is added to the sensor network system. The apparatus described herein may be equally applied even if a node is deleted from the sensor network system. For example, if a node that is subscribed to a service cancels the service, the node ID of the node to be deleted from the sensor network may be retrieved from the service providing application. The server node or the gateway node may monitor a network connection of a lower node, and may identify a node to be deleted if the network connection is broken.

According to the first through sixth embodiments, the module installation process is initiated when the topology of the network has changed. Alternatively, the module installation process may be initiated when a module is added or deleted, or when the definition of a module is modified.

The apparatus described herein may execute the module installation process in the background of an event processing process executed by a module or in the background of a service providing process executed by a service providing application. For example, an active server node may perform an event processing process or a service providing process while a standby server node executes a module installation process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event collection method that collects an event from a sensor network that is connected to a plurality of nodes that includes a sensor node that transmits a detected event and an intermediate node that relays the event to a computer that functions as a root node in the sensor network, the event collection method comprising:

storing module definition information, the module definition information serving to manage in an associated state a module identifier that identifies a module that processes the event, an input event type that indicates a type of the event processed by the module, and an aggregate attribute name that categorizes the event that is to be aggregated by the module;

collecting, using the computer, the event that occurs in the sensor node, and storing occurred event information, the occurred event information serving to manage in an associated state an occurred event type that indicates a type of the collected event, an occurred event attribute that includes an attribute name and an attribute value associated with the collected event, and an occurrence node identifier that identifies the sensor node where the collected event has occurred;

collecting connection relation information in relation to the sensor node to generate topology information, and storing the topology information, the topology information being served to manage the connection relation information;

retrieving, using the computer, on a per process basis for the module, based on the module definition information and the occurred event information, the occurrence node identifier categorized by the attribute value that corresponds to the attribute name identified by the aggregate attribute name, with the input event type associated with the occurred event type;

determining, using the computer, when there is a single retrieved occurrence node identifier with respect to the process of the module, a node identified by the occurrence node identifier as an installation destination of the module that is identified by the module identifier;

determining, using the computer, when there is a plurality of retrieved occurrence node identifiers with respect to the process of the module, based on the topology information, an upper node common to the plurality of occurrence node identifiers as an installation destination of the module identified by the module identifier, the upper node being placed in between the computer and each of a plurality of nodes identified by the plurality of retrieved occurrence node identifiers; and installing the module at the node determined to be the installation destination of the module.

2. The event collection method according to claim 1, further comprising:

collecting an execution enable information that indicates whether the node is enabled to execute the module; and determining, when the execution enable information of the node that is the determined installation destination indicates an execution disabled state, that an upper node of the node is the installation destination of the module.

3. The event collection method according to claim 1, further comprising:

processing an event that occurs in the sensor network while the module installation is under way.

4. The event collection method according to claim 1, further comprising:

collecting load information of the node; and determining, when the load information of the node as the determined installation destination and the upper node of the node satisfies a specific condition, that the upper node is the installation destination of the module.

5. The event collection method according to claim 4, further comprising:

collecting a network cost between the nodes, wherein the specific condition includes the network cost.

6. The event collection method according to claim 1, further comprising:

transmitting to the node an instruction to transmit at specific time intervals the event, which is output by the module to the upper node of the node that installs the module, wherein the event is transmitted to the upper node by the node at the specific time intervals.

7. The event collection method according to claim 1, further comprising:

transmitting to the node an instruction to data-compress the event output from the module and to transmit the compressed event to the upper node of the node that has the module installed thereon, wherein the event is data-compressed and then transmitted to the upper node of the node.

8. The event collection method according to claim 1, further comprising:

transmitting, to the node that is the installation destination of the module, a portion of reference data referenced by the module to be installed, out of reference data referenced by at least one of the modules defined in the module definition information.

9. An information processing apparatus comprising:

a communication unit that communicates with a sensor network connected to a plurality of nodes that includes a sensor node that transmits a detected event, and an intermediate node that relays the event to a computer that functions as a root node in the sensor network;

a storage unit that stores module definition information that serves to manage in an associated state a module identifier that identifies a module that processes the event, an input event type that indicates a type of the event processed by the module, and an aggregate attribute name that categorizes the event that is to be aggregated by the module, occurred event information that serves to manage in an associated state an occurred event type that indicates a type of the event, an occurred event attribute that includes an attribute name and an attribute value associated with the event, and an occurrence node identifier that identifies a node where the event has occurred, and topology information that serves to manage a connection relation of the node; and the computer that executes a procedure, the procedure including:

collecting the event that occurs in the node, storing in an associated manner the occurred event information with the occurred event type, the occurred event attribute, and the occurrence node identifier, collecting the connection relation information of the node to generate topology information, storing the topology information, the topology information being served to manage the connection relation information, retrieving on a per process basis for the module, based on the module definition information and the occurred event information, the occurrence node identifier categorized by the attribute value that corresponds to the attribute name identified by the aggregate attribute name, with the input event type associated with the occurred event type, determining, when there is a single retrieved occurrence node identifier with respect to the process of the module, a node identified by the occurrence node identifier as an installation destination of the module identified by the module identifier, determining, when there is a plurality of retrieved occurrence node identifiers with respect to the process of the module, based on the topology information, an upper node common to the plurality of occurrence node identifiers as an installation destination of the module identified by the module identifier, the upper node being placed in between the computer and each of a plurality of nodes identified by the plurality of retrieved occurrence node identifiers, and installing the module at the node determined to be the installation destination of the module.

10. The information processing apparatus according to claim 9, the procedure further comprising:

collecting an execution enable information that indicates whether the node is enabled to execute the module; and determining, when the execution enable information of the node that is the determined installation destination indicates an execution disabled state, that an upper node of the node is the installation destination of the module.

11. The information processing apparatus according to claim 9, the procedure further comprising:

processing an event that occurs in the sensor network while the module installation is under way.

12. The information processing apparatus according to claim 9, the procedure further comprising:
   collecting load information of the node; and
   determining, when the load information of the node as the determined installation destination and the upper node of the node satisfies a specific condition, that the upper node is the installation destination of the module.

13. The information processing apparatus according to claim 12, the procedure further comprising:
   collecting a network cost between the nodes,
   wherein the specific condition includes the network cost.

14. The information processing apparatus according to claim 9, the procedure further comprising:
   transmitting to the node an instruction to transmit at specific time intervals the event, which is output by the module to the upper node of the node that installs the module,
   wherein the event is transmitted to the upper node by the node at the specific time intervals.

15. The information processing apparatus according to claim 9, the procedure further comprising:
   transmitting to the node an instruction to data-compress the event output from the module and to transmit the compressed event to the upper node of the node that has the module installed thereon,
   wherein the event is data-compressed and then transmitted to the upper node of the node.

16. The information processing apparatus according to claim 9, the procedure further comprising:
   transmitting, to the node that is the installation destination of the module, a portion of reference data referenced by the module to be installed, out of reference data referenced by at least one of the modules defined in the module definition information.

* * * * *